United States Patent
Nelson et al.

(10) Patent No.: US 8,425,313 B2
(45) Date of Patent: Apr. 23, 2013

(54) DYNAMIC CASINO TRACKING AND OPTIMIZATION

(75) Inventors: Dwayne R. Nelson, Las Vegas, NV (US); Richard C. Williams, Reno, NV (US); Richard E. Rowe, Las Vegas, NV (US); Timothy W. Moser, Las Vegas, NV (US)

(73) Assignee: IGT, Reno, NV (US)

( * ) Notice: Subject to any disclaimer, the term of this patent is extended or adjusted under 35 U.S.C. 154(b) by 1246 days.

(21) Appl. No.: 11/829,028

(22) Filed: Jul. 26, 2007

(65) Prior Publication Data

US 2007/0271113 A1 Nov. 22, 2007

Related U.S. Application Data

(63) Continuation of application No. 11/655,496, filed on Jan. 19, 2007, which is a continuation-in-part of application No. 11/303,444, filed on Dec. 15, 2005, now abandoned, which is a continuation of application No. 10/170,278, filed on Jun. 12, 2002, now Pat. No. 7,311,605, said application No. 11/655,496 is a continuation-in-part of application No. 10/214,936, filed on Aug. 6, 2002, which is a continuation-in-part of application No. 09/927,742, filed on Aug. 10, 2001.

(51) Int. Cl.
*A63F 13/00* (2006.01)
(52) U.S. Cl.
USPC ........................................................... 463/29
(58) Field of Classification Search .............. 463/16–22, 463/29, 39–42
See application file for complete search history.

(56) References Cited

U.S. PATENT DOCUMENTS

| | | | |
|---|---|---|---|
| 4,335,809 A | 6/1982 | Wain et al. |
| 4,359,633 A | 11/1982 | Bianco |
| 4,669,730 A | 6/1987 | Small |
| 4,764,666 A | 8/1988 | Bergeron |
| 4,856,787 A | 8/1989 | Itkis |
| 5,129,652 A | 7/1992 | Wilkinson |
| 5,169,155 A | 12/1992 | Soules et al. |
| 5,257,179 A | 10/1993 | De Mar |
| 5,258,837 A | 11/1993 | Gormley |
| 5,265,874 A | 11/1993 | Dickinson et al. |

(Continued)

FOREIGN PATENT DOCUMENTS

| DE | 19855117 | 5/2000 |
|---|---|---|
| EP | 0360613 | 4/1995 |

(Continued)

OTHER PUBLICATIONS

EPO Application No. 03 760 364.4-2221, Communication regarding Examination, dated May 20, 2005.

(Continued)

*Primary Examiner* — David L Lewis
*Assistant Examiner* — Eric M Thomas
(74) *Attorney, Agent, or Firm* — Foley & Lardner LLP

(57) ABSTRACT

Gaming establishment patrons may be categorized and responsive services and features presented whether or not the patrons (or their companions) are known. Gaming and non-gaming activities of a patron may be identified and tracked. Information from various private and/or public databases accessible by a gaming establishment, may be used for patron ranking and to determine offers, goods and services that may be targeted to a patron.

32 Claims, 24 Drawing Sheets

U.S. PATENT DOCUMENTS

| | | | |
|---|---|---|---|
| 5,290,033 A | 3/1994 | Bittner et al. |
| 5,318,298 A | 6/1994 | Kelly et al. |
| 5,321,241 A | 6/1994 | Craine |
| 5,326,104 A | 7/1994 | Pease et al. |
| 5,373,440 A | 12/1994 | Cohen et al. |
| 5,557,086 A | 9/1996 | Schulze et al. |
| 5,581,257 A | 12/1996 | Greene et al. |
| 5,586,936 A | 12/1996 | Bennett et al. |
| 5,643,086 A | 7/1997 | Alcorn et al. |
| 5,655,961 A | 8/1997 | Acres et al. |
| 5,702,304 A | 12/1997 | Acres et al. |
| 5,722,891 A | 3/1998 | Inoue |
| 5,741,183 A | 4/1998 | Acres et al. |
| 5,741,184 A | 4/1998 | Takemoto et al. |
| 5,743,798 A | 4/1998 | Adams et al. |
| 5,752,882 A | 5/1998 | Acres et al. |
| 5,761,647 A | 6/1998 | Boushy |
| 5,768,382 A | 6/1998 | Schneier et al. |
| 5,770,533 A | 6/1998 | Franchi |
| 5,816,918 A | 10/1998 | Kelly et al. |
| 5,820,459 A | 10/1998 | Acres et al. |
| 5,823,879 A | 10/1998 | Goldberg et al. |
| 5,833,540 A | 11/1998 | Miodunski et al. |
| 5,836,817 A | 11/1998 | Acres et al. |
| 5,871,398 A | 2/1999 | Schneier et al. |
| 5,876,284 A | 3/1999 | Acres et al. |
| 5,892,661 A | 4/1999 | Stafford et al. |
| 5,951,397 A | 9/1999 | Dickinson |
| 5,952,922 A | 9/1999 | Shober |
| 5,967,896 A | 10/1999 | Jorasch et al. |
| 5,971,271 A | 10/1999 | Wynn et al. |
| 5,977,913 A | 11/1999 | Christ |
| 5,988,501 A | 11/1999 | Murakami et al. |
| 6,003,013 A | 12/1999 | Boushy et al. |
| 6,019,283 A | 2/2000 | Lucero |
| 6,048,269 A | 4/2000 | Burns et al. |
| 6,048,271 A | 4/2000 | Barcelou |
| 6,089,975 A | 7/2000 | Dunn |
| 6,104,815 A | 8/2000 | Alcorn et al. |
| 6,106,396 A | 8/2000 | Alcorn et al. |
| 6,110,041 A | 8/2000 | Walker et al. |
| 6,113,495 A | 9/2000 | Walker et al. |
| 6,135,884 A | 10/2000 | Hedrick et al. |
| 6,142,876 A | 11/2000 | Cumbers |
| 6,144,332 A | 11/2000 | Reindl et al. |
| 6,149,522 A | 11/2000 | Alcorn et al. |
| 6,161,743 A | 12/2000 | Shoemaker, Jr. |
| 6,162,122 A | 12/2000 | Acres et al. |
| 6,165,071 A | 12/2000 | Weiss |
| 6,183,362 B1 | 2/2001 | Boushy |
| 6,186,893 B1 | 2/2001 | Walker et al. |
| 6,193,156 B1 | 2/2001 | Han et al. |
| 6,193,608 B1 | 2/2001 | Walker et al. |
| 6,203,430 B1 | 3/2001 | Walker et al. |
| 6,210,279 B1 | 4/2001 | Dickinson |
| 6,234,900 B1 | 5/2001 | Cumbers |
| 6,244,958 B1 | 6/2001 | Acres |
| 6,254,006 B1 | 7/2001 | Mish |
| 6,254,483 B1 | 7/2001 | Acres |
| 6,265,977 B1 | 7/2001 | Vega et al. |
| 6,267,671 B1 | 7/2001 | Hogan |
| 6,280,326 B1 | 8/2001 | Saunders |
| 6,285,295 B1 | 9/2001 | Casden |
| 6,293,866 B1 | 9/2001 | Walker et al. |
| 6,302,793 B1 | 10/2001 | Fertitta et al. |
| 6,319,122 B1 | 11/2001 | Packes et al. |
| 6,319,125 B1 | 11/2001 | Acres |
| 6,329,213 B1 | 12/2001 | Tuttle et al. |
| 6,358,149 B1 | 3/2002 | Schneider et al. |
| 6,359,647 B1 | 3/2002 | Sengupta et al. |
| 6,379,247 B1 | 4/2002 | Walker et al. |
| 6,383,076 B1 | 5/2002 | Tiedeken |
| 6,394,907 B1 | 5/2002 | Rowe |
| 6,398,649 B1 | 6/2002 | Sugaya |
| 6,400,272 B1 | 6/2002 | Holtzman et al. |
| 6,409,595 B1 | 6/2002 | Uihlein et al. |
| 6,419,190 B1 | 7/2002 | Nguegang |
| 6,424,884 B1 | 7/2002 | Brooke, Jr. et al. |
| 6,431,983 B2 | 8/2002 | Acres |
| 6,471,590 B2 | 10/2002 | Saunders |
| 6,514,140 B1 | 2/2003 | Storch |
| 6,547,664 B2 | 4/2003 | Saunders |
| 6,554,705 B1 | 4/2003 | Cumbers |
| 6,558,256 B1 | 5/2003 | Saunders |
| 6,571,216 B1 | 5/2003 | Garg et al. |
| 6,606,744 B1 | 8/2003 | Mikurak |
| 6,612,575 B1 | 9/2003 | Cole et al. |
| 6,612,928 B1 | 9/2003 | Bradford et al. |
| 6,628,939 B2 | 9/2003 | Paulsen |
| 6,629,019 B2 | 9/2003 | Legge et al. |
| 6,641,035 B1 | 11/2003 | Predescu et al. |
| 6,641,484 B2 | 11/2003 | Oles et al. |
| 6,675,152 B1 | 1/2004 | Prasad et al. |
| 6,682,421 B1 | 1/2004 | Rowe et al. |
| 6,712,698 B2 | 3/2004 | Paulsen et al. |
| 6,778,820 B2 * | 8/2004 | Tendler ............... 455/414.2 |
| 6,811,486 B1 | 11/2004 | Luciano, Jr. |
| 6,812,824 B1 | 11/2004 | Goldinger et al. |
| 6,813,609 B2 | 11/2004 | Wilson |
| 6,848,994 B1 | 2/2005 | Knust et al. |
| 6,848,995 B1 | 2/2005 | Walker et al. |
| 6,852,031 B1 | 2/2005 | Rowe |
| 6,878,062 B2 | 4/2005 | Bjorklund et al. |
| 6,884,173 B2 | 4/2005 | Gauselmann |
| 6,887,154 B1 | 5/2005 | Luciano, Jr. et al. |
| 6,912,398 B1 | 6/2005 | Domnitz |
| 6,920,561 B1 | 7/2005 | Gould et al. |
| 6,923,721 B2 | 8/2005 | Luciano et al. |
| 6,923,724 B2 | 8/2005 | Williams |
| 6,935,958 B2 | 8/2005 | Nelson |
| 7,022,017 B1 | 4/2006 | Halbritter et al. |
| 7,025,674 B2 | 4/2006 | Adams et al. |
| 7,083,518 B2 | 8/2006 | Rowe |
| 7,094,149 B2 | 8/2006 | Walker et al. |
| 7,116,987 B2 | 10/2006 | Spain, Jr. et al. |
| 7,116,988 B2 | 10/2006 | Dietrich et al. |
| 7,175,528 B1 | 2/2007 | Cumbers et al. |
| 7,303,475 B2 | 12/2007 | Britt et al. |
| 7,311,605 B2 | 12/2007 | Moser et al. |
| 7,946,917 B2 | 5/2011 | Kaminkow et al. |
| 7,993,197 B2 | 8/2011 | Kaminkow |
| 7,997,978 B2 | 8/2011 | Kaminkow et al. |
| 2002/0034978 A1 | 3/2002 | Legge et al. |
| 2002/0077173 A1 | 6/2002 | Luciano et al. |
| 2002/0077174 A1 | 6/2002 | Luciano et al. |
| 2002/0077175 A1 | 6/2002 | Jorasch et al. |
| 2002/0107715 A1 | 8/2002 | Pace et al. |
| 2002/0123376 A1 * | 9/2002 | Walker et al. ............. 463/11 |
| 2002/0128057 A1 * | 9/2002 | Walker et al. ............. 463/20 |
| 2002/0142825 A1 | 10/2002 | Lark et al. |
| 2002/0142841 A1 | 10/2002 | Boushy |
| 2002/0169021 A1 | 11/2002 | Urie et al. |
| 2002/0187834 A1 | 12/2002 | Rowe et al. |
| 2002/0194619 A1 | 12/2002 | Chang et al. |
| 2002/0198775 A1 | 12/2002 | Ryan |
| 2003/0027635 A1 * | 2/2003 | Walker et al. ............. 463/40 |
| 2003/0032471 A1 | 2/2003 | Darder et al. |
| 2003/0032474 A1 | 2/2003 | Kaminkow |
| 2003/0036425 A1 | 2/2003 | Kaminkow et al. |
| 2003/0045354 A1 | 3/2003 | Giobbi |
| 2003/0069071 A1 | 4/2003 | Britt et al. |
| 2003/0078101 A1 | 4/2003 | Schneider et al. |
| 2003/0083943 A1 | 5/2003 | Adams et al. |
| 2003/0104865 A1 | 6/2003 | Itkis et al. |
| 2003/0162593 A1 | 8/2003 | Griswold |
| 2003/0195037 A1 | 10/2003 | Vuong et al. |
| 2003/0199321 A1 | 10/2003 | Williams |
| 2003/0232647 A1 | 12/2003 | Moser |
| 2004/0092307 A1 | 5/2004 | George et al. |
| 2004/0254005 A1 | 12/2004 | Shackleford et al. |
| 2005/0012818 A1 | 1/2005 | Kiely et al. |
| 2005/0051965 A1 | 3/2005 | Gururajan et al. |
| 2005/0116020 A1 | 6/2005 | Smolucha |
| 2005/0143169 A1 | 6/2005 | Nguyen et al. |
| 2005/0215315 A1 * | 9/2005 | Miller et al. ............. 463/29 |
| 2005/0255919 A1 | 11/2005 | Nelson |
| 2006/0040741 A1 | 2/2006 | Griswold et al. |

| | | | |
|---|---|---|---|
| 2006/0046842 | A1 | 3/2006 | Mattice |
| 2006/0052169 | A1 | 3/2006 | Britt et al. |
| 2006/0063575 | A1 | 3/2006 | Gatto et al. |
| 2006/0076401 | A1 | 4/2006 | Frerking |
| 2006/0084488 | A1 | 4/2006 | Kinsley et al. |
| 2006/0143085 | A1 | 6/2006 | Adams et al. |
| 2006/0148561 | A1 | 7/2006 | Moser et al. |
| 2006/0252521 | A1 | 11/2006 | Gururajan et al. |
| 2006/0252554 | A1 | 11/2006 | Gururajan et al. |
| 2006/0258427 | A1 | 11/2006 | Rowe |
| 2006/0258442 | A1 | 11/2006 | Ryan |
| 2007/0087834 | A1 | 4/2007 | Moser et al. |
| 2007/0117623 | A1 | 5/2007 | Nelson et al. |
| 2008/0051193 | A1 | 2/2008 | Kaminkow et al. |
| 2008/0248849 | A1 | 10/2008 | Lutnick et al. |
| 2009/0055204 | A1 | 2/2009 | Pennington |
| 2009/0055205 | A1 | 2/2009 | Nguyen |
| 2012/0063651 | A1 | 3/2012 | Pennington et al. |

FOREIGN PATENT DOCUMENTS

| | | |
|---|---|---|
| EP | 0762341 | 12/1997 |
| EP | 1096438 | 2/2001 |
| EP | 1139310 | 4/2001 |
| EP | 1 120 757 | 8/2001 |
| EP | 1 351 180 | 10/2003 |
| FR | 2 711 001 | 4/1995 |
| FR | 2 816 742 | 5/2002 |
| JP | 2007-505079 | 6/1995 |
| JP | 11-019330 | 1/1999 |
| JP | 2000-210464 | 8/2000 |
| JP | 2002-074506 | 3/2002 |
| JP | 2002-078954 | 3/2002 |
| WO | WO95/24689 | 9/1995 |
| WO | WO96/00950 | 1/1996 |
| WO | WO98/12648 | 3/1998 |
| WO | WO 98/47589 | 10/1998 |
| WO | WO 00/38089 | 6/2000 |
| WO | WO 00/52655 | 8/2000 |
| WO | WO00/78419 | 12/2000 |
| WO | WO 01/46923 | 6/2001 |
| WO | WO 02/058020 | 7/2002 |
| WO | WO 03/013678 | 2/2003 |
| WO | WO 03/025828 | 3/2003 |
| WO | WO 03/027970 | 4/2003 |
| WO | WO 2003/032240 | 4/2003 |
| WO | WO 03/073386 | 9/2003 |
| WO | WO 03/089088 | 10/2003 |
| WO | WO 03/107287 | 12/2003 |
| WO | WO 2004/013820 | 2/2004 |
| WO | WO 2004/052656 | 6/2004 |
| WO | WO 2004/064354 | 7/2004 |
| WO | WO 2005/098650 | 10/2005 |
| WO | WO 2006/020413 | 2/2006 |
| WO | WO 2006/105182 | 10/2006 |
| WO | WO 2008/067212 | 6/2008 |
| WO | WO 2008/091473 | 7/2008 |
| WO | WO 2009/026180 | 2/2009 |
| WO | WO 2009/026295 | 2/2009 |

OTHER PUBLICATIONS

EP patent application No. 03760364.4-2221, Preliminary Opinion dated May 10, 2006.
US Office Action, mailed Mar. 2, 2004, from U.S. Appl. No. 10/170,278.
US Office Action, mailed Sep. 9, 2004, from U.S. Appl. No. 10/170,278.
US Office Action, mailed Jan. 11, 2007, from U.S. Appl. No. 10/170,278.
US Office Action, mailed Jan. 25, 2007, from U.S. Appl. No. 11/303,444.
Bronstein et al "Robust expression-invariant face recognition from partially missing data", Computer Vision-ECCV 2006,ISBN 3-540-33836-5, Jul. 2006, pp. 396-408.
EPCglobal Architecture Framework, Final Version, Jul. 1, 2005, 53 pp.
U.S. Final Office Action dated Sep. 19, 2002 issued in U.S Appl. No. 09/927,742.
U.S. Final Office Action dated Mar. 10, 2003 issued in U.S Appl. No. 09/927,742.
U.S. Advisory Action dated May 27, 2003 issued in U.S Appl. No. 09/927,742.
U.S. Office Action dated Aug. 20, 2003 issued in U.S. Appl. No. 09/927,742.
U.S. Final Office Action dated Mar. 20, 2007 issued in U.S Appl. No. 09/927,742.
U.S. Advisory Action dated Jun. 21, 2007 issued in U.S. Appl. No. 09/927,742.
U.S. Office Action dated Sep. 20, 2007 issued in U.S Appl. No. 09/927,742.
U.S. Final Office Action dated Jun. 9, 2008 issued in U.S Appl. No. 09/927,742.
U.S. Office Action dated Nov. 12, 2008 issued in U.S Appl. No. 09/927,742.
U.S. Final Office Action dated Apr. 17, 2009 issued in U.S Appl. No. 09/927,742.
U.S. Advisory Action dated Jun. 26, 2009 issued in U.S. Appl. No. 09/927,742.
U.S. Office Action dated Jul. 23, 2009 issued in U.S. Appl. No. 09/927,742.
U.S. Notice of Allowance dated Apr. 16, 2010 issued in U.S Appl. No. 09/927,742.
U.S. Notice of Allowance dated Sep. 7, 2010 issued in U.S Appl. No. 09/927,742.
U.S. Notice of Allowance dated Jan. 6, 2011 issued in U.S Appl. No. 09/927,742.
U.S. Notice of Allowance dated May 3, 2011 issued in U.S Appl. No. 09/927,742.
U.S. Office Action dated Oct. 4, 2005 issued in U.S. Appl. No. 10/214,936.
U.S. Final Office Action dated Jun. 30, 2006 issued in U.S Appl. No. 10/214,936.
U.S. Office Action dated Oct. 31, 2006 issued in U.S Appl. No. 10/214,936.
U.S. Final Office Action dated Apr. 24, 2007 issued in U.S Appl. No. 10/214,936.
U.S. Office Action dated Sep. 5, 2007 issued in U.S. Appl. No. 10/214,936.
U.S. Final Office Action dated Jun. 12, 2008 issued in U.S Appl. No. 10/214,936.
U.S. Office Action dated Dec. 23, 2008 issued in U.S. Appl. No. 10/214,936.
U.S. Final Office Action dated Aug. 21, 2009 issued in U.S Appl. No. 10/214,936.
U.S. Office Action dated Jun. 25, 2010 issued in U.S. Appl. No. 10/214,936.
U.S. Notice of Allowance, Examiner Amendment and Interview Summary dated Dec. 13, 2010 issued in U.S Appl. No. 10/214,936.
U.S. Notice of Allowance dated Apr. 1, 2011 issued in U.S Appl. No. 10/214,936.
U.S. Office Action dated May 28, 2008 issued in U.S. Appl. No. 11/830,739.
U.S. Final Office Action dated Feb. 19, 2009 issued in U.S Appl. No. 11/830,739.
U.S. Final Office Action dated Aug. 19, 2009 issued in U.S Appl. No. 11/830,739.
U.S. Notice of Allowance dated Aug. 23, 2010 issued in U.S Appl. No. 11/830,739.
U.S. Office Communication dated Sep. 29, 2010 considering IDS references issued in U.S Appl. No. 11/830,739.
U.S. Notice of Allowance, Interview Summary, and Examiner's Amendment dated Dec. 29, 2010 issued in U.S Appl. No. 11/830,739.
U.S. Notice of Allowance dated Apr. 15, 2011 issued in U.S Appl. No. 11/830,739.
U.S. Office Action dated Oct. 16, 2009 issued in U.S. Appl. No. 11/262,059.
U.S. Final Office Action dated Mar. 8, 2010 issued in U.S Appl. No. 11/262,059.
U.S. Office Action dated Oct. 5, 2007 issued in U.S. Appl. No. 10/914,944.

U.S. Office Action dated Apr. 16, 2008 issued in U.S Appl. No. 10/914,944.
U.S. Office Action dated Apr. 22, 2009 issued in U.S. Appl. No. 10/914,944.
U.S. Office Action dated Dec. 7, 2009 issued in U.S Appl. No. 10/914,944.
U.S. Advisory Action dated Mar. 15, 2010 issued in U.S Appl. No. 10/914,944.
U.S. Office Action dated Apr. 26, 2010 issued in U.S Appl. No. 10/914,944.
U.S. Final Office Action dated Sep. 23, 2010 issued in U.S Appl. No. 10/914,944.
U.S. Office Action dated Mar. 15, 2011 issued in U.S Appl. No. 10/914,944.
U.S. Final Office Action dated Jul. 12, 2011 issued in U.S Appl. No. 10/914,944.
U.S. Office Action, dated Apr. 4, 2005 (non-responsive) issued in U.S Appl. No. 10/170,278.
U.S. Notice of Allowance dated Sep. 7, 2005 issued in U.S Appl. No. 10/170,278.
US Supplemental Office Action, dated Jan. 19, 2007 issued in U.S Appl. No. 10/170,278.
U.S. Notice of Allowance dated Aug. 7, 2007 issued in U.S Appl. No. 10/170,278.
U.S. Office Action dated Sep. 8, 2009 issued in U.S Appl. No. 11/565,424.
U.S. Final Office Action dated Mar. 8, 2010 issued in U.S Appl. No. 11/565,424.
U.S. Office Action dated Sep. 24, 2010 issued in U.S Appl. No. 11/565,424.
U.S. Office Action dated Feb. 28, 2011 issued in U.S Appl. No. 11/565,424.
U.S. Examiner Interview Summary dated May 26, 2011 issued in U.S Appl. No. 11/565,424.
U.S. Examiner Interview Summary dated Jun. 6, 2011 issued in U.S Appl. No. 11/565,424.
U.S. Office Action dated Feb. 25, 2008 issued in U.S Appl. No. 11/655,496.
U.S. Final Office Action dated Oct. 1, 2008 issued in U.S Appl. No. 11/655,496.
U.S. Office Action dated Jan. 26, 2009 issued in U.S Appl. No. 11/655,496.
U.S. Final Office Action dated Feb. 5, 2010 issued in U.S Appl. No. 11/655,496.
U.S. Office Action dated Aug. 5, 2010 issued in U.S Appl. No. 11/655,496.
U.S. Final Office Action dated Jan. 25, 2011 issued in U.S Appl. No. 11/655,496.
U.S. Office Action dated Jul. 7, 2011 issued in U.S Appl. No. 11/844,262.
U.S. Office Action dated May 31, 2011 issued in U.S Appl. No. 11/844,267.
PCT International Search Report dated Oct. 18, 2002 issued in PCT/U52002/025105.
PCT International Preliminary Examination Report dated Jun. 11, 2003 issued in PCT/US2002/025105.
PCT International Search Report dated Mar. 2, 2004 issued in PCT/US2003/023872.
PCT Written Opinion dated Mar. 8, 2004 issued in PCT/US2003/023872.
PCT International Preliminary Examination Report dated May 27, 2004 issued in PCT/US2003/023872.
Australian Examiner's first report dated Jul. 18, 2008 issued in Au Application No. 2003257941, 3 pgs.
Great Britain Search Report dated Jul. 7, 2005 issued in GB0502535.8, 2 pages.
Great Britain Search and Examination Report dated Aug. 31, 2006 issued in GB0611551.3.
Great Britain Search and Examination Report dated Aug. 31, 2006 issued in GB0611545.5.
Japanese Office Action (description) dated Mar. 5, 2008 issued in JP2004-256237, 4 pgs.
Japanese Office Action (description) dated Dec. 8, 2008 issued in JP2004-256237, 4 pgs.
Australian Examiner's first report dated Jul. 25, 2011 issued in AU Application No. 2006233242.
Great Britain Combined Search and Examination Report dated Feb. 15, 2007 issued in GB0620781.5 , 5 pages.
Great Britain Examination Report dated Jan. 30, 2008 issued in GB0620781.5.
Great Britain Examination Report dated Jun. 24, 2008 issued in GB0620781.5, 2 pgs.
PCT International Search Report and Written Opinion dated Nov. 15, 2005 issued in PCT/US2005/026777, 7 pages.
PCT International Preliminary Report on Patentability and Written Opinion dated Feb. 13, 2007 issued in PCT/US2005/026777.
Chinese First Office Action dated Jul. 18, 2008 issued in CN200580027057.X.
Chinese Second Office Action dated Jun. 12, 2009 issued in CN200580027057.X.
Chinese Office Action (Decision of the Office of Rejections) dated Jan. 8, 2010 issued in CN200580027057.X.
Chinese Notification of Acceptance of the Request for Reexamination dated Oct. 25, 2010 issued in CN200580027057.X.
European Examination Report dated Jan. 16, 2008 issued in EP 05 776 662.8.
PCT Written Opinion dated Jan. 15, 2004 issued in PCT/US03/18826.
PCT International Preliminary Examination Report and International Search Report dated Apr. 8, 2004 issued in PCT/US03/18826.
Australian Examiner's First Report dated Sep. 19, 2008 issued in AU2003243570.
EP Decision to Refuse a European Patent Application dated Feb. 12, 2007 issued in EP 03 760 364.4.
PCT International Search Report dated Jun. 23, 2008 issued in PCT/US2007/085117.
PCT International Preliminary Report on Patentability and Written Opinion dated Jun. 11, 2009 issued in PCT/US2007/085117.
PCT International Search Report dated Jun. 23, 2008 issued in PCT/US2007/088920.
PCT Written Opinion dated Jun. 23, 2008 issued in PCT/US2007/088920.
PCT International Preliminary Report on Patentability and Written Opinion dated Jul. 30, 2009 issued in PCT/US2007/088920.
PCT International Search Report dated Nov. 7, 2008 issued in PCT/US2008/073388.
PCT Written Opinion dated Nov. 7, 2008 issued in PCT/US2008/073388.
PCT International Preliminary Report on Patentability and Written Opinion dated Feb. 24, 2010 issued in PCT/US2008/073388.
PCT International Search Report dated Feb. 13, 2009 issued in PCT/US2008/073599.
PCT Written Opinion dated Feb. 13, 2009 issued in PCT/US2008/073599.
PCT International Preliminary Report on Patentability and Written Opinion dated Feb. 24, 2010 issued in PCT/US2008/073599.
Bar Code 1, "2-Dimensional Bar Code Page", *Adams Communication*, Jun. 20, 2002, pp. 1-13. http://www.adams1.com/pub/russadam/stack.html.
Bar Code 1, "Bar Code Readers Page", *Adams Communication*, Jun. 20, 2002, pp. 1-5. http://www.adams1.com/pub/russadam/readers.html.
Bazakos et al. "Fast Access Control Technology Solutions", *IEEE Conference on Advanced Video Signal Based Surveillance*, Italy, Sep. 15-16, 2005.
Converting Signal Strength Percentage to dBm Values, Joe Bardwell, Nov. 2002.
Doppler Direction Finder, Radio Direction Finder Kit, Ramsey Electronics Mode No. DDF1, Copyright 1998 by Ramsey Electronics, Inc.
Dowdall et al., "A Face Detection Method Based on Multi-Band Feature Extraction in the Near-IR Spectrum," *Proceedings IEEE Workshop on Computer Vision Beyond the Visiblespectrum: Methods and Applications*, Dec. 14, 2001, XP002369556.

Fey, Marshall, (1983) "Slot Machines, A Pictorial History of the First 100 years", *Liberty Belle Books*, pp. 100-117.

Fleck et al. (Jun. 2006) "3D Surveillance—A Distributed Network of Smart Cameras for Real-Time Tracking and its Visualization in 3D", *Proceedings of the 2006 Conference on Computer Vision and Pattern Recognition Workshop*, CVPRW '06, 118:17-22.

Google search on the definition of "encrypt" at: http://www.google.com/search?h1=en&rlz+1T4GGLD_en_US345 &q=define%3AEncrypt, downloaded Feb. 26, 2010, 2 pages.

"Hand Held terminal-decoder for invisible bar codes", *V.L. Engineering*, downloaded from http://www.vlengineering.com/products/wizard_CT6.html on Nov. 23, 2004, 3 pages.

"In-Charge Cards", Aug. 1993, What's News, *Electronics Now*, p. 4.

Patwari, N., et al., "Learning Sensor Location from Signal Strength and Connectivity," in Secure Localization and Time Synchronization for Wireless Sensor and Ad Hoc Networks , Eds. Radha Poovendran, Cliff Wang, and Sumit Roy, Advances in Information Security series, vol. 30, Springer, Dec. 2006, ISBN 978-0-387-32721-1, 26 pages.

Rankl, W. et al.: "Handbuch der Chipkarten, Kontaktbehaftete Karten" Handbuch Der Chipkarten. Aufbau-Funktionsweise-Einsatz Von Smart Cards, Muenchen: Carl Hanser Verlag, DE, 1999, pp. 110-125, XP002242017.

RFID "Basics Primer", "RFID Basics Primer", Automatic Identification Manufacturers, Sep. 28, 1999, pp. 1-17. http://www.aimglobal.org/technologies/rfid/resources/papers/rfid_basics_primer.htm  http://www.aimglobal.org/technologies/rfid/resources/papers/rfid_basics_primer.asp downloaded Nov. 23, 2004, 14 pages.

Rowe, R., Herbst Softward Presentation, Aug. 12, 2003, 16 pages.

S&H Greenpoints, Sperry & Hutchinson Company, Inc. http://www.greenpoints.com/info/inf_aboutsh.asp [downloaded Sep. 10, 2002], 10 pages.

Symbol, Wireless for Beginners, Symbol Tech, Sep. 1, 2001, 12 pages.

Symbol®, "Encoded Fingerprint Scanned by Symbol PDF417 Reader", Symbol Tech, Dec. 22, 1998, pp. 1-3. http://www.symbol.com/news/pressreleases/pressreleases_pdf417prod_ph.htm http://www.symbol.com/news/pressreleases/press_releases_pdf417prod_ph.html downloaded Nov. 23, 2004, 3 pages.

"Technology Highlight: Spread Spectrum Barcode Technology," Sandia National Laboratories, Sandia/California News, downloaded from http://www.ca.sandia.gov/news/barcode/index.html on Oct. 27, 2005, 8 pages.

"What Happened to Green Stamps", (Jul. 24, 2001) *The Straight Dope*, http://www.straightdope.com/mailbag/mgreenstamps.html [downloaded Sep. 10, 2002], 2 pages.

"Where's the Smart Money?", www.Economist.com downloaded from http://weblinks2.epnet.com/citation.asp?tb=1& Dec. 8, 2004, 2 pages.

U.S. Office Action dated Mar. 26, 2012 issued in U.S. Appl. No. 10/914,944.

U.S. Final Office Action dated Sep. 16, 2011 issued in U.S. Appl. No. 11/565,424.

U.S. Allowed Claims dated Mar. 30, 2012 issued in U.S. Appl. No. 11/655,496.

U.S. Notice of Allowance dated Mar. 30, 2012 issued in U.S. Appl. No. 11/655,496.

U.S. Office Action dated Sep. 28, 2011 issued in U.S. Appl. No. 11/844,262.

U.S. Final Office Action dated Mar. 26, 2012 issued in U.S. Appl. No. 11/844,262.

U.S. Final Office Action dated Nov. 10, 2011 issued in U.S. Appl. No. 11/844,267.

Canadian Office Action dated Nov. 16, 2011 issued in CA 2,494,496.

Chinese Notification of the Reexamination dated Nov. 24, 2011 issued in CN200580027057.X.

Bajracharya et al., (2005) "Target Tracking, Approach and Camera Handoff for Automated Instrument Placement", *IEEEAC*, pp. 1-8.

"Eptascape ADS100 Automatic Detection System", *Eptascape Inc.* www.eptascape.com, 2 pages (publication date unknown).

Javed et al., (2000) "Camera Handoff: Tracking in Multiple Uncalibrated Stationary Cameras", *IEEE*, pp. 113-118.

"DeepSea G2 Vision System", TYZX | systems that see, 3DAWARE™ founded in 2002, *Tyzx, Inc.*, 2 pages.

"TYZX 3D Person Tracking Technology Expected to Draw More Than 2 Million Visitors to Interactive Art Display in Rockefeller Center", New York, Aug. 15, 2006, *Tyzx, Inc.*, 5 pages.

"TYZX 3D Person Tracking Technology Steps Up To the Design Challenge in New York City", New York, Dec. 19, 2006, *Tyzx, Inc.*, 3 pages.

\* cited by examiner

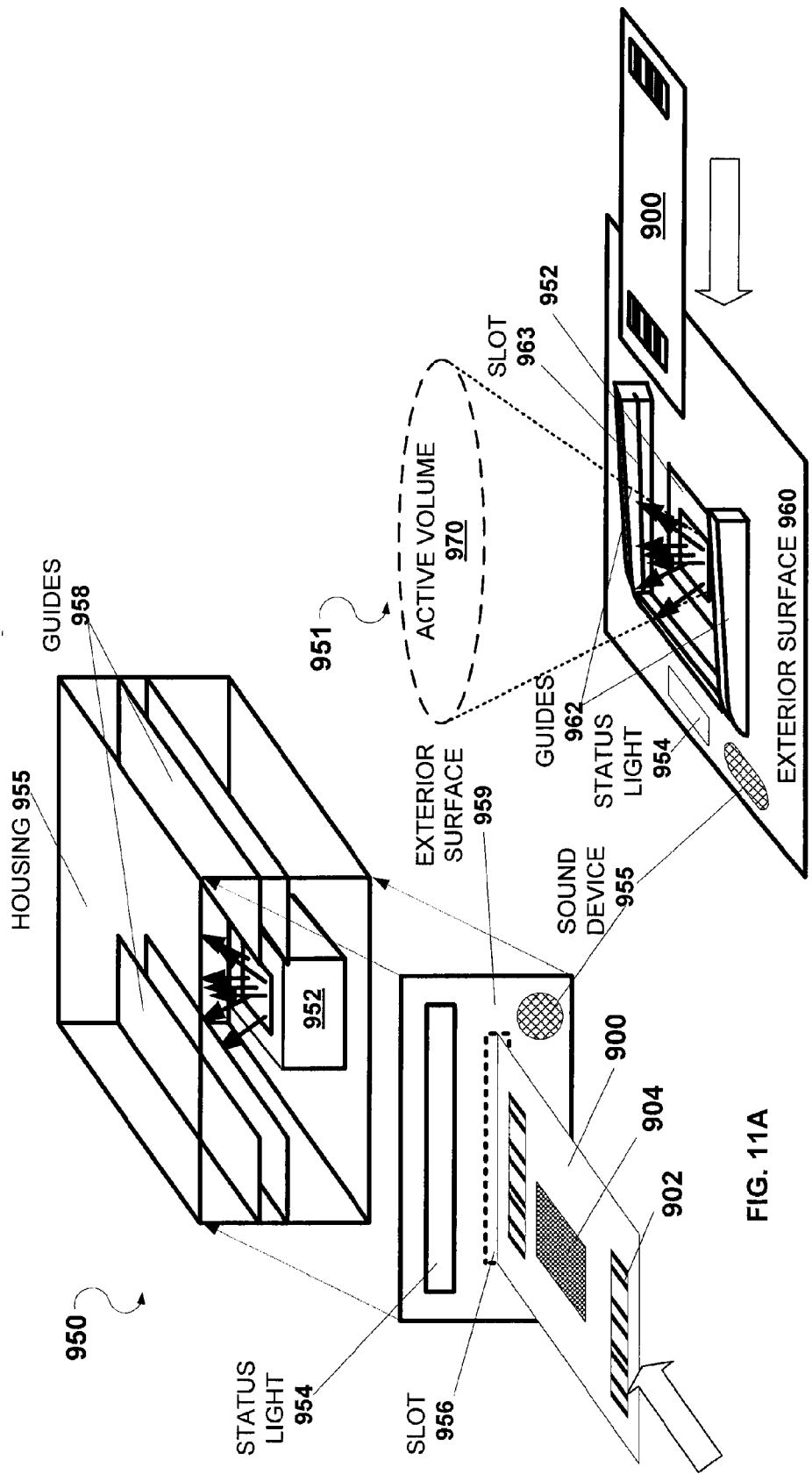

DYNAMIC CASINO TRACKING AND OPTIMIZATION

RELATED APPLICATION DATA

This application is a continuation of U.S. patent application Ser. No. 11/655,496, filed Jan. 19, 2007 and entitled "DYNAMIC CASINO TRACKING AND OPTIMIZATION", which is a continuation-in-part of U.S. patent application Ser. No. 11/303,444, filed Dec. 15, 2005 now abandoned and entitled "PLAYER TRACKING ASSEMBLY FOR COMPLETE PATRON TRACKING FOR BOTH GAMING AND NON-GAMING CASINO ACTIVITY", which is a continuation of U.S. application Ser. No. 10/170,278, filed Jun. 12, 2002, now U.S. Pat. No. 7,311,605 and entitled the same, which are incorporated by reference in their entireties. U.S. patent application Ser. No. 11/655,496 is also a continuation-in-part of U.S. patent application Ser. No. 10/214,936, filed Aug. 6, 2002 and entitled "FLEXIBLE LOYALTY POINTS PROGRAMS", which is a continuation-in-part of U.S. application Ser. No. 09/927,742, filed Aug. 10, 2001, and entitled the same, which are incorporated by reference in their entireties.

FIELD OF THE INVENTION

The present invention relates generally to player tracking services and systems.

BACKGROUND OF THE INVENTION

Player tracking programs are offered at gaming establishments for various reasons, including the desire to attain and/or maintain a player's interest in game play. (Although there are many types of gaming establishments, including casinos, cruise ships, riverboats, etc., all types of gaming establishments may be referred to herein as "casinos.") Player tracking programs provide rewards to players that typically correspond to the player's level of patronage, e.g., to the player's playing frequency and/or total amount of game plays at a given casino. Player tracking rewards may include free meals, free lodging and/or free entertainment. Some such complimentary rewards are often referred to as "comps." Player tracking rewards may help to sustain a game player's interest in additional game play during a visit to a gaming establishment and may entice a player to visit a gaming establishment to partake in various gaming activities.

Player tracking programs may be applied to any game of chance offered at a gaming establishment. In particular, player tracking programs are very popular with players of mechanical slot gaming machines and video slot gaming machines. In a gaming machine, a player tracking program is implemented using a player tracking unit installed in the gaming machine and in communication with a remote player tracking server.

Due to their increasing popularity, player tracking cards and player tracking programs have essentially become the de facto marketing method of doing business at casinos. As suggested above, a player's incentive for using the player tracking services is awards provided by the gaming machine operator (e.g., the casino). Some incentives of a casino for providing player tracking services is to generate "brand" loyalty, gather valuable information that may be used for marketing and provide better customer services. This is due to the fact that the programs allow a casino to identify and reward customers based upon their previous game play history. In particular, a goal of the casinos is to identify and then to provide a higher level of service to certain groups of players identified as especially valuable to the casinos.

Gaming establishments are continually searching for new and innovative techniques to track patron activity to improve casino operations and marketing. Thus, while current tracking systems are adequate, they are limited mainly to wagering game play. It would be desirable to provide more versatile player tracking methods and devices.

SUMMARY OF THE INVENTION

Methods and devices are provided for categorizing gaming establishment patrons and for providing responsive services and features, whether or not the patrons (or their companions) are known. Gaming and non-gaming activities of a patron may be identified and tracked. Information from various private and/or public databases accessible by a gaming establishment, may be used for patron ranking and to determine offers, goods and services that may be targeted to a patron.

Some embodiments of the invention provide a system for providing gaming services that includes a plurality of biometric devices for obtaining biometric data regarding people in or near a gaming establishment. The biometric devices are configured for communication with other devices via a network. The system also includes a server, comprising at least one network interface configured for communication with the network and at least one logic device configured to do the following: obtain biometric data regarding a person from at least one of the biometric devices via the network interface; categorize the person with reference to the biometric data; and determine whether to provide a benefit to the person according to a categorization.

The logic devices may be, e.g., processors executing software that has been written to provide some aspects of the present invention. At least one logic device may be further configured to obtain player indicia regarding the person from a database and categorize the person with reference to the biometric data and the player indicia. The database may be, e.g., a player loyalty system database. A logic device may determine the person's expected economic value to the gaming establishment. The person may be categorized and/or ranked, at least in part, according to the expected economic value.

The system may include means for tracking the person's location while the person is within, or in the vicinity of, the gaming establishment. The tracking means may include means for communicating the person's location via the network. For example, the tracking means may comprise a radio frequency identification network.

The biometric devices may comprise, e.g., a plurality of cameras and/or a plurality of fingerprint scanners. Accordingly, the biometric data may comprise facial image data and/or fingerprint data.

Some implementations of the invention provide a method of providing gaming services. The method includes these steps: obtaining first player indicia regarding a person in or near a gaming establishment without reference to the person's voluntary participation in a player loyalty system; categorizing the person with reference to the first player indicia; and determining whether to provide a benefit to the person according to a categorization. The player loyalty system may comprise a player tracking system. The benefit may comprises a comp or enhanced personal service.

The obtaining step may involve obtaining first player indicia regarding a person near a gaming establishment. The first player indicia may include automobile indicia, clothing indicia, jewelry indicia, personal association indicia, tipping indicia and/or purchasing indicia. The obtaining step may also comprise obtaining biometric data, such as facial image data and/or fingerprint data.

The method may involve obtaining second player indicia regarding the person (e.g., with reference to one or more databases) and categorizing the person with reference to the first player indicia and the second player indicia. The database(s) may comprise a player loyalty system database and/or a publicly available database. The step of obtaining second player indicia may be performed in response to first player indicia.

The categorizing step may comprise a determination of the person's expected economic value to the gaming establishment. The categorizing and determining steps may be performed dynamically, e.g., in response to additional data regarding the person and/or other persons in or near the gaming establishment. The categorizing step may comprise assigning a rank to the person, the rank depending at least in part on the person's expected economic value to the gaming establishment.

The method may involve tracking the person's location while the person is within, or in the vicinity of, the gaming establishment. The method may involve associating a code with the person's data.

Alternative embodiments of the invention provide a player tracking system for tracking customer activity for a casino establishment having gaming sections and non-gaming sections The system includes the following elements: a plurality of player tracking media for distribution to respective participating customers that include respective customer IDs which are associated with respective customer accounts; a plurality of gaming activity player tracking units positioned in the gaming section of the casino establishment proximate the gaming activity which cooperates with the player tracking media to monitor the gaming activity data of the respective customer; a plurality of non-gaming activity player tracking units positioned in the non-gaming section of the casino establishment proximate the non-gaming activity which cooperates with the player tracking media to monitor the non-gaming activity data of the respective customer; and a computer system having a database of the respective customer accounts associated with respective customer IDs, and each gaming activity player tracking unit and each non-gaming activity player tracking unit coupled to the computer system to process the respective gaming activity data and non-gaming activity data for each respective customer.

The non-gaming activity player tracking unit may include a wireless interface configured to detect the presence of a respective player tracking media in the local vicinity of the respective non-gaming section of the casino establishment. The non-gaming sections may include a casino restaurant, a casino shop, a casino theater, a casino bar and/or a casino showroom.

The non-gaming activity player tracking unit may be configured for placement proximate the entrances and exits of selected, respective non-gaming sections of the casino establishment to detect at least one of an entrance and an exit of the respective customer into and out of the respective non-gaming section.

The database may include a management program to update the patron movement of the respective customers in said casino establishment over a time period. The player tracking media may comprise Radio Frequency (RF) enabled smart cards configured to generate an RF signal. The wireless interface may comprise an RF receiver responsive to said RF signal.

Other embodiments of the invention provide a gaming system for communicating with wireless gaming devices and locating wireless gaming devices. The gaming system includes these elements: a plurality of wireless gaming devices capable of generating wireless signals; a plurality of wireless signal receivers capable of receiving the wireless signals wherein at least a portion of the wireless signal receivers are located in gaming machines; and a location server for determining a location of one or more of the wireless gaming devices and for tracking a status of the plurality of wireless gaming devices. The location of the wireless gaming device may be determined using signal triangulation.

BRIEF DESCRIPTION OF THE DRAWINGS

The present invention has other objects and features of advantage which will be more readily apparent from the following description of the best mode of carrying out the invention and the appended claims, when taken in conjunction with the accompanying drawing, in which:

FIGS. 11A-11B are block diagrams of input mechanisms with a non-physical contact data interface of the present invention.

DESCRIPTION OF THE PREFERRED EMBODIMENTS

Figure 1A:
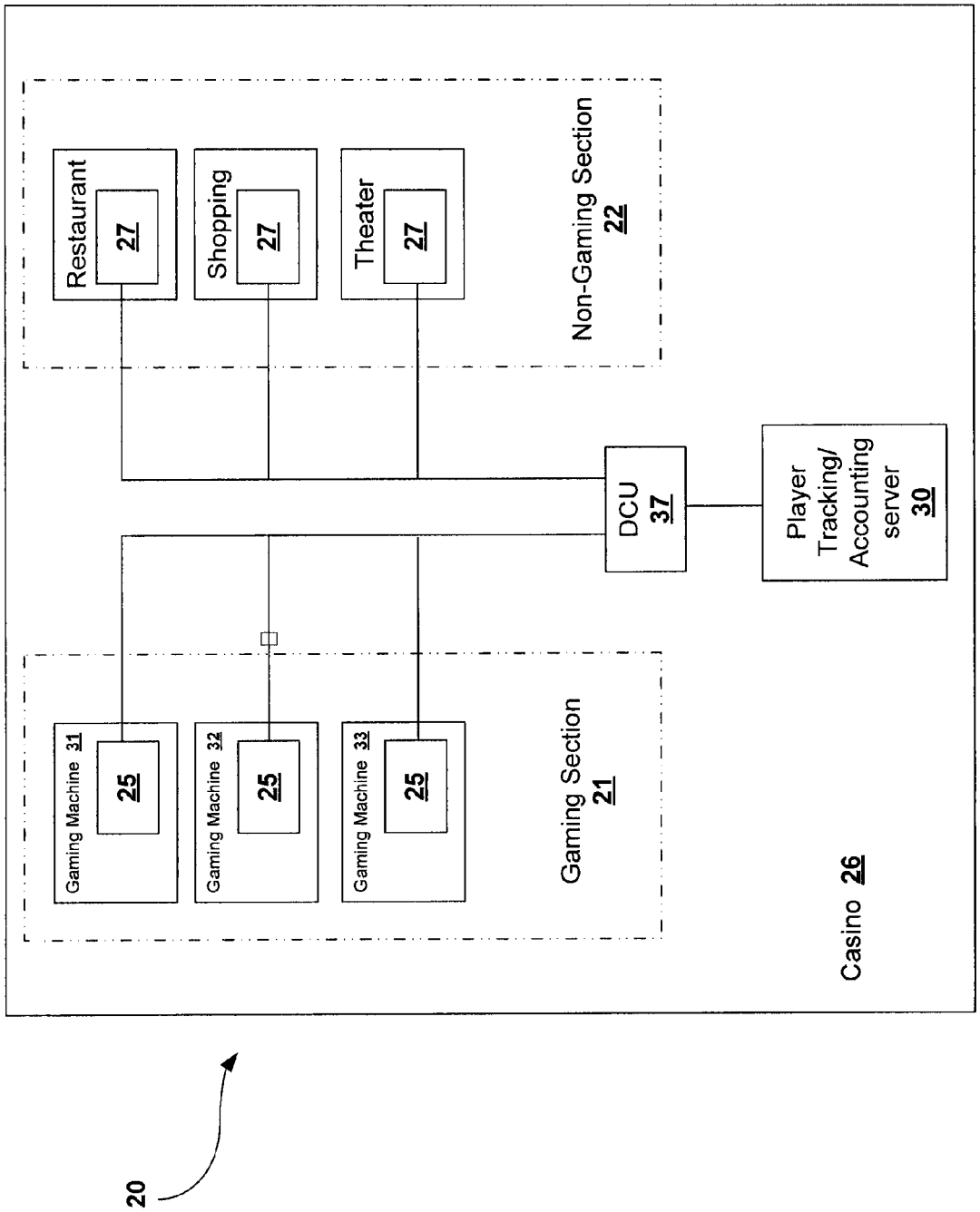
FIG. 1A is a block diagram of a player tracking system constructed in accordance with the present invention having gaming activity player tracking units and non-gaming activity player tracking units.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Among other things, the present invention provides a player tracking system for tracking customer activity for a casino establishment having gaming sections and non-gaming sections. The tracking system includes a plurality of player tracking cards adapted for distribution to respective participating customers of the tracking program. These cards include respective customer IDs which are associated with respective customer accounts. The system further includes a plurality of gaming activity player tracking units positioned in the gaming section of the casino establishment proximate the gaming activity. These activity player tracking units cooperate with the player tracking cards to monitor the gaming activity data of the respective customer. A plurality of non-gaming activity player tracking units are also positioned about the casino establishment in the non-gaming sections thereof which cooperate with the player tracking cards to monitor the non-gaming activity data of the respective customer. A computer system of the player tracking system includes a database of the respective customer accounts associated with respective customer Ids. Each gaming activity player tracking unit and each non-gaming activity player tracking unit is coupled to the computer system to process the respective gaming activity data and non-gaming activity data for each respective customer.

Accordingly, not only is the gaming activity monitored, similar to current player tracking programs, but non-gaming activity is also monitored. Most notably, patron movement throughout the casino establishment is monitored which provides the establishment with a unique ability to maximize customer service and promotions to each customer based upon both the gaming activity data and non-gaming data.

In one specific embodiment, the non-gaming activity player tracking unit includes a wireless interface configured to detect the presence of a respective player tracking card in the local vicinity of the respective non-gaming section of the casino establishment. This device is preferably configured for placement proximate the entrances and exits of selected, respective non-gaming sections of the casino establishment. Thus, the non-gaming activity player tracking unit can detect when a respective customer enters and/or exits a particular respective non-gaming section, such as a casino restaurant, a casino shop, a casino theater, a casino bar or a casino showroom.

In another embodiment, the respective player tracking card is a Radio Frequency (RF) enabled smart card configured to generate an RF signal, and the wireless interface is a Radio Frequency (RF) receiver responsive to the RF signal.

In still another specific configuration, the computer system includes a management program which updates a theoretical win profile for the respective customer as a function of estimated winnings from the betting activity of the customer at the casino establishment over a time period.

In another aspect of the present invention, a method is included for tracking customer activity at a casino establishment having gaming sections and non-gaming sections, at a casino establishment having gaming sections and non-gaming sections. The method includes monitoring at least one gaming activity player tracking unit in the gaming section of the casino establishment for gaming activity data by a respective customer; and monitoring at least one non-gaming activity player tracking unit in the non-gaming section of the casino establishment for non-gaming activity data by the respective customer.

The monitoring the at least one gaming activity player tracking unit includes detecting the presence of a respective player tracking card in the local vicinity of the respective non-gaming section of the casino establishment through a wireless interface component of the non-gaming activity player tracking unit.

In another specific embodiment, the method includes placing the non-gaming activity player tracking unit proximate one of an entrance and an exit of a selected, respective non-gaming section of the casino establishment to detect one of the entrance and the exit of the respective customer into and out of the respective non-gaming section. The method may further include tracking patron movement of the respective customers in the non-gaming sections of the casino establishment through the non-gaming activity data, and periodically updating the patron movement of the respective customers in the casino establishment over a time period.

Figure 1B:
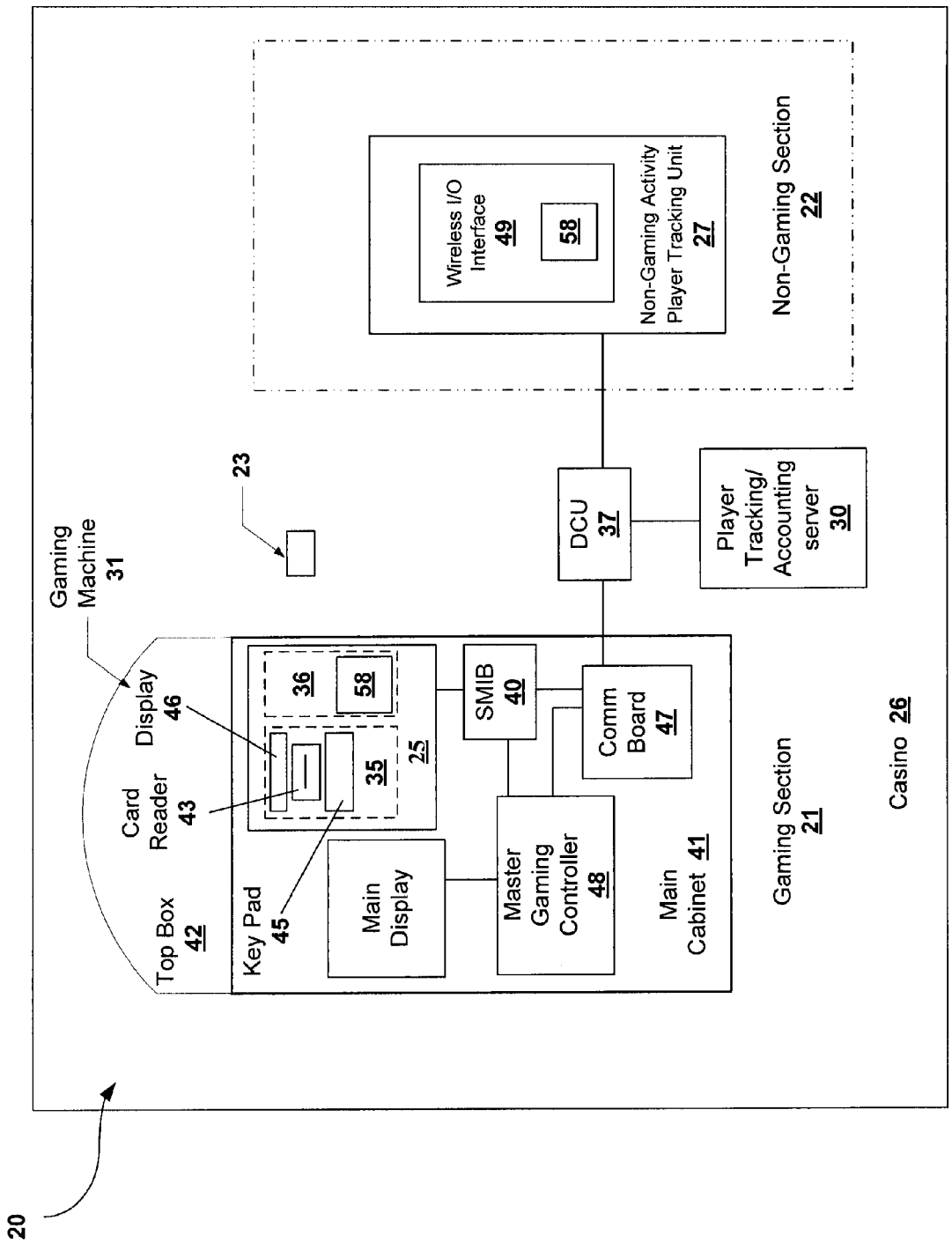
FIG. 1B is a block diagram of the components of the gaming activity player tracking unit and the non-gaming activity player tracking unit of player tracking system of FIG. 1A.

Attention is now directed to FIGS. 1A and 1B where a player tracking system, generally designated 20, is illustrated for tracking customer activity for a casino establishment having gaming sections 21 and non-gaming sections 22. The tracking system 20 includes a plurality of player tracking identification devices 23 adapted for distribution to respective participating customers of the tracking program. These devices 23 include respective customer IDs which are associated with respective customer accounts. The system 20 further includes a plurality of gaming activity player tracking units 25 positioned in the gaming section 21 of the casino establishment 26. These activity player tracking units 25 cooperate with the player tracking identification devices 23 to monitor the gaming activity data of the respective customer. A plurality of non-gaming activity player tracking units 27 are also positioned about the casino establishment 26 in the non-gaming sections 22 thereof which cooperate with the player tracking identification devices 23 to monitor the non-gaming activity data of the respective customer. A computer system, generally designated 28, of the player tracking system 20 includes a database of the respective customer accounts associated with respective customer Ids. Each gaming activity player tracking unit 25 and each non-gaming activity player tracking unit 27 is coupled to the computer system 28 to process the respective gaming activity data and non-gaming activity data for each respective customer.

Accordingly, this tracking system would enable the casino establishment to monitor both gaming activity and non-gaming activity within the casino. The conventional monitoring of gaming activity is well known, and has been successfully applied throughout the industry. Extending such monitoring to other non-gaming activity, however, is relatively new, but may prove to be just as valuable to increase revenue. For example, the non-gaming activity player tracking units 27 can be adapted to monitor the entrance and/or the exit of the patron in the non-gaming section 22 of the casino establishment. Thus, one form of non-gaming activity monitoring would be the tracking of patron movement throughout the establishment in such non-gaming avenues of the casino as theater, shopping and restaurants. By recording the time of entrance and exit of a patron in a particular store or restaurant, the casino establishment can monitor and analyze their tendency to shop particular stores or frequent particular restaurants. Using the combined gaming activity data and non-gaming activity data, promotions and customer service programs can be more customized toward the respective customer. monitored which enables the casino establishment to better customize promotional awards to the respective customer based upon their past attendance at the particular non-gaming sections.

By way of example, if the non-gaming activity data revealed that a particular patron frequently visited one of the many casino restaurants or shops more than another, future promotions could of that restaurant could be directed to that patron to entice future patronage. Moreover, other promotions from other casino restaurants or stores can be directed toward that respective customer to entice patronage at those the customer does not frequent. The ability for casinos to track the activity of card carrying patrons through their entire visit to casinos would provide the establishment with a tremendous increase in data for demographic study. Casinos, for instance, could better estimate how long it takes for a patron to begin gambling after they have entered the property. In other situations, the establishment could identify which restaurants, shops, etc. that card-carrying patrons more frequently visit even if they use cash for purchases. It would literally add another level to focusing casino operations and marketing on maximizing patron behaviors. In addition, it could add another level to customer service.

In still other applications, the player tracking system 20 could identify the participating patron through their player tracking identification device as they entered a restaurant or shop. A host or sales consultant could then approach and greet that patron by name, offer Comps or promotions to VIP's, know what products interest them, etc.

Referring to FIG. 1B, the block diagram is provided which broadly illustrates the computer system 28 of the player tracking system 20 having a central player tracking/accounting server 30. The player tracking account server is typically configured to A) store player tracking account information relating to a player's previous game play, B) store player tracking account information relating to a player's historical frequency (E.g., the date and time spent) in the selected non-gaming sections of the casino, C) calculate player tracking points based on a player's game play that may be used as basis for providing rewards to the player; and D), calculate player tracking points and promotions based on a player's frequency at the selected non-gaming sections. The system is further defined, as mentioned, by a plurality of gaming activity player tracking units 25 to monitor the gaming activity data received from their corresponding gaming activity interfaces. This gaming activity component, as will be described, is essentially provided by conventional player tracking technology.

Further coupled to the player tracking server, in accordance with the present invention, is a plurality of non-gaming activity player tracking units 27 which monitor the non-gaming activity data received from corresponding non-gaming activity interface positioned at the corresponding sections.

As mentioned, the present invention includes a conventional gaming activity component of the player tracking system similar to those currently in widespread application. Briefly, as illustrated in FIG. 1A, the block diagram of a number of gaming machines with gaming activity player tracking units is illustrated connected to servers providing player tracking services. For example, in casino establishment 26, gaming machines 31, 32 and 33 are connected, via the data collection unit (DCU) 37 to the computer system or player tracking/accounting server 30. The DCU 37, which may be connected to up to thirty-two (32) gaming activity player tracking units as part of a local network in a particular example, consolidates the information gathered from player tracking units in gaming machines 31, 32 and 33 and forwards the information to the player tracking account server 30.

In gaming machine 31 of casino establishment 26, a gaming activity player tracking unit 25 and slot machine interface board (SMIB) 40 are mounted within a main cabinet 41 of the gaming machine. In many types of gaming machines, the player tracking unit is mounted within a top box 42 positioned stop the gaming machine cabinet 41. Usually, player tracking units, such as 25, and SMIBs, such as 40, are manufactured as separate units before installation into a gaming machine 31.

Typically, the gaming activity player tracking unit 25 includes three player tracking devices: a gaming activity card reader 43; a key pad 45; and a display 46, all mounted within the unit. These player tracking devices are associated with a wired Input/Output Interface 35, and are used to input player tracking information that is needed to implement the player tracking program. As will be described in greater detail below, the player tracking unit 25 may include a wireless Input/Output Interface 36 as well. The gaming activity component of player tracking system 20 may be mounted in many different arrangements depending upon design constraints such as accessibility to the player, packaging constraints of a gaming machine and a configuration of a gaming machine. For instance, the player tracking devices may be mounted flush with a vertical surface in an upright gaming machine and may be mounted flush or at a slight angle upward with a horizontal in a flat top gaming machine.

The gaming activity player tracking unit 25 communicates with the player tracking server via the SMIB 40, a main communication board 47 and the DCU 37. The SMIB 40 allows the player tracking unit 25 to gather information from the gaming machine 31 such as an amount a player has wagered during a game play session. This information may be used by the player tracking server 30 to calculate player tracking points for the player. The gaming activity player tracking unit 25 is usually connected to the master gaming controller 48 via a serial connection using a wire serial connector and communicates with the master gaming controller 48 using a serial communication protocol. The serial connection between the SMIB 40 and the master gaming controller 48 may be through the main communication board 47, through another intermediate device or through a direct connection to the master gaming controller 48. In general, communication between the various gaming devices is provided using wire connectors with proprietary communication protocols. As an example of a proprietary serial communication protocol, the master gaming controller 48 may employ a subset of the Slot Accounting System (SAS protocol) developed by International Game Technology of Reno, Nev. to communicate with the player tracking unit 25.

In one particular embodiment, by way of example, when a game player desires to play a game on a gaming machine and utilize the gaming activity component of player tracking system 20 available through the player tracking unit, a game player inserts their issued player tracking identification device 23, such as a magnetic striped card, into the card reader 43. Briefly, for current player tracking programs, the most common approach for providing identification information is to issue a magnetic-striped card storing the necessary identification information to each player that wishes to participate in a given player tracking program. It will be appreciated, however, as will be better described below, that the issued player tracking identification device 23 may be wireless interfaces such as Radio Frequency (RF) enabled smart cards and/or wireless Personal Digital Assistants (PDA) which enable wireless communication with the player tracking server. Accordingly, wireless communication may be provided for both the gaming activity player tracking unit 25 and the non-gaming player tracking unit 27.

After the magnetic striped or smart card has been so inserted, the gaming activity player tracking unit 25 may detect this event and receive certain identification information contained on the card. For example, a player's name, address, social security number and player tracking account number encoded on the magnetic striped card, may be received by the player tracking unit 25. In general, a player must provide identification information of some type to utilize player tracking services available on a gaming machine.

Once the player has inserted her or his player tracking card into the gaming activity card reader 43, the player tracking unit 25 may command the touch screen display 46 to display the game player's name on the touch screen display 46 and also, may optionally display a message requesting the game player to validate their identity by entering an identification PIN code using a game service interface with an alpha-numeric key pad displayed on touch screen display 46 or through a player tracking input keypad. For example, the player may use their finger, a stylus or combinations thereof to enter their identification information using the touch screen sensor. Once the game player's identity has been validated, the player tracking information is relayed to the player tracking server 30. Typically, the player tracking server 30 stores player tracking account records including the number of player tracking points previously accumulated by the player. Using this gaming activity data, the casino establishment may monitor their gaming activity for future promotions and customer service. Some player tracking systems, for example, incorporate management programs which update and calculate theoretical win profiles for each respective customer. These profiles are generally a function of estimated winnings from the betting activity of the customer at the casino establishment over a time period.

Details of player tracking units with peripheral devices operated by a master gaming controller are described in co-pending U.S. patent application Ser. No. 09/838,033, filed Apr. 19, 2001, by Criss-Puskiewicz, et al, titled "Universal Player Tracking System," which is incorporated herein in its entirety and for all purposes and co-pending U.S. patent application Ser. No. 09/642,192, filed Aug. 18, 2000, by LeMay, et al, titled "Gaming Machine Virtual Player Tracking Services," which is incorporated herein in its entirety and for all purposes. Moreover, details of player tracking systems with wireless player tracking identification devices are described in co-pending U.S. patent application Ser. No. 09/921,489, filed Aug. 3, 2001, by Hedrick, et al, titled "Player Tracking Communication Mechanisms in a Gaming Machine" which is incorporated herein in its entirety and for all purposes With respect to the non-gaming player tracking unit 27 (FIG. 1B), wireless communication is necessary to maintain any ability to monitor patron movement throughout the non-gaming sections 22 of the casino establishment without inconveniencing the customer. Thus, the non-gaming activity player tracking unit 27 of the tracking system includes a wireless interface 49 configured to locally communicate with the respective wireless identification device 23 issued to that customer. In this manner, movement of the patron can be detected and tracked in the selected non-gaming sections of the casino establishment without requiring a manual input device in the that section. By placing the wireless interfaces at or in the vicinity of the entrances and exits of the selected non-gaming section, the entry into and exit, as well as the time of entry and exit from that non-gaming section can be monitored.

The wireless interface 49, therefore, may be applied to detect or communicate with the identification device 23 carried by the player. These wireless identification devices 23, as mentioned, maybe provided by a Radio Frequency (RF) enabled smart card 50, which has a footprint about the size of a player tracking card, or a portable wireless device, such as a Personal Digital Assistant (PDA) carried or worn by the player. Accordingly, when a patron is in a non-gaming section 22 of the casino, the respective wireless interface 49 may automatically detect the player tracking identification device 23 carried by the player (or they may automatically detect each other) to establish communications allowing presence detection and/or allowing gaming information to be transferred between the wireless devices.

By way of example, the wireless interface 49 may use a wireless communication standard such as Bluetooth™ to communicate with portable wireless devices using the same standard. It will be appreciated, however, that other wireless communication protocols such as IEEE 802.11a, IEEE 802.11b, IEEE 802.11x (e.g. other IEE802.11 standards), hiperlan/2, and HomeRF may also be used. Bluetooth devices communicate on a frequency of 2.45 Gigahertz. Typically, Bluetooth devices send out signals in the range of 1 milliwatt. The signal strength limits the range of the devices to about 10 meters and also limits potential interference sources. Interference is also limited by using spread-spectrum frequency hopping. For instance, a device may use seventy-nine (79) or more randomly chosen frequencies within a designated range that change on a regular basis up to 1,600 times a second. Thus, even if interference occurs, it is likely only to occur for a short period of time.

When Bluetooth-capable devices come within range of one another, an electronic conversation commences to determine whether they have data share or whether one needs to control the other. The connection process is performed automatically. Once a conversation between the devices has occurred, the devices form a network. Bluetooth systems create a Personal-Area Networks (PAN) or "piconets". While the two or more devices in a piconet remain in range of one another, the distances between the communications devices may vary as the wireless devices are moved about. Once a piconet is established, such as between the wireless interface 49 and a portable wireless device, the members of the piconet randomly hop frequencies in unison so they remain in touch with another and avoid other piconets that may be operating in proximity to the established piconet. When Bluetooth is applied in a casino environment, many such piconets may be operating simultaneously. Details of the Bluetooth™ standard and the Bluetooth™ special interest group may be found at www.bluetooth.com.

The wireless interfaces 49, therefore, should only be capable of local detection of the player tracking identification devices 23 so that the wireless player tracking units at adjacent non-gaming sections, or even the same section, will not improperly detect the presence of the patron. Preferably, such localized detection should be within the range of about 0.0 feet to about 10.0 feet, and more preferably in the range of about 3.0 feet of the entrances into selected restaurants, shops, bars, nightclubs, theaters or any other strategic locations throughout the casino establishment 26.

There are several conventional types of wireless technologies which may be applied for wireless identification devices. For example, these include the Radio Frequency Identification (RFID) Systems such as the Ti-FRID systems provided by Texas Instruments Incorporated of Dallas, Tex., and the contactless smart cards by Fargo Electronics, Inc. of Eden Prairie, Minn.

Figure 1C:
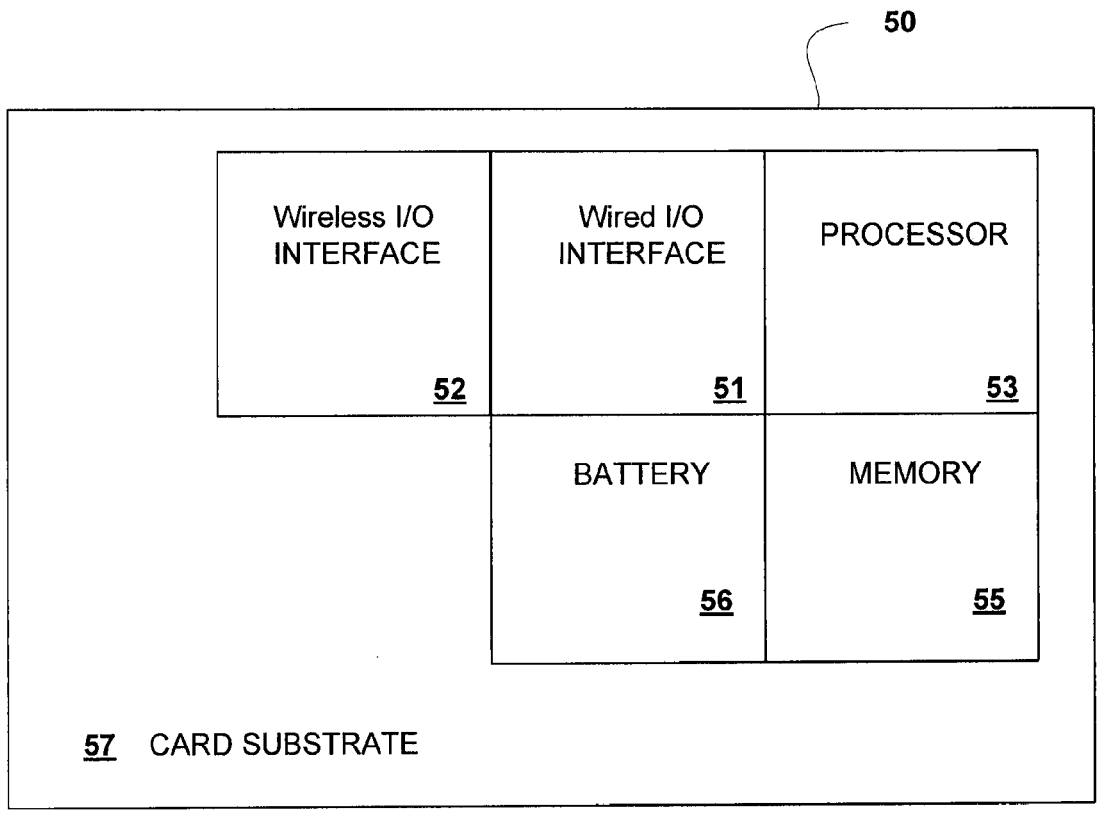
FIG. 1C is a block diagram of the components of a Radio Frequency enabled smart card.

As mentioned, one particularly suitable technology is a Radio Frequency (RF) enabled smart card which can be applied in both the gaming activity tracking unit 25, and the non-gaming tracking unit 27. For instance, FIG. 1C illustrates a block diagram of the components of a smart card 50 that may be used in the present invention. The RF enabled smart card may be designed for wired or wireless use with a gaming machine, gaming peripheral, gaming terminal or some other gaming device, or use with the wireless interface 49 of the tracking unit 27 situated in the non-gaming section 22 of the casino. The smart card 50 which preferably has the same footprint as a magnetic striped card and may include a wired input/output interface 51, a wireless input/output interface 52, a processor 53, memory 55 and a battery 56 incorporated in some manner on a card substrate 57. The battery 56 is used to supply power to operate the devices on the smart card 50. In some embodiments, when it is inserted into a smart card reader of some type, power may also be supplied to the card by the smart card reader. The smart card 50 may include an operating system of some type that is used to run applications on the smart card. In some embodiments, the operating system for the smart card 50 may be provided by Microsoft (Redmond, Wash.) or Sun Microsystems of Palo Alto, Calif. The operating system may be used to manage the execution of gaming applications on the smart card. The operating system and gaming applications may incorporated into the processor 53 as firmware, stored in the memory 55 on the smart card or may be implemented as a combination of firmware in the processor 53 and stored in the memory 55. The processor 53 may be a general purpose microprocessor or a custom microcontroller incorporating gaming specific firmware. The memory 55 may be flash memory.

The wired Input/output interface 51 may be an I/O EEPROM or the like that allows the smart card 50 to communicate with a smart card reader, such as card reader 43 in FIG. 1B. Further, the I/O interface 51 may include one or more communication protocols that allow the smart card 50 to communicate directly with a gaming machine, gaming peripheral, gaming terminal or some other gaming device designed to communicate with the smart card. Some communication protocols may be stored in the memory 55 of the smart card 50. The communication protocols stored in the memory 55 may be added or deleted from the smart card 50 as needed.

In contrast, the wireless Input/output or Input interfaces 49, 36 may be provided by a wireless smart card reader 58 which permits the smart card 50 to communicate with the non-gaming activity player tracking unit 27, and/or the gaming activity player tracking unit 25 residing on a gaming machine, a gaming peripheral, a gaming terminal or some other gaming device designed to communicate with the smart card. This wireless I/O interface 49, 36 may include one or more wireless communication protocols, such as the wireless communication standard Bluetooth™ described above, that allow the smart card 50 to communicate with the corresponding wireless smart card reader 58. Some communication protocols may be stored in the memory 55 of the smart card 50, and may be added or deleted from the smart card 50 as needed.

In accordance with the present invention, the wireless smart card readers 58 of non-gaming activity player tracking units 27 are preferably provided by strategically positioned around the casino establishment to track and monitor movement of the player tracking participating customers. In particular, for casino non-gaming sections 22 such as restaurants, shops, theaters, bars or showrooms, the wireless smart card readers 58 are positioned proximate the entrances and/or exits into and out of the respective sections. Similar to department store security devices, these localized radio receivers may include two cooperating detector devices adapted for placement on opposed sides of each entrance/exit. When a patron carrying an RF enabled smart cards passes between the opposed detectors, their entrance/exit from the non-gaming section can be recorded.

Concepts important to many embodiments of this invention include "loyalty points," "loyalty point sessions," and "loyalty points initiation events." Loyalty points refers to any type of points accrued for participating in designated activities at a gaming establishment. Such establishments include casinos, hotels where gaming activities are provided, stores where gaming activities are permitted, Internet-based gaming activities, and the like. Designated activities include, but are not limited to, gaming activity such as playing gaming machines, card games such as black jack, pai gow poker, baccarat and poker, betting on public event outcomes, table games such as roulette, craps, keno and lotteries, etc. Other patronage activities at gaming establishments may accrue loyalty points. As indicated above, loyalty points represent a form of credit accrued for patronage. The points can be redeemed for a variety of goods or services (or translated to other forms of credit) within a gaming establishment or affiliated establishment. Player tracking points are a typical example of "loyalty points."

Loyalty point sessions are sessions during which a person is performing the designated activity and during which loyalty points accrue. Such session may be delineated by a first event and a second event (such as the "game events" described above). Importantly, loyalty point sessions can be triggered or initiated by events that need not involve conventional player tracking initiation events (e.g., insertions of player tracking cards). Thus, the person can begin accruing loyalty points even if he/she forgets to insert his/her player tracking card or otherwise fails to initiate a conventional player tracking session. Further, it is possible that the entire process is performed anonymously so that the gaming establishment never knows who is accruing the loyalty points—or at least not via a conventional player tracking methodology.

Because loyalty points sessions may begin without a conventional player tracking initiation event, a more general concept must be applied to initiation of loyalty points sessions. Preferably such initiation can be automatically detected by a gaming machine or other mechanism at a gaming establishment. (Note however that some activities such as black jack may require that a dealer or other person manually initiate the session.) Examples of events that trigger accrual of loyalty points include a player beginning to play a particular gaming machine, a player providing cash or indicia of credit to a gaming machine, a user actuating a mechanism allowing anonymous gaming activity, etc. Examples of events that can indicate the end of a loyalty points session include winning a jackpot or other conventional gaming award, a user actuating a mechanism indicating an end to the gaming activity, detecting that a particular period of inactivity has elapsed, etc.

Figure 2:
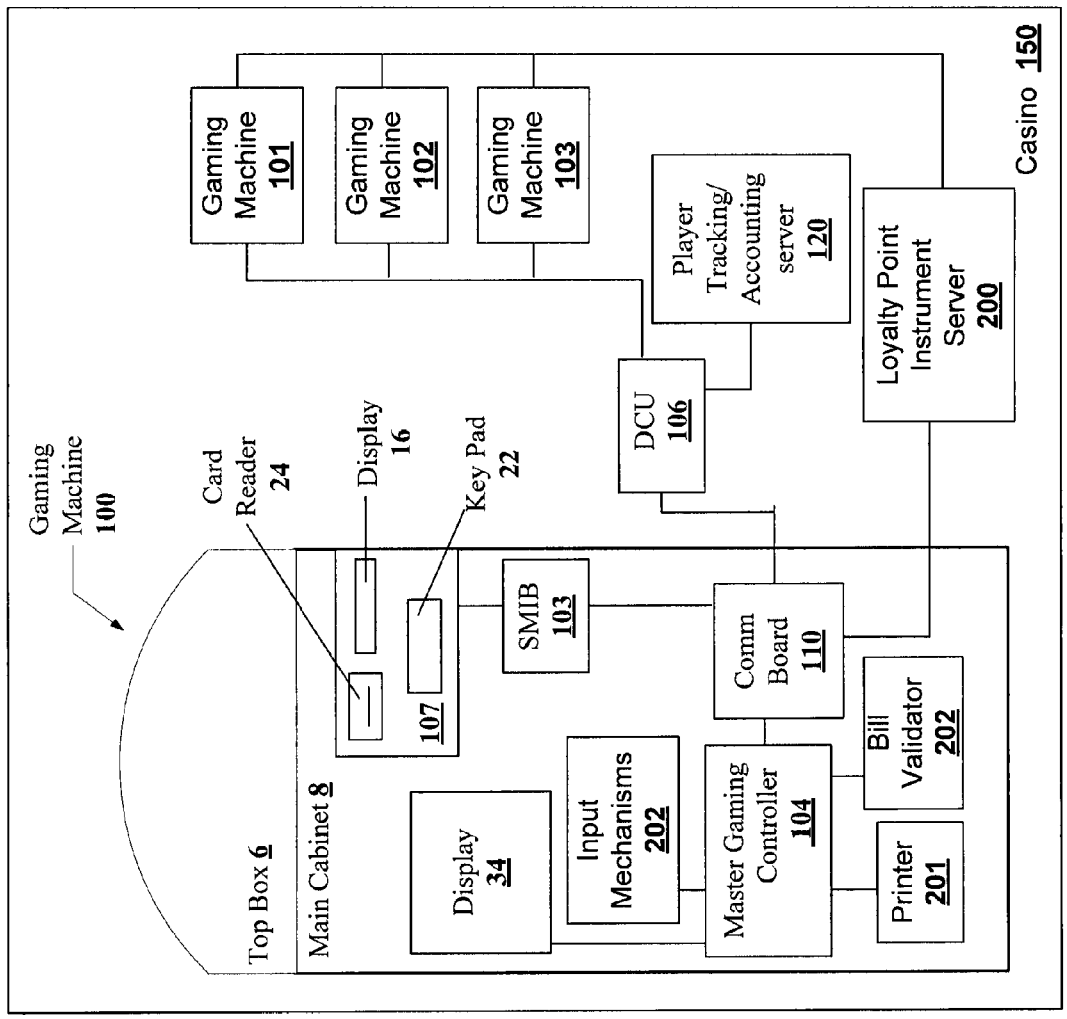
FIG. 2 is a block diagram of a gaming machine connected to a player tracking server and a loyalty program server allowing loyalty program instrument transactions.

FIG. 2 is a block diagram of gaming machines 100, 101, 102 and 103 connected to a player tracking server 120 and a loyalty program instrument server 200 allowing loyalty program instrument transactions. With the present invention, without providing a player tracking card, player tracking information or any other type of identification information, a player may initiate a game play session on gaming machine 100, play a number of games and receive loyalty points, such as player tracking points. The player may or may not have a player tracking account with the gaming establishment such as casino 150. Note that the "game play session" described here serves as an example of a loyalty points session.

For instance, the player may insert a bill or a bar-coded printed ticket (e.g. an EZPAY™ ticket) into bill validator 202 to register credits on the gaming machine. When credits are registered on the gaming machine 100, a logic device located on the gaming machine 100, such as master gaming controller 104 or a logic device located the player tracking unit 107, may begin to generate loyalty points, such as player tracking points. As another embodiment, when credits are registered on the gaming machine 100, a remote logic device such as a logic device on the player tracking accounting server 120 or a logic device on the loyalty program instrument server 200 may begin to accrue loyalty points. Next, the player, using input mechanisms 202, may make wagers on a number of games presented on the gaming machine and view the game outcomes on display 34. Based upon a manner in which the player participates in game play on the gaming machine 100, such as the amount wagered over a specific period of time, loyalty points may be awarded to the player. A rate at which the player accrues loyalty points may be adjusted according to the following parameters (without limitation thereto): 1) the time of the day, 2) the day of the week, 3) month of the year, 4) a total amount wagered, 5) an amount of time spent playing, 6) a game denomination, 7) a promotional event and 8) a game type.

The amount of loyalty points awarded to the game player is calculated by a logic device located on the gaming machine, by a remote gaming device or combinations thereof. When the logic device used to calculate the awarded loyalty points is located remotely, the master gaming controller 104 may transfer certain gaming machine information, such as wager amounts, to the remote logic device. For instance, when the player tracking account server 120 or the loyalty program server 200 calculates the amount of loyalty points awarded during a particular game play session, the master gaming controller 104 may send game play information to these remote gaming devices. In some embodiments, game play information used to calculate loyalty point awards may be sent from the gaming machine to the player tracking server 120 through the player tracking unit 107 or the information may be sent directly to the loyalty program instrument server 200. In other embodiments, the master gaming controller 104 may calculate the loyalty points awarded during a game play session. Thus, the transfer of game play information to a remote gaming device may not be required.

At the end of the player's game play session, the amount of loyalty points awarded to the player may be stored on a loyalty point instrument such as a printed ticket, a smart card, a debit card, a room key or a portable wireless device. For example, the printer 201 may print a ticket voucher showing the amount of loyalty points awarded to the player during the game play session. The player may later validate the ticket to receive the loyalty points. As another example, loyalty points awarded to the player may be stored on a smart card inserted into the card reader 24. In some embodiments, the loyalty point instrument may simply be used as a receipt to ensure that loyalty point credits earned by the player have been correctly credited to their account.

When the loyalty point instrument is issued to the player, various types of transaction information may be recorded on the loyalty point instrument and may also be stored to another memory location on the gaming machine 100, on the loyalty program instrument server 120, on the player tracking server 120 or some other gaming device. Examples of stored transaction information includes an issue time, a date, an instrument number, an instrument type, a machine number, etc., The transaction information stored on the loyalty point instrument and stored at the additional memory location may be compared to validate the loyalty point instrument. For instance, a player may wish to have the loyalty points stored on the ticket voucher to be later credited to their player tracking account or to redeem the points directly for a goods and services item without crediting the player's player tracking account. In some cases, the player may not even have a player tracking account. To credit or to redeem the loyalty points stored on the loyalty point instrument, the transaction is first validated. Specific examples of the loyalty point instrument validation process and other uses of loyalty point instruments are described with respect to FIGS. 3-8.

An advantage of loyalty point instruments of the present invention is that a player may earn loyalty points such as player tracking points from game play on a gaming machine or during other gaming activities without the use of a player tracking card or without providing any identification information. As indicated above, if a player forgets to bring their player tracking card, loses their player tracking card, brings the wrong card, forgets to insert the card into the gaming machine, inserts the card incorrectly into the card reader or the card reader is malfunctioning, the player may be still earn loyalty points such as player tracking points from a game play on a gaming machine. In current player tracking programs, before a player can receive player tracking points, the player must always provide identification information of some type, which is usually stored on their player tracking card. Thus, in any situation where player tracking identification information is not provided by the player, such as in the cases described above where the information is obtained from a player tracking card, the player does not earn player tracking points. These situations are avoided with the present invention.

Figure 3:
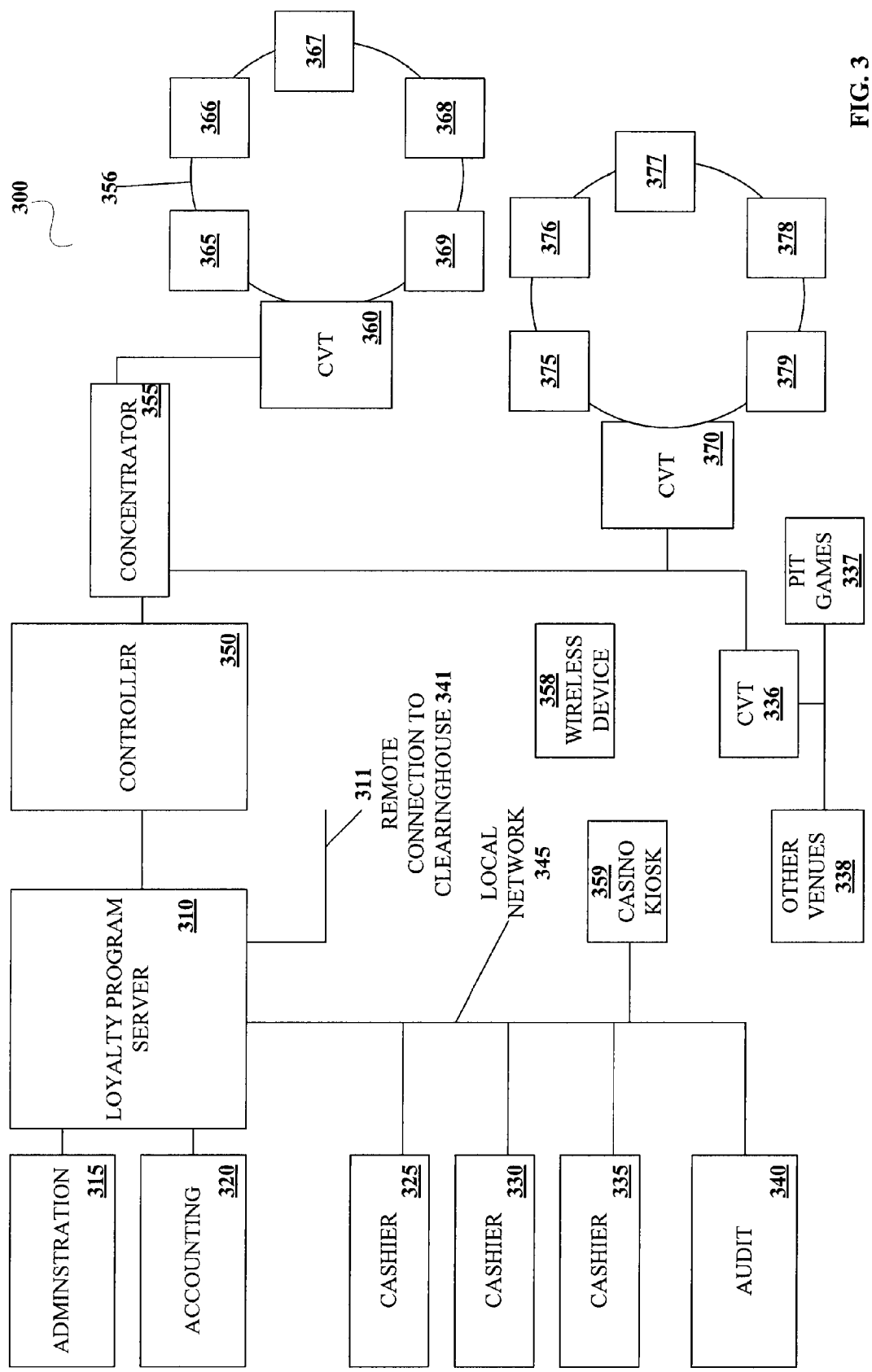
FIG. 3 is a block diagram of the components of a loyalty program instrument system for one embodiment of the present invention.

FIG. 3 is a block diagram of the components of a loyalty program instrument system for one embodiment of the present invention. A loyalty program instrument system is the hardware components and software components needed to generate and validate loyalty program instruments. Components of an loyalty program system may include 1) data acquisition hardware, 2) data storage hardware, 3) loyalty program instrument generation and validation hardware (e.g. printers, card readers, ticket acceptors, validation terminals, etc.), 3) auditing software, 4) loyalty program instrument validation software and 5) database software. Many types of loyalty program instrument systems are possible and are not limited to the components listed above. A loyalty program instrument system may be installed at each property utilizing loyalty program instruments. To allow multi-site validations of loyalty program instruments, the loyalty program instruments systems at each property may be linked to a loyalty program transaction clearinghouse. The relation of multiple loyalty program instrument systems connected to a loyalty program transaction clearinghouse are described with reference to FIGS. 4 and 5. The details of the generation and the validation of loyalty program instruments using a loyalty program instrument system at one property are described below with reference to FIG. 3.

In some embodiments of the present invention, the loyalty program instrument system may be implemented in conjunction with a cashless system that generates cashless instruments. Thus, a single instrument generation site may issue both cashless instruments and loyalty program instruments. For example, a gaming machine may issue printed tickets with a cash value that may be redeemed for cash or gaming credits as part of a cashless system or a gaming machine may issue printed tickets with a loyalty point value or a prize value that may be redeemed for goods and services as part of a loyalty program instrument system. Further, a single generation site may issue a plurality of different instrument types for cashless transaction and loyalty program transaction such as but not limited to smart cards, printed tickets, magnetic striped cards, room keys and portable wireless devices. In addition, a single validation site may accept and validate both cashless instruments and loyalty program instruments such as but not limited to smart cards, printed tickets, magnetic striped cards, room keys and portable wireless devices. An example of a cashless system that may be modified to implement both cashless instruments and loyalty point instruments with the present invention is the EZPAY™ system manufactured by IGT of Reno, Nev.

Details of apparatus and methods used to validate a cashless instruments and that may be applied to the validation of a loyalty point instruments are described in co-pending U.S. application Ser. No. 09/544,884 by Rowe et al. filed Apr. 7, 2000 entitled "Wireless Gaming Environment" which is incorporated herein in its entirety and for all purposes. Details of apparatus and methods used to validate a cashless instrument across multiple gaming properties and may be applied to the validation of a loyalty point instrument across multiple gaming properties are described in co-pending U.S. application Ser. No. 09/684,382 by Rowe filed Aug. 25, 2000 entitled "Cashless Transaction Clearinghouse" which is incorporated herein in its entirety and for all purposes. Details of apparatus and methods of using a smart card as a cashless instrument, at a single gaming property or across multiple gaming properties, that may be applied to the use of a smart card as a loyalty point instrument, at a single gaming property or across multiple gaming properties, are described in co-pending U.S. application Ser. No. 09/718,974 by Rowe filed Nov. 22, 2000 entitled "EZPAY™ Smart Card and Ticket System" which is incorporated herein in its entirety and for all purposes. Details of providing secure transactions for a cashless system which may applied to a loyalty program instrument system are described in co-pending U.S. application Ser. No. 09/660,984 by Espin et al. filed Sep. 13, 2000 entitled "Transaction Signature" which is incorporated herein in its entirety and for all purposes.

Returning to FIG. 3, a first group of gaming machines 365, 366, 367, 368, and 369 is shown connected to a first clerk validation terminal (CVT) 360 and a second group of gaming machines, 375, 376, 377, 378 and 379 is shown connected to a second CVT 370. The clerk validation terminals are used to store loyalty program transaction information generated when a loyalty program instrument is issued at a generation site such as a gaming machine. The loyalty program transaction information, which may be stored each time a loyalty program instrument is issued, may include but is not limited to prize information, loyalty point information, an establishment, a location, a bar code, a instrument type (e.g. ticket, smart card, room key, magnetic card, portable wireless device, etc.), an issue date, a validation number, an issue time, an instrument number, an instrument sequence number and a machine number. Also, the loyalty program transaction information may include transaction status information such as whether the loyalty program instrument has been validated, is outstanding or has expired. Some of the loyalty program transaction information stored in the CVT may also be stored on the loyalty program instrument as loyalty program instrument information. When a loyalty program instrument is validated. the information stored in the CVT and the information stored on the loyalty program instrument may be compared as a means of providing secure loyalty program transactions.

As described with reference to FIG. 2, all of the gaming machines are designed or configured to accrue loyalty points during a game play session, award a player some or all of the accrued loyalty points and store loyalty program information to a loyalty program instrument, such as a printed ticket, a magnetic striped card, a room key, a portable wireless device or a smart card, which is issued to the game player. The loyalty program instruments, as part of a loyalty program available at property 300, may be redeemed for goods and services. In addition, the gaming machines and other loyalty program validation sites at property 300 may accept loyalty program instruments issued at a different property from property 300 where the different property utilizes the same or a different loyalty program instrument system as compared to property 300. Details of a multi-site loyalty program instrument system are described with respect of FIGS. 6 and 7.

A player may participate in a number of activities at the gaming establishment of property 300 for which the player can earn loyalty points. For instance, loyalty points may be earned while playing a game of chance at pit games 337, while playing one of the gaming machines, or while making a food purchase, an entertainment purchase, a transportation purchase, a lodging purchase, a merchandise purchase or a service purchase at one of the other venues 338 at property 300. Further, food purchases, entertainment purchases, transportation purchases, lodging purchases, merchandise purchases and service purchases that earn loyalty points for a patron may be made at venues outside of traditional gaming establishments but in affiliation with a gaming establishment. For instance, a patron may make a food purchase at a restaurant affiliated with a gaming establishment or may make merchandise purchase with a retailer affiliated with the gaming establishment. After their purchase, the patron may be issued a loyalty point instrument with a number of loyalty points that may be redeemed for goods, services and comps or may be later added to a loyalty point account of the patron. Affiliated venues that issue loyalty point instruments may be linked to a loyalty program server, such as 310, via the Internet (see FIG. 7).

As another example, a player, without providing identification information such as player tracking information or comp information, may be identified at a pit game. After rating the players manner of game play over a certain period of time (e.g. amount bet), the player may be awarded a loyalty point instrument storing loyalty points, such as a printed ticket, earned during their pit game play. The loyalty point instrument may be later exchanged by the player for a comp, such as free meal at casino buffet. In another embodiment, when player comp information has been provided by the player, the loyalty point instrument may be used as a receipt that is designed to allow the player to verify that their game play has been both correctly rated and correctly entered into the comp system.

After each activity, a player may be issued 1) a new loyalty program instrument storing the loyalty points earned for the activity or 2) an existing loyalty program instrument may be updated to store additional loyalty points. For instance, the existing loyalty program instrument may be, a smart card, already storing loyalty points earned from previous activities. The smart card may be modified to store additional loyalty points after each new activity. Accumulated loyalty points earned by a player and stored on a loyalty program instrument may be used to obtain goods, services and comps at various loyalty program validation sites at property 300, such as but not limited to: i) gaming machines, ii) cashier stations 325, 330, 335, iii) a casino kiosk 359, iv) from a casino service person with a hand-held wireless device 358 and v) at a clerk validation terminal 360 or 370.

In general user interfaces for viewing and modifying loyalty point accounts may be displayed on many different types of computing devices such as gaming machines, personal digital assistants, home computer linked to remote site via the Internet, a kiosk located in a casino, a phone and a video display interface. In one embodiment, a video display interface may be a television monitor located in a hotel room. The hotel rooms may be linked by a local intranet to the loyalty program server 310. A touch screen, control pad or some other input device may be used with the television monitor to provide input to the loyalty point account user interface.

A game player may wish to use a loyalty program instrument issued during one activity during another activity at property 300. For example, a game player may participate in a pit game 337 such as craps, roulette, black jack, etc. and may be issued a loyalty point instrument, such as a printed ticket, with a number of loyalty points based upon the manner in which they participated in the activity such as an amount wagered over a particular amount of time. Next, the player may desire to use the loyalty point instrument during another activity such as a game play session on one of the gaming machines 365, 366, 367, 368, 369, 375, 376, 377, 378 and 379. After the loyalty point instrument has been validated, as described below, the loyalty points stored on the loyalty point instrument may be used by the player to redeem prizes, goods, or services available on the gaming machine. In one embodiment, for promotional purposes, only particular prizes, goods or services may be available on particular gaming machines to encourage game play of those machines. In another embodiment, a player may redeem loyalty points stored on a loyalty point instrument to access a special bonus features or game play features on a gaming machine. For example, after the play has been issued a printed ticket with loyalty points during one activity, the player may initiate a game play session on a gaming machine by entering the printed ticket into a bill validator on the gaming machine. After ticket has been validated, as described below, some or all of the loyalty points stored on the printed ticket may be used to access a special bonus game or a special game play feature available on the gaming machine such as a chance to win a special jackpot. For instance, a player may commit five hundred loyalty points earned from a lodging purchase, stored on a loyalty program instrument, to activate a bonus feature on a gaming machine.

In yet another embodiment, for convenience, a player may desire to combine loyalty points earned from a plurality of activities, such as gaming machine play, pit game play, merchandise purchases, etc., and stored on multiple loyalty program instruments onto a single loyalty program instrument. For example, a player may be issued a printed ticket or another type of loyalty program instrument from a gaming machine after a first game play session. At beginning of a second game play session, on the same or a different gaming machine, the player may insert the printed ticket into the gaming machine. After validating the ticket, the gaming machine may add any loyalty points stored on the ticket to any loyalty points earned by the player during the second game play session and issue a new loyalty point instrument, such as a printed ticket, with combined loyalty points.

Since loyalty points may be redeemed for goods and services, the loyalty points may be considered as having a "cash value" of some type. Thus, since the loyalty points have a "cash value", it is important to prevent fraud, such as validating a single ticket multiple times or validating a duplicate copy of an already validated ticket, and to provide accounting means for tracking unvalidated and validated tickets. To prevent fraud and to provide accounting for loyalty program instruments, generation sites and validation sites for loyalty point instruments, such as but not limited gaming machines, casino kiosks, cashier stations, clerk validation terminals, pit games and wireless gaming devices, may 1) when a loyalty program instrument is generated at generation site, store loyalty program transaction information to both the loyalty program instrument and to a memory location separate from the loyalty program instrument and 2) when a loyalty program instrument is validated, loyalty program transaction information stored on the loyalty program instrument may be compared with loyalty program transaction information previously stored at the memory location.

In one embodiment of the present invention, a clerk validation terminal (CVT), such as 336, 360 and 370, may be connected to a number of gaming devices that generate loyalty program instruments and the CVT may store loyalty program transaction information each time a loyalty program instrument is generated by one of the gaming devices connected to the CVTs issues a loyalty point instrument. For instant, CVT 360 is connected to gaming machines, 365, 366, 367, 368 and 369 in ring 356. The gaming machines 365, 366, 367, 368 and 369 may issue printed tickets as a loyalty program instrument. Each time one of the gaming machines issues a printed ticket, loyalty program transaction information describing the loyalty program transaction may be stored to the CVT and printed on the ticket.

When the CVTs are not connected to one another or the gaming machines are not linked together in some manner, a loyalty program instrument from one gaming machine may be only be accepted in another gaming machine which is in a group of gaming machines connected to the same clerk validation terminal. For example, a loyalty program instrument issued from gaming machine 365 might be accepted at gaming machines 366, 367, 368 and 369, which are each connected to the CVT 360, but not in gaming machines 375, 376, 377, 378, and 379, which are each connected to the CVT 370. In an analogous manner, when the cashless systems from one property are not connected together then a loyalty program instrument generated from gaming machine 366 may be not be used at property different from property 300.

The CVTs, 336, 360 and 370, store loyalty instrument transaction information corresponding to the outstanding loyalty program instruments, including ticket vouchers, smart cards and debit cards, that are waiting for redemption. The CVTs may also store cashless instrument transaction information. In this embodiment, the CVTs are separate from the gaming machine. However, the loyalty program transaction information may be also be stored within each gaming machine or one gaming machine may functionally act as a CVT for a group of gaming machines eliminating the need for separate CVT hardware. In addition, loyalty program transaction information may be stored in a loyalty program server 310. As previously described, the loyalty program server may be an EZ PAY™ server that also supports cashless instrument transactions.

As described above, the loyalty program transaction information may be used when the loyalty program instruments are validated in some manner such as for a prize redemption or to credit the points to a loyalty point account. The CVTs 336, 360 and 370 may store the information for the ticket vouchers printed by the gaming machines connected to the CVT. For example, CVT 360 stores ticket voucher information for ticket vouchers printed by gaming machines 365, 366, 367, 368, and 369. When a ticket is printed out or a loyalty point instrument is issued in some other manner, loyalty program transaction information is sent to the CVT using a communication protocol of some type from the gaming machine. For example, the gaming machine may send transaction information to the CVT which is part of the cashless system using the slot data system manufactured by Bally's Gaming Systems (Alliance Gaming Corporation, Las Vegas, Nev.) or the slot acquisition system manufacture by IGT, Reno, Nev.

In present invention, when a player wishes to redeem a ticket or a loyalty program instrument of some other type, the player may redeem vouchers printed from a particular gaming machine at the CVT associated with the gaming machine or any other CVT which is part of the loyalty program instrument system associated with the CVT. For example, since CVT 360 and CVT 370 are connected as part of a single cashless system to the EZ pay server 310, a player may redeem loyalty program instruments or utilize loyalty program instruments at the gaming machines, the CVT's (336, 360 or 370), the cashiers (325, 330 and 335), the casino kiosk 359, the other venues 338 or the wireless cashiers 358. To redeem a loyalty program instrument, the loyalty program instrument is validated by comparing information obtained from the instrument with information stored within the CVT or other gaming devices which behaves functionally as a CVT. After the loyalty program instrument has been redeemed, the CVT marks the instrument paid in a database to prevent an instrument with similar information from being cashed multiple times.

Again, not all loyalty program systems may utilize CVTs, many of the functions of the CVT may be transferred to the cashless server, including the loyalty program server 310, eliminating the transferred function within the CVT. For instance, the cashless instrument transaction information may be stored in the loyalty program server 310 instead of the CVTs. Thus, the need to store loyalty program transaction information within the CVT may be eliminated.

In this embodiment, multiple groups of gaming machines connected to CVTs, such as 355 and 370, and other gaming devices in the other venues 338 and the pit games 337 connected to CVT 336 are linked together in a cross validation network 345. The cross validation network is typically comprised of one or more concentrators 355 which accepts inputs from two or more CVTs and enables communications to and from the two or more CVTs using one communication line. The concentrator 355 is connected to a front end controller 350 which may poll the CVTs for loyalty program transaction information. The front end controller 350 is connected to an Loyalty Program server 310 which may provide a variety of information services for the loyalty program instrument system including accounting 320, administration 315 and loyalty program account maintenance.

In this invention, the loyalty program server is a hardware and a software platform allowing loyalty program instruments to be utilized at all of the loyalty program validation sites (e.g. cashier stations, gaming machines, wireless cashiers and CVTs) within the single property 300. The loyalty program server 310 may also be used to provide multi-site validation of loyalty program instruments via a connection 311 such as a network interface to a remote loyalty program transaction clearinghouse. The loyalty program server is a communication nexus in the cross validation network. For instance, the loyalty program server 310 is connected to the cashiers, wireless devices, remote cashless instrument transaction clearinghouse, CVTs and the gaming machines and other gaming devices via the CVTs.

The cross validation network allows loyalty program instruments generated by any gaming machine connected to the cross validation network to be accepted by other gaming machines in the cross validation network 345. Additionally, the cross validation network allows a cashier at a cashier station 325, 330, and 335 to validate any ticket voucher generated from a gaming machine within the cross validation network 345. As an example, to redeem a loyalty program instrument for goods and services, a player may present the instrument at one of the cashier stations 325, 330, and 335, the casino kiosk 359 or to a game service representative carrying a wireless gaming device 358 for validating loyalty program instruments. Loyalty program transaction information obtained from the instrument is used to validate the instrument by comparing information on the instrument with information stored on one of the CVTs connected to the cross validation network. In addition, when the loyalty program instrument was issued at another property, the information on the instrument may be stored at the other property. Thus, to validate the loyalty program instrument, the loyalty program server 310 may have to communicate with the loyalty program transaction clearinghouse 341 via the remote connection 311 to obtain the information necessary to validate the instrument.

As loyalty program instruments are validated, this information may be sent to audit services computer 340 providing audit services, the accounting computer 320 providing accounting services or the administration computer 315 providing administration services. In another embodiment, all of these services may be provided by loyalty program server 310 which may also be an EZPAY™ server. Examples of auditing services, which may be provided by loyalty program system software residing on the auditing computer 340 include 1) session reconciliation reports, 2) soft count reports, 3) soft count verification reports, 4) soft count exception reports, 5) machine instrument status reports and 5) security access report. Examples of accounting services, which may be provided by cashless system software residing on the accounting computer 320 include a) instrument issuance reports, b) instrument liability reports, expired instrument reports, c) expired instrument validation reports and d) instrument redemption reports. Examples of administration services, which may be provided by loyalty program system software residing on the administration computer 315 include i) manual loyalty program instrument receipt, ii) manual loyalty program instrument report, iii) loyalty program instrument validation report, iv) interim validation report, v) validation window closer report, vi) voided loyalty program instrument receipt and vii) voided loyalty program instrument report.

In another embodiment of the present invention, two or more gaming machines, such as 365, 366, 367, 368 and 369, may be linked together to allow loyalty points earned during the simultaneous game play of the two or more linked gaming machines to be combined on a single loyalty point instrument. Thus, a single game player playing two or more linked gaming machines simultaneously or a couple playing two or more linked gaming machines simultaneously may be able to receive a single loyalty point instrument issued from one of the linked gaming machines for their game play on all of the linked gaming machines. In another embodiment, based upon the combined amount of game play for two or more gaming machines linked together, the rate of loyalty points accrued may be increased. Thus, a couple playing together on two or more linked gaming machines simultaneously or a single person playing two or more linked gaming machines simultaneously may be able to earn more loyalty points than when playing on two or more non-linked gaming machines simultaneously.

Figure 4:
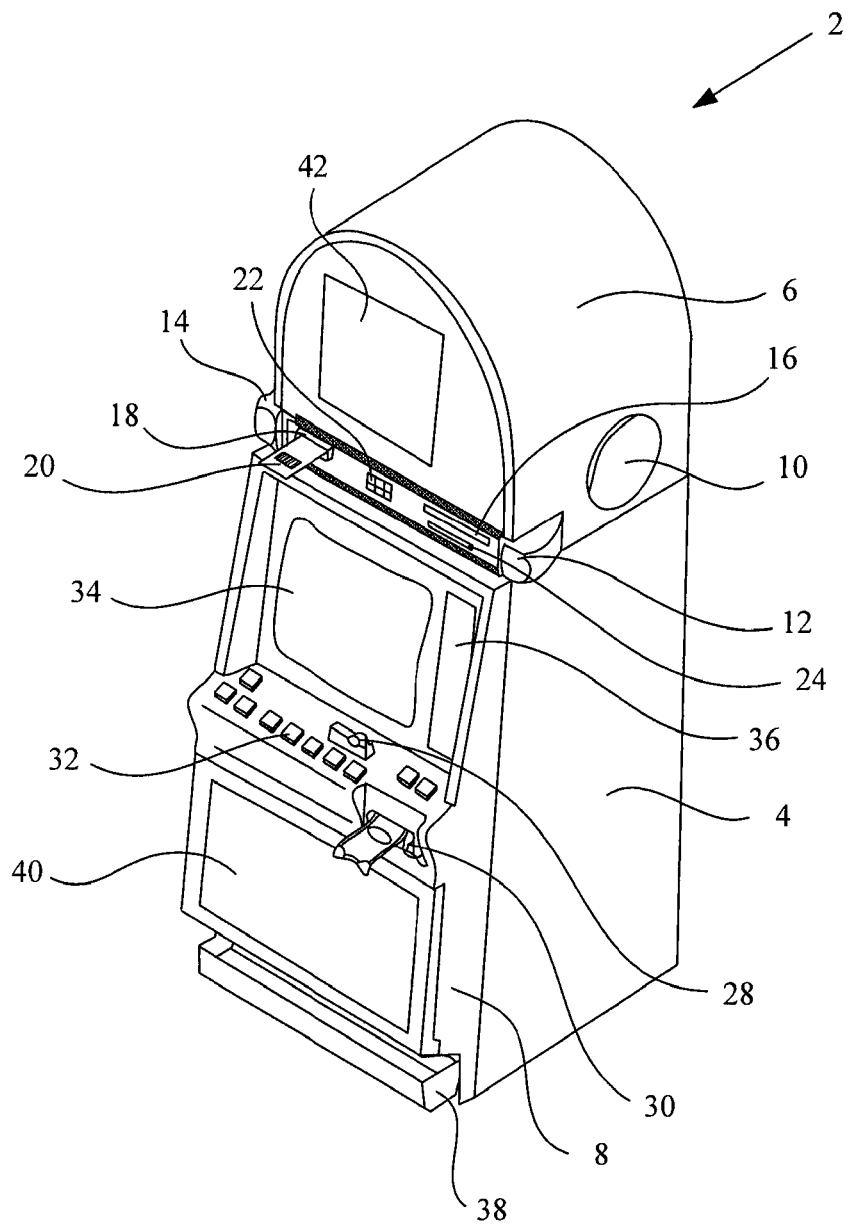
FIG. 4 is a perspective drawing of a video gaming machine of the present invention.

Turning to FIG. 4, more details of using loyalty program instruments in the context of game play on a gaming machine are described. In FIG. 4, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry (see FIG. 2) housed inside the main cabinet 4 of the machine 2. Many possible games, including traditional slot games, video slot games, video poker, video black jack, video keno, video pachinko, lottery games and other games of chance as well as bonus games may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which may print bar-coded tickets 20 used as loyalty point instruments or cashless instruments, a key pad 22 for entering player tracking information, a florescent display 16 for displaying player tracking information, a card reader 24 for entering a magnetic striped card containing player tracking information. Further, the top box 6 may house different or additional devices than shown in FIG. 4. For example, the top box may contain a bonus wheel or a back-lit silk screened panel which may be used to add bonus features to the game being played on the gaming machine. During a game, these devices are controlled and powered, in part, by circuitry, such as a master gaming controller, (See FIG. 2) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Returning to the example of FIG. 4, when a user wishes to play the gaming machine 2, he or she inserts cash through the coin acceptor 28 or bill validator 30. In addition, the player may use a cashless instrument of some type to register credits on the gaming machine 2. For example, the bill validator 30 may accept a printed ticket voucher, including 20, as an indicia of credit. As another example, the card reader 24 may accept a debit card or a smart card containing cash or credit information that may be used to register credits on the gaming machine. In addition, the player may use a loyalty program instrument, such as smart card, ticket voucher, or debit card, to register previously accumulated loyalty points on the gaming machine. Typically, the information contained on the cashless instrument or loyalty point instrument, including the ticket voucher, smart card or debit card, is validated by a cashless system or loyalty program system. As described above, the cashless system and loyalty program may be a single or separate systems in the present invention. The loyalty program instrument, including but not limited to a ticket voucher, smart card or debit card, may have been generated at the same property, for example a first casino where the gaming machine 2 is located or the instrument may have been generated at another property for example a second casino.

As described above, on a gaming machine, loyalty points may redeemed for a number of purposes such as to access a special bonus feature available on the gaming machine or to obtain goods and services. The loyalty program instrument typically contains information used to register loyalty points on the gaming machine, including gaming machine 2, and validate the registration transaction. For example, when a ticket voucher is used as a loyalty program instrument, the printed ticket voucher may contain information including but not limited to: 1) a ticket value, 2) a ticket issue date, 3) a ticket issue time, 4) a ticket transaction number, 5) a machine ID, 6) a ticket issue location and 7) a ticket sequence number. Information such as the ticket value, the ticket issue date, the ticket issue time, the ticket number and the machine ID may be common to loyalty program systems that generate and validate tickets issued at a single property. However, information such as the ticket issue location and other information may be needed to allow multi-site generation and validation of loyalty program instruments. In addition, other types of information, besides the information listed above, may be stored on the loyalty program instrument. For example, the ticket may contain information regarding a promotional prize that may be redeemed for loyalty points by the player when the ticket voucher is utilized in the gaming machine 2. As another example, the ticket may contain information such as a number of additional loyalty points that are needed to obtain a particular goods or services item.

The information on the loyalty program instrument may be recorded on the loyalty program instrument when the loyalty instrument is generated. For example, in the case of the ticket voucher, the generation of the ticket voucher may refer to the actual printing of the ticket voucher on paper or some other medium. A unique bar-code may be printed on the ticket voucher which may be read with a bar-code scanner to obtain information from the ticket. The ticket voucher, including 20, may be printed from a printer, including printer 18. In the case of the smart card or debit card, the generation of the smart card or debit card refers to storing or encoding this information on the smart card or debit card. The generation of the debit card or smart card may occur when the smart card or debit card is inserted into the card reader 24 in the gaming machine 2 or at another site where smart cards or debit cards are issued. For example, smart cards or debit cards may be generated at ATM like terminals, at a cashier station when a player cashes out or prepaid smart cards or debits may be purchased within the gaming property (e.g. casino). As another example, the gaming machine may transfer loyalty point information to portable wireless device worn by the player via a wireless interface (not shown) on the gaming machine 2. After game play session where an amount of loyalty points have been awarded to the player, the amount of loyalty points awarded to the player and any other loyalty points input into the gaming machine may be downloaded to the portable wireless device worn by the player via the wireless interface.

A game play session where loyalty points are accrued by the master gaming controller on gaming machine 2 or by another logic device located on the gaming machine 2 may occur after a particular game event initiated by a game player. For example, a loyalty point session, where loyalty points are accrued, may be triggered by one or more of the following game events: a) depositing an indicia of credit into the gaming machine [e.g., inserting a cashless instrument into the card reader 24], b) inserting a bill or a cashless instrument into the bill validator 30, or inserting a coin in the coin acceptor 28, c) activating an input button on the gaming machine [e.g., input buttons 32], d) inputting a loyalty program instrument into a gaming device on the gaming machine [e.g. inserting an instrument in the bill validator 30 or the card reader 24], e) entering a code into the gaming machine [e.g., via the key pad 22 or via a touch screen] and f) combinations thereof. In the present invention, when the gaming machine has not received identification information from the gaming player, such as but not limited to a player tracking account information, loyalty points may be still be accrued during the game play session. The game play session where loyalty points are accrued may end following another game event such as but not limited to i) detecting zero credits registered on the gaming machine, ii) the gaming machine remaining idle for an amount of time, iii) detecting a tilt condition or detecting an error condition on the gaming machine, iv) detecting a game player's request for a loyalty program instrument and v) combinations thereof. After the loyalty point session ends, some or all of the loyalty points accrued during the session may be awarded to the game player. The loyalty points may be awarded to the player by storing the points to a loyalty program instrument which is issued to the player or the awarded points may be credited to the player's player tracking account after the player provides identification information to the gaming machine.

During the course of a game play session, a player may be required to make a number of decisions, which affect the outcome of one or more games played during the game play session. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40.

After the player has completed a game play session, a loyalty program instrument or cashless instrument may be generated at the gaming machine 2. The loyalty program instrument or cashless instrument may be a printed ticket voucher, a smart card, debit card or other cashless medium. Prior to issuing the instrument, the loyalty points awarded to the player may be displayed on the main display 34, the secondary display 42 or the player tracking display 16. Also, a prize menu may be displayed on one or more displays on the gaming machine 2 such as the main display 34, the secondary display 42 or the player tracking display 16. The prize menu may include one or more goods and services items. To redeem a particular prize, a particular amount of loyalty points is needed. As service items, the game player may be able to convert the awarded loyalty points to frequent flyer miles, obtain a free meal with the loyalty points or obtain a free nights lodging with the loyalty points. As an example of goods items, a player may be able to redeem loyalty points for clothes, food items, electronic goods, etc.

In some embodiments, the player may transfer the awarded loyalty points to a player tracking account. After providing account information (e.g., by inserting a player tracking card), the player tracking points may be transferred to a player tracking account of the player directly on the gaming machine (see FIG. 5). In other embodiments, the player may credit player tracking points or loyalty points, stored on a loyalty point instrument, to a player tracking account 1) over the phone, 2) at a clerk validation terminal, 3) at a cashier station, 4) at a casino kiosk, 5) via a web-interface, 6) via mail or 7) through a hand-held wireless device.

The game player may select one of the goods and services items from the prize menu using an input mechanism of some type. For instance, the prize menu may be displayed on a touch screen and the player may touch the screen to select one of the goods and services items. When the amount of loyalty points required to redeem the selected prize is less than an amount of loyalty points available on the gaming machine, a loyalty program instrument containing the prize instrument may be issued. For instance, when loyalty points are redeemed for a free meal, the player may be issued a ticket 22 from printer 18 which may be used to obtain a free meal when presented at one or more restaurants listed on the ticket.

In some embodiments of the present invention loyalty points accrued during the game play session may be combined with previously earned loyalty points to redeem a prize. Thus, loyalty points stored in one or more of a player's loyalty program accounts, such as a player tracking account, or loyalty points earned during other activities stored on one or more loyalty program instruments available to the player may be used to redeem prizes on the gaming machine. For instance, the player may insert five printed tickets containing various amounts of loyalty points into the gaming machine 2 using the bill validator 30. After each ticket has been validated, as described with reference to FIG. 3, the loyalty points stored on each ticket may be added to the amount loyalty points available on the gaming machine. As another example, the player may request that loyalty points be deducted from a loyalty program account such as a player tracking account. In this case, the gaming machine may send a message to remote server storing the loyalty point account information and request that some amount of loyalty points be deducted from the player's account. Assuming the amount of requested points is available, the requested points may be deducted from the player's account and then transferred to the gaming machine. Finally, the method described above, may be implemented when the player has not accrued any loyalty points during a particular game playing session. For instance, the player may desire to redeem a prize using one or more loyalty program instruments storing loyalty points previously earned by the game player.

In another embodiment of the present invention, a single instrument may store both cash transaction information and loyalty program information. For instance, a smart card may be used to load credits onto a gaming machine and cash out an award from the gaming machine. Also, the smart card may be used to store loyalty program information generated during one or more of a player's game playing activities. Further, the smart card may store prize information for a prize redeemed at a gaming machine using loyalty points accrued by the game player.

Figure 5:
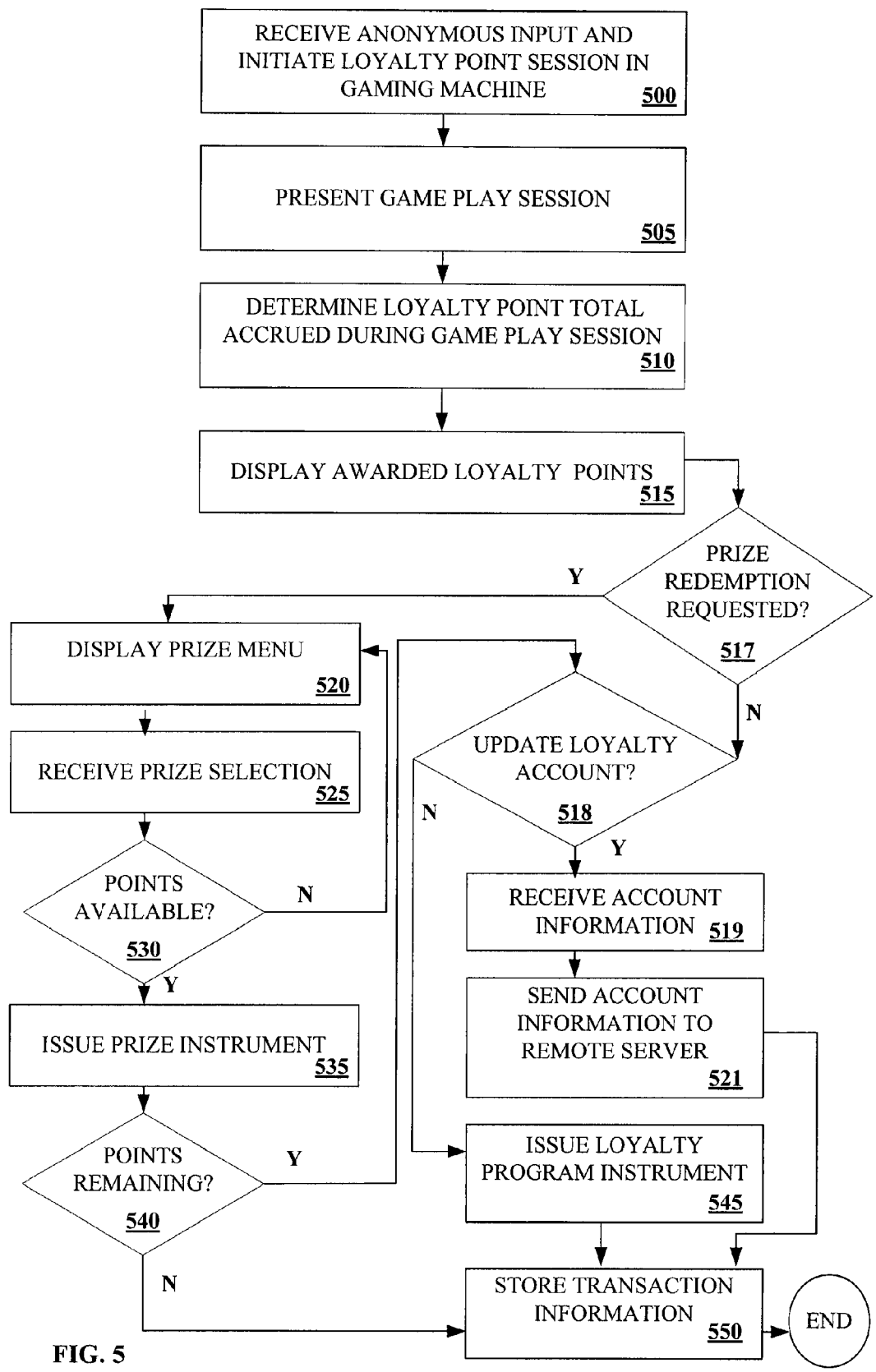
FIG. 5 is a flow chart depicting a method of rewarding loyalty points accrued anonymously on a gaming machine.

FIG. 5 is a flow chart depicting a method of rewarding loyalty points accrued anonymously on a gaming machine. In 500, a gaming machine receives an input of some type from a game player that has not provided any identification information, such as player tracking information. The input, which may be a number of different gaming events, as described with reference to FIG. 4, such as the player depositing a indicia of credit into the gaming machine, triggers a game play session on the gaming machine where loyalty points may be accrued. In 505, a game play session is presented on the gaming machine which may include the player wagering on a number of different games of chance and game outcome presentation corresponding to each wager. For instance, the player may make 5 different wagers on 5 slot games presented on the gaming machine. In 510, a gaming event triggers the end of the game play session and an amount of loyalty points accrued during the game play session are determined. The gaming event ending the game play session may be but is not limited to 1) detecting zero credits registered on the gaming machine, 2) the gaming machine remaining idle for an amount of time, 3) detecting a tilt condition or detecting an error condition on the gaming machine, and 4) detecting a game player's request for a loyalty program instrument. A rate at which the player accrues loyalty points during the game play session may vary according to one or more of a time of day, days of a week, months of a year, an amount wagered, a game denomination, a promotional event, a game type and a rate of wagering. After the amount of loyalty points accrued during the game play session have been determined, some or all of the accrued loyalty points may be awarded to the game player. For instance, a player that does not have a loyalty program account may be awarded a higher fraction of the accrued points than a player that already has an account to encourage the player without an account to sign up for a new account.

In 515, the gaming machine may display the amount of loyalty points accrued during the game play session to one or more display screens on the gaming machine (see FIG. 4). In 517, the player may be offered the option to exchange loyalty points for a prize of some type such as goods or services. In 520, when a prize redemption is requested, a prize menu may be displayed to one or more display screens on the gaming machine. The prize menu may contain a list of prizes available and a number of loyalty points corresponding to each prize that must be redeemed to obtain each prize. In 525, a player may select a prize. In 530, when the player does not have enough loyalty points available to obtain the prize, the prize menu in 520 may be redisplayed and the player may be asked to make another selection or given an option to exit from the menu.

In one embodiment, the player may be given the option (not shown) of viewing loyalty point account information from a loyalty point account such as a player tracking account available to the player. In this case, the player may enter loyalty program account information into the gaming machine using some method. For example, the game player may insert a player tracking card into a card reader on the gaming machine and type in an identification number corresponding to the card such as a PIN number. When the card has been validated, the player may view player tracking account information. Next, to redeem a prize requiring a certain number of loyalty points, when a player does not have enough loyalty points available on the gaming machine, the player may request that loyalty points be transferred to the gaming machine from a remote loyalty point account. The gaming machine may send a request for an amount of loyalty points to a remote server. When the loyalty point transaction has been approved, the remote server may send the requested loyalty points to the gaming machine and delete the requested points from the player's account. Then, the transferred loyalty points may be added to loyalty points already available on the gaming machine and used to redeem a prize.

In 535, when a prize selection has been made and there are enough loyalty points available on the gaming machine to redeem the prize, a prize instrument may be issued to the game player. For instance, the gaming machine may print a ticket for a free meal at a restaurant. The issued ticket may be taken to a restaurant and, after the ticket has been validated, used to obtain a free meal.

In 540, after a prize redemption and points are still remaining, the player may be given the option, in 518, of updating a remote loyalty account with the remaining points. When a player does not request a prize redemption, the player may be directly presented the option to update a remote loyalty point account with some or all of the points awarded during the game play session. In 519, the player may enter loyalty program account information into the gaming machine using some method. For example, the game player may insert a player tracking card into a card reader on the gaming machine and type in an identification number corresponding to the card such as a PIN number. In 521, when the loyalty program account information has been validated by the remote server, the gaming machine may send a request to the remote server requesting that an amount of loyalty points awarded to the player be added to the player's loyalty program account.

In 545, when loyalty points remain on the gaming machine, the gaming machine may issue a loyalty point instrument storing the remaining loyalty points. For instance, the gaming machine may issue a printed ticket voucher redeemable for a certain amount of loyalty points. In 550, the gaming machine may store to a local database residing on the gaming machine loyalty program transaction information for one or more loyalty program transactions performed by the gaming machine such as but not limited to 1) loyalty point awards, 2) prize redemptions, 3) requests for loyalty program account information, 4) requests to add loyalty points to remote account, 5) requests to delete loyalty points from a remote account and 6) information regarding issued loyalty point instruments. In 550, loyalty program transaction information may also be sent to a remote server in lieu of storing the information on the gaming machine or in conjunction with storing the information on the gaming machine.

Figure 6:
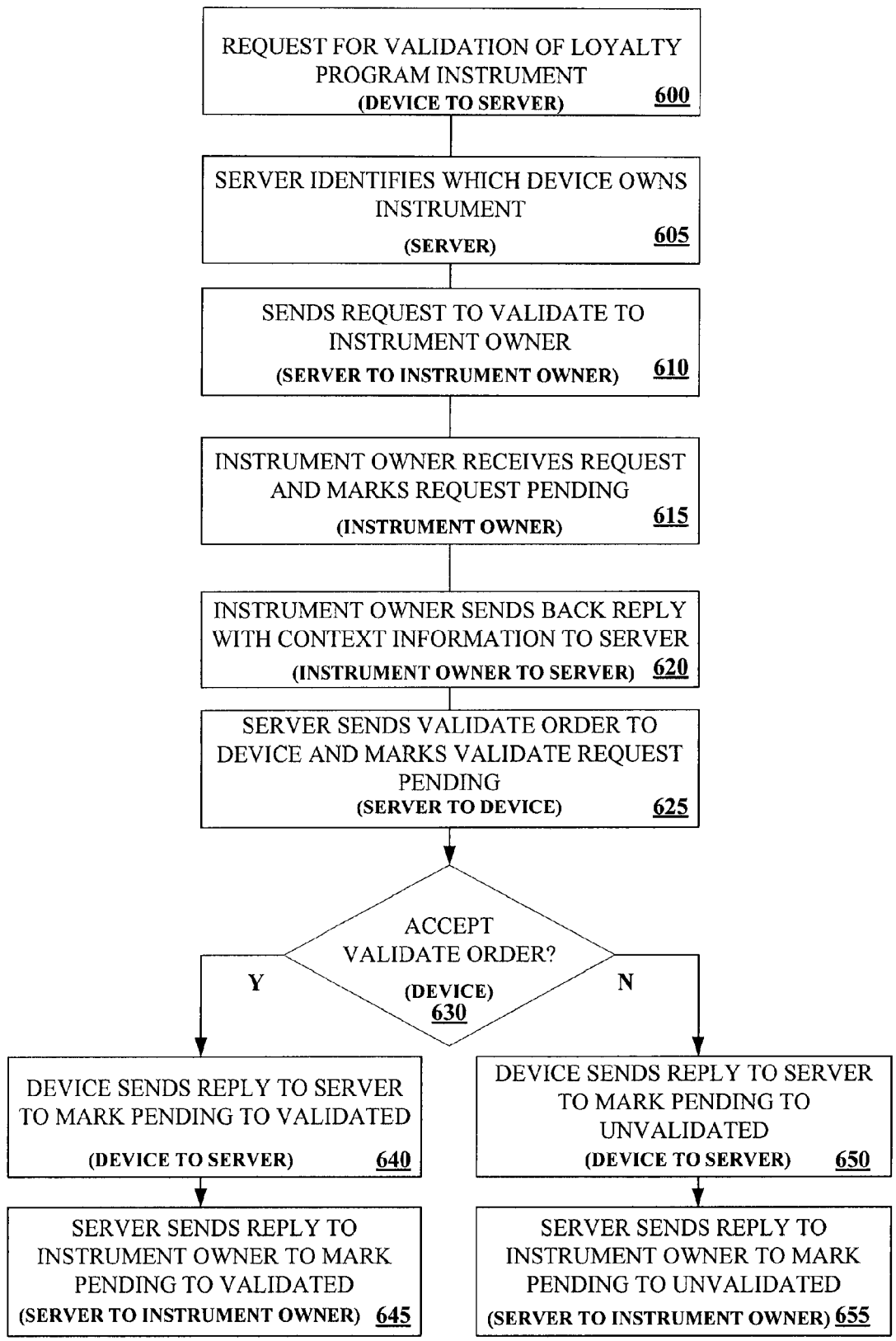
FIG. 6 is a flow chart depicting a method for validating information stored on a loyalty point instrument at a validation site connected to a cross validation network as described with reference to FIG. 3.

FIG. 6 is a flow chart depicting a method for validating information stored on a loyalty point instrument at a validation site connected to a cross validation network as described with reference to FIG. 3. In the embodiment shown in the figure, a loyalty point instrument is validated in a manner consistent with an EZPAY™ cashless system. In 600, a request for game service transaction information read from a loyalty point instrument is sent via a network interface on the gaming device validating the instrument to a loyalty program server. The gaming device may be a gaming machine, a casino kiosk, a hand-held wireless device or a CVT. In 605, the server identifies which gaming device owns the instrument. When a gaming device owns an instrument, the gaming device has stored information regarding the status of a particular instrument issued from a instrument generation site connected to the gaming device. As an example, as described with reference to FIG. 3, the gaming device may be a CVT connected to a number of gaming machines that generate loyalty program instruments. In 610, the server sends a request to validate the instrument to the gaming device identified as the owner of the instrument. Typically, the validation request indicates a service on the instrument has been requested. For instance, for a loyalty program ticket, a validation request may mean a request to access the loyalty points stored on the ticket has been made. For a loyalty program ticket valid for a free meal, a validation request may mean a request to obtain the meal has been made. In 615, the instrument owner receives the validation request for the instrument and marks the instrument transaction pending. While the instrument transaction is pending, any attempts to validate a loyalty program instrument with similar information is blocked by the instrument owner.

In 620, the instrument owner sends back a reply with context information to the server. As an example, the context information may be the time and place when the instrument was issued. The information from the instrument owner to the server may be sent as one or more date packets according to a communication standard shared by the instrument owner and server. In 625, after receiving the validation reply from the instrument owner, the server marks the validation request pending and sends a validation order to the gaming device validating the instrument. While the validation request is pending, the server will not allow another instrument with the same information as the instrument with the validation request pending to be validated.

In 630, the gaming device may chose to accept or reject the validation order from the server. For instance, using a security protocol, the gaming device may determine the validation order is invalid. As another example, an employee using a gaming device to validate loyalty program instruments may decide not to validate an instrument for some reason. When the gaming device accepts the validation order from the server, in 640, the gaming device sends a reply to the transaction server confirming that the transaction has been performed. The loyalty program server marks the request validated or completed which prevents another instrument with identical information from being validated. In 645, the server sends a confirmation to the instrument owner which allows the instrument owner to mark the request from pending to validated. When the gaming device rejects the validation order from the server, in 650, the gaming device sends a reply to the server to mark the validation request from pending to unvalidated. When the instrument transaction is marked unvalidated, it may be validated by another gaming device at a later time. In 655, the server sends the reply to the instrument transaction owner to mark the validation request from pending to unvalidated which allows the instrument to be validated later.

Figure 7:
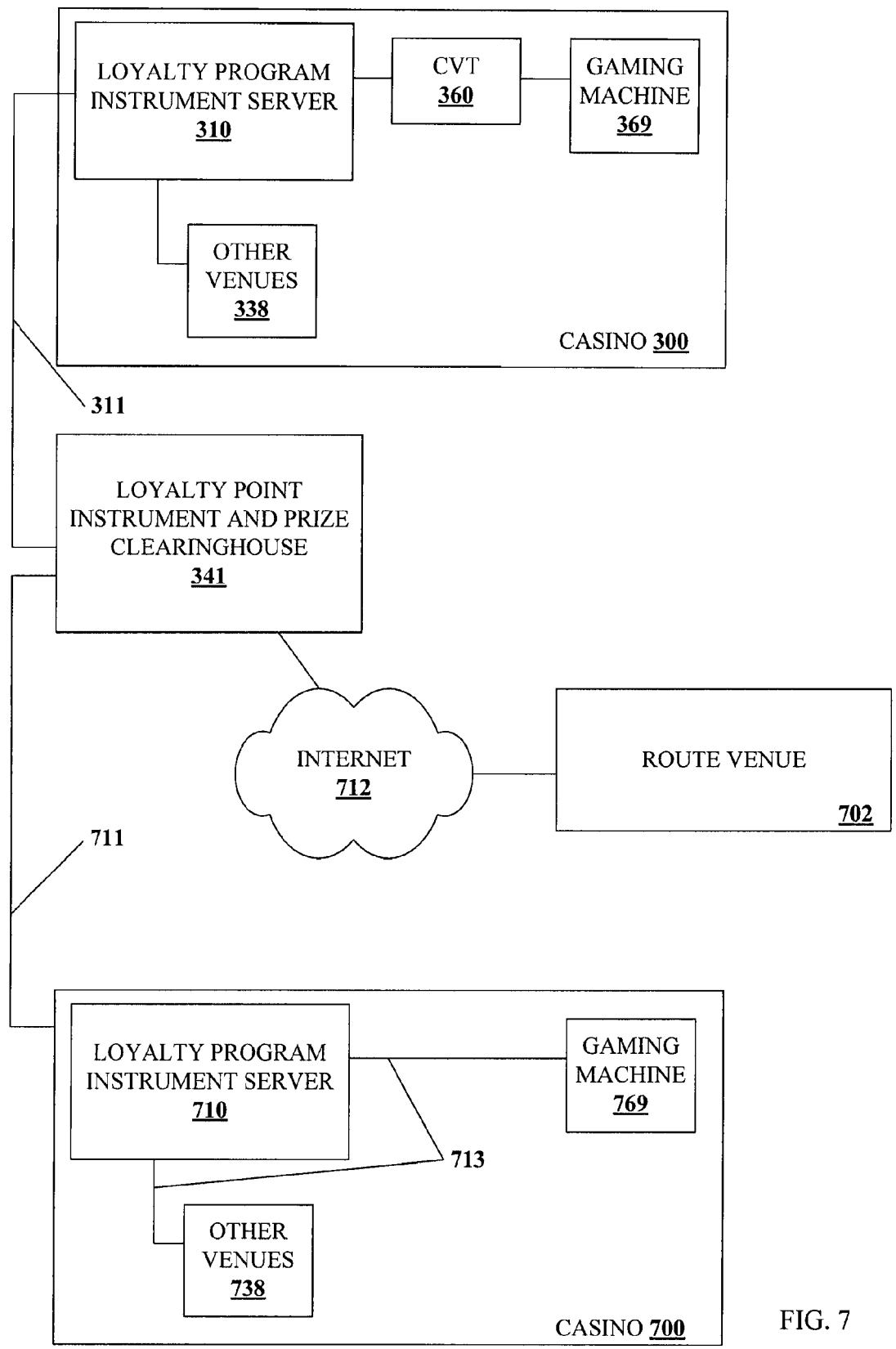
FIG. 7 is a block diagram of loyalty program systems at multiple gaming properties connected to a loyalty program transaction clearinghouse server.

FIG. 7 is a block diagram of loyalty program systems at multiple gaming properties connected to a loyalty program transaction clearinghouse server. At least three gaming devices, a loyalty program server 310 at property 300 (described with reference to FIG. 3), a loyalty program server 710 at property 700 and one or more gaming devices along a route venue 702, may communicate with the loyalty program transaction clearing house server 341. The route may comprise a plurality of gaming machines or other devices issuing loyalty program instruments located in various venues such as stores and bars. The example is for illustrative purposes only, as many different combinations of gaming devices using different network topologies may be connected to the loyalty point instrument and prize clearinghouse 341. At property 300, one or more gaming machines, such as gaming machine 369, send loyalty program transaction information to the clerk validation terminal 360. The CVT 360 sends information to the loyalty program server 310 which may also be cashless server and data acquisition system. In this embodiment, the functions of the controller 350 and concentrator 355, as described with reference to FIG. 3, are combined into the loyalty program server 310. The loyalty point instruments used on property 300 may be smart cards, magnetic cards, ticket vouchers, room keys, debit cards, portable wireless devices and combinations thereof.

The loyalty program server 310 contains a network interface used to send information on loyalty point instruments generated on property 300 to the clearinghouse server 341 or request information 300 from the clearinghouse server 341 on loyalty point instruments issued at other properties that are being validated at property, including instruments issued at property 700 and venues along route 702. The loyalty program transaction information sent to the loyalty program server 310 from the clearinghouse server 341 and received by the clearinghouse server from the loyalty program server 310 is transmitted via the network connection 311. Further, details of information transmitted between a cashless server and a cashless clearinghouse server in regards to multi-property cashless instrument validation as well as server hardware, which may be applicable to multi-property loyalty program instrument validation, are described in U.S. application Ser. No. 09/684,382 by Rowe filed Aug. 25, 2000 entitled "Cashless Transaction Clearinghouse."

At property 700 gaming machines, such as gaming machine 769, and other gaming devices located at other venues 738, such as a loyalty point instrument generation site at a pit game, are connected to the loyalty program server and data acquisition system 710 via the local network 712. The local network 712 may be a wireless or wired connection system including fiber, copper or wireless cellular, combinations of all three or other connection systems. A separate CVT is not shown in this embodiment. The functions of the CVT including storage of loyalty program transaction information may be built into one or more the gaming machines including 769 or may be built into the loyalty program server 710. The information sent to the loyalty program server 710 from the clearinghouse server 341 and received by the clearing house server 341 from the loyalty program server 710 is transmitted via the network connection 711. Along the route venue 702, one or more gaming machine and other gaming devices located in a plurality of properties send and receive loyalty program transaction information for the clearinghouse 341 via an Internet connection 712.

Components of the transaction clearinghouse server 341 may include 1) a memory storage unit for storing loyalty program transaction information in a transaction database, 2) a functional router enabling communication between the clearinghouse server and different properties, 3) a logic devices such as one or more microprocessors, 4) a memory containing software for implementing the clearinghouse functions and 5) a network interface. The transaction database may contain on-going and past loyalty point instrument transactions processed using the clearinghouse server. The transaction database may be implemented using Microsoft NT (Microsoft, Redmond, Wash.) and SQL (server query language). The loyalty program servers, including 310 and 710, may also utilize this database technology.

Loyalty program instrument transaction information for two or more gaming properties may be stored in the clearinghouse server transaction database. The properties may be owned by the same or different gaming establishments. The transaction database may be accessed remotely by the properties, including 300 and 700, utilizing the clearinghouse server 341. Further, the transaction database may be used with analysis software to analyze transactions routed through the clearinghouse server 341.

The requirements associated with accounting and reporting of the loyalty program instrument information may be dependent on the regulations within a particular gaming jurisdiction. That being the case, the system is adaptable to those particular regulations. In general, a loyalty program instrument with an award amount may be considered to be analogous to a personal check written by the property where it was generated. When the loyalty program instrument is validated, it is essentially cashed. This implies that the property where the cashless instrument was generated must maintain a database of data related to those loyalty program instruments that were created on its property. This is analogous to maintaining a bank account whose sole purpose is to cover the loyalty program instruments that were generated at the property. This property is usually responsible for maintaining its loyalty program instrument database and validating loyalty program instruments. When a request to validate a loyalty program instrument is received by the loyalty program system at a particular gaming property, the property has the option of validating or rejecting the request. Once the property validates the loyalty program instrument, it is typically the responsibility of that property to insure its own loyalty program instrument transaction database is updated. At that time, the property which generated the loyalty program instrument, may transfer the funds to the property requesting the validation. The fund transfers may occur with each transaction or could be compiled in a batch to cover multiple instrument validation transactions on a periodic basis, e.g., once a night. The transaction clearinghouse may facilitate all associated electronic fund transfers (EFTs) and acts as a third party between the parties.

Figure 8:
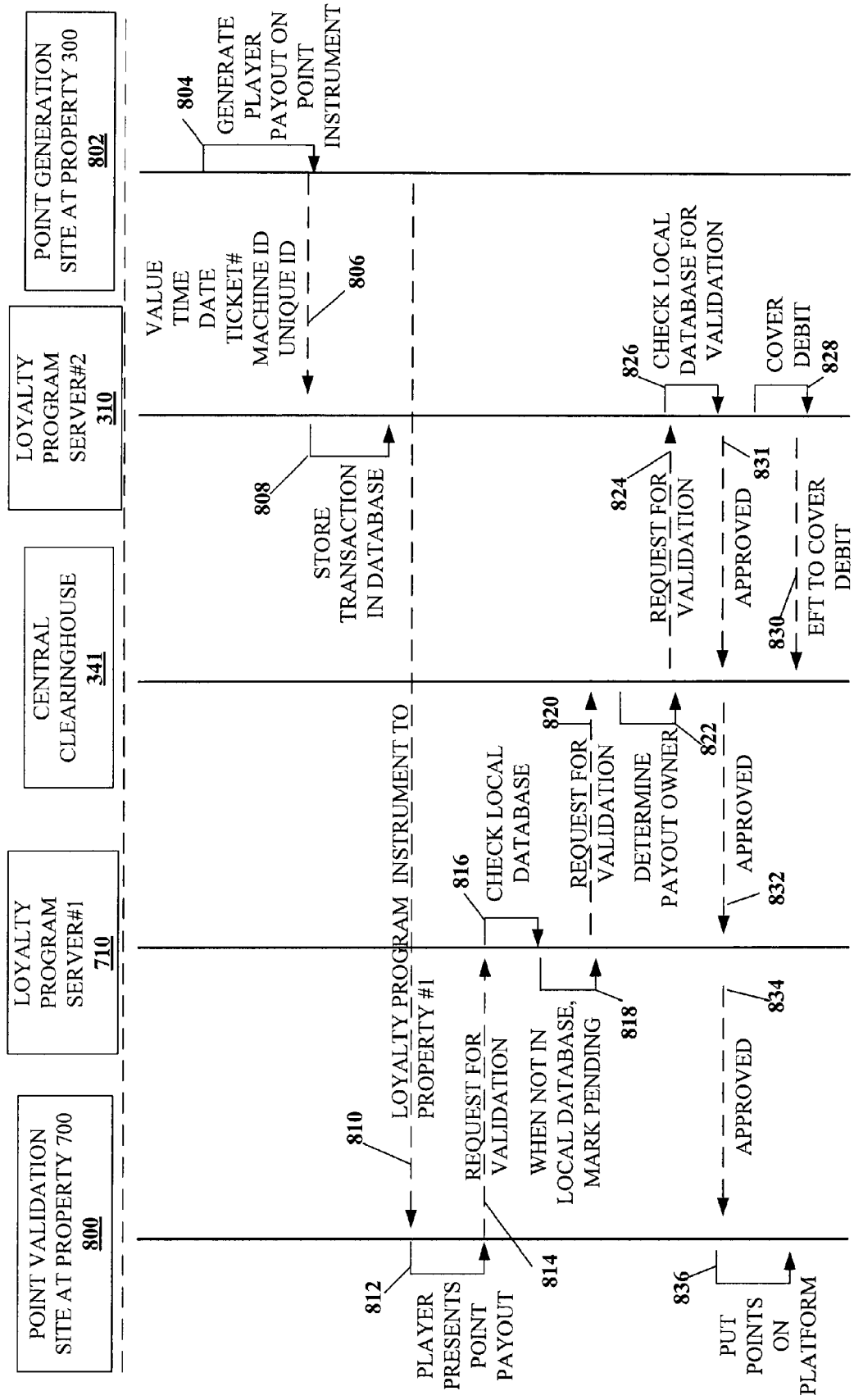
FIG. 8 is an interaction diagram for a loyalty program instrument transaction between a clearinghouse, loyalty program servers, and loyalty program instrument generators/validators where the loyalty program instrument is generated at a different location from where it is validated.

FIG. 8 is an interaction diagram for a loyalty program instrument transaction between a clearinghouse, loyalty program servers, and loyalty program instrument generators/validators where the loyalty program instrument is generated at a different location from where it is validated. In 804, awarded loyalty points are generated on a loyalty program instrument at a loyalty program instrument generation site 802 at property 300. The loyalty program generation site may include but is not limited to a gaming machine, a clerk validation terminal, a wireless validation terminal, a casino kiosk and a cashier station. The loyalty program instrument may include a printed ticket voucher (e.g. EZPAY™ ticket), a smart card, a debit card, a room key and a portable wireless device. In 806, when the loyalty program instrument is generated, loyalty program transaction information, including but not limited to 1) a value, 2) an issue date, 3) an issue time, 4) a transaction number unique to the transaction, 5) a machine ID that generated the loyalty program instrument, 6) an issue location and 7) an instrument sequence number, may be transmitted to the loyalty program server 310. The loyalty program instrument transaction information is also stored on the loyalty program instrument when the loyalty program instrument is generated in 804. In 808, the loyalty program server 310 may store the loyalty program instrument transaction information in a database. The transaction information stored in the database is used when the loyalty program instrument is validated. The validation process may be invoked when the loyalty program instrument is redeemed for a prize or when the loyalty program instrument is used in a gaming machine or other device that accepts the loyalty program instrument. The validation process involves comparing the loyalty program instrument transaction information stored on the loyalty program instrument with the loyalty program instrument transaction information stored in the loyalty program server database.

In 810, a game player takes the loyalty program instrument generated at property 300 to property 700. In 812, the game player presents the loyalty program instrument for a prize redemption at a loyalty program transaction validation site 800 at property 700. The loyalty program transaction validation site may include a gaming machine, a cashier station, a clerk validation terminal, a wireless validation device and any other devices which accept loyalty program instruments. For instance, when a debit card is used as the loyalty program instrument, the game player may be able to directly deposit the awarded loyalty points on the debit card into a loyalty program account, such as a player tracking account, accessible to the game player. In 814, a validation request is sent from the loyalty program transaction validation site 800 to the loyalty program server 710. The validation request may be an information packet containing the transaction information stored on the loyalty program instrument in 804 and stored in the loyalty program server database in 808.

In 816, the loyalty program server 710 may check the local loyalty program transaction database on the loyalty program server 710 to determine if the loyalty program instrument was generated at property 300. The loyalty program server may check the local loyalty program transaction database in a number of ways to determine whether a transaction record for the loyalty program instrument resides in the database. The database search technique may depend on what information is stored in the local database and what information is stored on the loyalty program instrument. When the loyalty program instrument was generated at a property using a different loyalty program system than the property where the loyalty program instrument is validated, the type and amount of loyalty program instrument transaction information stored on the loyalty program instrument may differ from the type and amount of loyalty program transaction information stored on the local loyalty program transaction instrument database. Thus, the search technique may depend on determining a common set of transaction information stored on the loyalty program instrument being validated and stored in the loyalty program transaction database. For instance, when the loyalty program instrument contains a machine ID and the loyalty program transaction database stores a list of all the local machine IDs, the loyalty program server 710 may search the local loyalty program transaction database to determine whether the loyalty program instrument was generated on one of the local machines at the property 700. As another example, when the loyalty program instrument contains transaction information on the property where the loyalty program instrument was generated or the owner of the loyalty program instrument (e.g. the owner of the property), the loyalty program server 710 may quickly determine whether the loyalty program instrument was generated at the local property 700.

In 818, when the loyalty program instrument was not generated locally, the loyalty program server 710 may mark the validation request pending in a local database and send a request for validation to the central clearinghouse 341 in 820. The request for validation from the loyalty program server 710 to the loyalty program instrument transaction clearinghouse 341 may contain all or some subset of the information stored on the loyalty program instrument being validated. In addition, the request for validation may contain information about the loyalty program transaction validation site. For example, the identification information about the loyalty program transaction validation site 800, the property 700 where the loyalty program transaction validation site is being validated and the owner of the may be included in the request for validation message.

As in 814, the request for validation in 820 may be an information packet of some type sent using a pre-determined communication protocol between the loyalty program server 710 and the central clearinghouse 341. The communication protocol used to transmit transaction information between the loyalty program transaction validation site 800 and the loyalty program server 710 in 814 may be the same or different than the communication protocol used to transmit the transaction information between the loyalty program server 710 and the loyalty program instrument transaction clearinghouse 341 in 820.

In 822, the loyalty program transaction clearinghouse determines the owner of the loyalty program instrument (e.g. the property where the loyalty program instrument was generated). The clearinghouse 341 determines the owner based upon information received in the validation request in 820 and based upon information stored in the clearinghouse 341. In 824, using routing information stored within the clearinghouse 341, a request for validation is sent from the clearinghouse 341 to the property where the loyalty program instrument was generated (i.e. property 300 in this embodiment). The request for validation is an information packet in a communication protocol of some type. The transaction information contained within the information packet is sufficient to allow the loyalty program server 310 at the loyalty program generation site 802 at property 300 to validate the loyalty program instrument. The communication protocol used to transmit the transaction information between the loyalty program server 310 and the clearinghouse 341 in 820 may be the same or different than the communication protocol used to transmit the transaction information between the loyalty program instrument transaction clearinghouse 341 and the loyalty program server 710 in 824. For example, the communication protocols may be different when the loyalty program system used at property 700 is different from the loyalty program system used at property 300.

In 826, the loyalty program server 300 checks the local loyalty program instrument transaction database to confirm the request for validation received in 824 is valid. When the transaction is valid (e.g. the loyalty program instrument was generated at property 300 and has not been previously validated), in 831, an approval message may be sent from the loyalty program server 310 to the clearinghouse 341, in 832, the clearinghouse may forward or generate the approval message to the loyalty program sever 710, in 834, the loyalty program server 310 may forward or generate the approval message to the loyalty program transaction validation site 800. In 828, the loyalty program server may represent the transaction as a debit and cover the debit by allocating or transferring funds to an account used to cover debits. For example, each loyalty point may be assigned a pre-determined value such as a $0.01 US dollars. In 830, the loyalty program server 310 may send an Electronic Fund Transfer (EFT) to cover the debit to the clearinghouse 341. The EFT may be sent after each transfer or may be sent as a batch at the end of some time period, e.g. at the end of each day.

In 836, the validation site 800 at property 700, performs an appropriate operation when the validation is approved. For example, when the validation site 800 is a gaming machine, loyalty points may be posted on the gaming machine. As another example, when the validation site 800 is a cashier station, the player may receive a prize according to the value of the loyalty program instrument.

In FIGS. 9-13, apparatus and methods are described that allows gaming information for gaming services, such as but not limited to anonymous loyalty program session, a non-anonymous loyalty program session and cashless transactions to be entered into a gaming machine. The apparatus and methods employ a non-physical contact data interface that allows for data to be read from a loyalty program instrument without physical contact between the data interface and the loyalty program instrument. As was described with respect to FIG. 2, examples of non-physical contact data interface include a bar-code scanner and a wireless interface.

In providing a loyalty program session, the use of a non-physical contact data interface to read data from a loyalty program instrument provides many advantages over a card reader and a magnetic striped card. The card reader and a magnetic striped card are commonly employed in providing a player tracking session on a gaming machine. The data interface in a card reader requires physical contact between a magnetic head and the magnetic-stripe on the card to read data from the card. Details of reading data from a magnetic striped card are described next and then details of input mechanisms using a non-physical contact data interface to read data from a loyalty program instrument are described with respect to FIGS. 9-13.

When a magnetic striped card is used in a player tracking session, which is one type of loyalty program session, the session is initiated when physical contact between the magnetic stripe and magnetic reader is detected. Typically, the card is inserted in a card reader. For a successful read of the magnetic stripe, the length of the stripe must be moved over a magnetic head in the card reader. The movement of the magnetic stripe over the magnetic head can be supplied by 1) a force supplied by a user (e.g., the act of the user inserting the card forces the stripe over the magnetic head) or 2) a force supplied by servo-mechanisms within the card reader.

For a successful read, the card must be inserted correctly in the card reader. A correct orientation is when the card inserted in a manner that allows the magnetic stripe to come in contact with the magnetic head. Typically, a standard magnetic striped card is designed with a top-side and a bottom-side where the magnetic stripe is located across the bottom side of the card in an off-center location. A card reader used with the standard magnetic stripe card requires the card to be inserted with the top-side facing upwards and the magnetic stripe on the left side of the card slot. If the card is inserted up-side down or the card is inserted in the card slot with the stripe on the opposite side of the location of the magnetic head then the data is not read from the card.

The magnetic head is used to read data stored on a number of tracks on the magnetic stripe. The magnetic stripe may contain a number of tracks, usually three, but all of the tracks may not be used. In most player tracking implementations, the first track is used to store a number, the number is an index to a record in a player tracking database. The second track is used to store a name such as the property where the card was issued. The third track is not used. The first track usually contains up to 80 characters of data and the second track contains up to 40 characters of data.

When the index number is read from the card, the number is transmitted to a remote server. The index number is used by the remote server to retrieve a player tracking record corresponding to the index number. An index number to a record in a database is used because the magnetic striped card does not have the storage capacity to store the record.

A portion of the information stored in the record may be transmitted back to the gaming machine. The gaming machine may use the information transmitted from the server to generate a player tracking session and to provide other personalized gaming services. For instance, the record referenced by the index number may supply information, such as, 1) a player identification number, 2) a social security number, 3) a name, 4) an address, 5) a credit number, 6) a player rating, 7) complimentary (comp.) information, 8) a player preference tracking number and 9) a casino preference tracking number. In addition, information relating to games, game features, gaming machine settings, prizes, promotions and food/beverage services preferred by the game player may be stored in the record.

For the generation of a player tracking session, the striped card is inserted in the card reader, the index number is read from the magnetic striped card and then is transmitted to the remote server. As part of the validation process for the player tracking session, a player may be required to enter a PIN number. After the session is validated, parameters from game play performed on the gaming machine, such as an amount bet, is converted to player tracking points by the remote server. The player tracking session ends when the player removes the magnetic striped card from the card reader.

When a magnetic striped card storing an index to a record in a database is used to initiate a player tracking session, a number of factors can prevent the implementation of the player tracking session. For example, if the magnetic stripe on the card can't be read because the stripe has been damaged or de-magnetized, then the player tracking session is not initiated. As another example, if the magnetic striped card is not inserted in the card reader, then the player tracking session is not initiated. The card may not be inserted because the player may forget to insert the card or may have forgotten to bring their card as previously described. In another example, the player can insert their card incorrectly, such as, up-side down or backwards, which prevent the card from being read and thus a player tracking card from being initiated. If communication is unavailable between the gaming machine and a remote server, then the player tracking session may not be initiated. If the player is required to enter a PIN number and the player has forgotten their number, then the player tracking session can't be initiated. Finally, if the player the leaves the magnetic striped card in the card reader, then the card can be lost. Until, the card is re-placed, the player may not be able to generate a player tracking session.

It is beneficial to the casino that operates a loyalty program and a player that is a member in the program to make the process of participating as simple and as fool-proof as possible. Fool-proofing the process requires addressing the issues that prevent the loyalty program session from being initiated. As is described with respect to FIGS. 9-13, input mechanisms using non-physical contact data interfaces can be used to make the initiation of a loyalty program session on a gaming machine more fool proof.

Figure 9B:
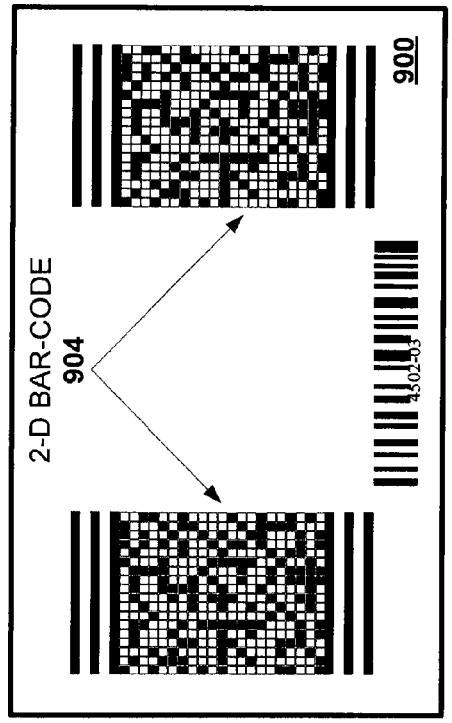
FIGS. 9A-9D are block diagrams of loyalty program instruments and data formats of the present invention.
Figure 9D:
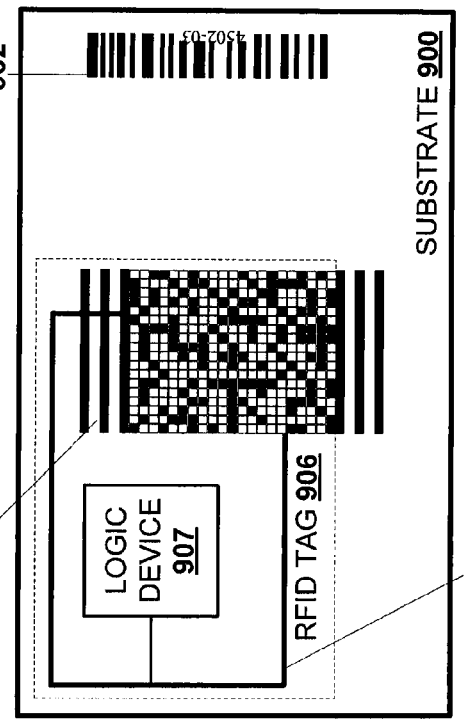
Figure 9A:
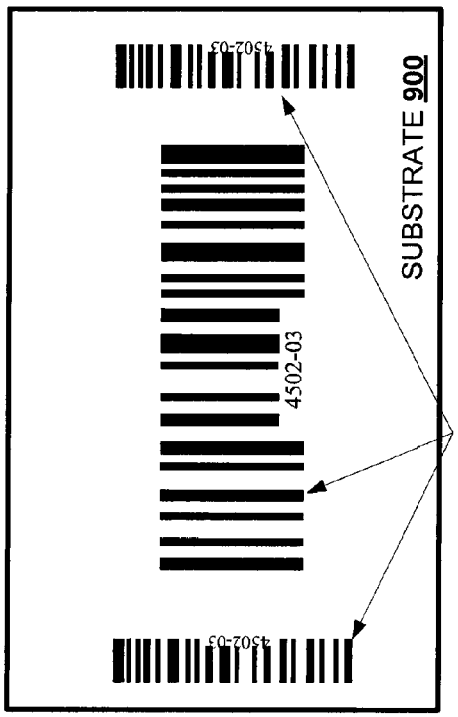

FIGS. 9A-9D are block diagrams of loyalty program instruments and data formats of the present invention. In FIG. 9A, a substrate 900 with a 1-D bar-code is shown. The 1-D bar-code may be used to encode an index to a record in a database. A standard Universal Product Code (UPC) symbol provides a 12 digit number. However, longer or shorter numbers may be encoded in a 1-D bar-code format. In FIG. 9B, a substrate with a 1-D bar-code and a 2-D bar-codes 904 are shown. The 2-D bar-codes, as is to be described as follows, may be used to encode a much large amount of data than a 1-D bar code. In FIGS. 9A and 9B, the 1-D bar-codes and 2-D bar-codes may be read with a bar-code reader, such as a LS 6800 series bar-code reader from Symbol Technologies (Holtsville, N.Y.). The LS 6800 is incorporated in a rectangular box of dimensions of a height of 1.75 inches a width of 2.75 inches and a depth of 4.5 inches.

In FIG. 9A, the substrate 900 is printed with three 1-D bar-codes 902. The 1-D bar-codes encode the same number or different numbers. For instance, the bar-codes at the edge of the substrate 9A may encode one number while the large bar-code in the center of the substrate 900 may encode a different number than then number at the edges. The size and orientations of the 1-D barcodes allow the bar-codes to be read at different orientations and distances from the bar-code reader.

In one embodiment, the bar-codes (1-D/2-D) may be printed on a substrate, such as a plastic wallet sized rectangular shaped card (e.g., credit card sized), a printed ticket and a plastic device designed to be attached to a key ring. In this case, the bar-codes may be printed on the top-side of the substrate, the bottom side of the substrate or both. The information encoded on the top-side and the bottom side of the substrate 900 may be the same or may be different. When the information is on the top-side and the bottom-side is the same, the information may be read from the substrate when either top-side or the bottom side is orientated toward the reader. In another embodiment, different information may be optionally encoded on the top-side and the bottom-side of the substrate. For instance, a 1-D bar-code may be printed on a top-side of the substrate 900 and an optional 2-D bar-code may be printed on the bottom side of the substrate. In this case, information may be read from a first side of the substrate and the substrate may be optionally flipped to read information from the second side of the substrate.

In one embodiment of the present invention, the 1-D/2-D bar-codes may be printed on a substrate with an adhesive backing. Thus, the substrate may be attached to a plurality of devices that may be carried by the player. For instance, the substrate may be attached to a credit card carried by the player, a magnetic striped room key, a cell phone, a person digital assistant, a watch band, a purse, a wallet, an item of clothing, etc. The surface on which the printed substrate is attached does not necessarily have to be flat. Many bar-code readers are capable of reading bar-codes placed on curved surfaces. A player may be issued a sheet of bar-codes with adhesive backing so that the bar-codes may be placed on a plurality of devices.

In another embodiment, the bar-code may be printed on a bracelet that may be worn by the player, similar to a hospital bracelet. The player may place the bracelet near the bar-code reader to have it read. After the player is finished with the bracelet, it may be discarded.

In one embodiment, a plurality of bar-codes corresponding to different loyalty programs may be located on the same substrate. Player tracking clubs run by different casinos use different index numbers for their clubs that are not compatible. Thus, a player that gambles at a plurality of casinos may be required to carry a plurality of player tracking clubs to participate in a player tracking session at each of the clubs. With the present invention, bar-codes from different player tracking clubs may be printed on the same substrate or attached the same substrate using a bar-code printed on an adhesive backing. At the start of the loyalty program session, the plurality of bar-codes may be scanned from the substrate, the scanned numbers may be analyzed to determine if any are valid for the gaming machine or gaming device on which the player has requested a loyalty program session. When one of the scanned numbers is valid, then a loyalty program session may be initiated on the gaming machine. An advantage of this embodiment is that the number of player tracking cards carried by the player may be reduced.

In another embodiment, the gaming machine or another gaming device may be capable of scanning a plurality of 1-D bar-codes and 2-D bar-codes and combining them on a single instrument. For example, a plurality of 1-D bar-codes providing index numbers for a plurality of player tracking clubs may be read by the bar-code reader or the index numbers may be read by another input device on the gaming machine. Then, the all of the 1-D bar-codes may be formatted and printed on a single instrument, such as a printable media with an adhesive backing or a printed ticket. In another example, the plurality of 1-D bar-codes may be combined into a single 2-D bar-code. The 2-D bar-code may be printed on a single instrument, such as a printable media with an adhesive backing or a printed ticket, that may be carried by the player. In yet another embodiment, all of the index may be combined in a single RFID tag. RFID tags are described in detail with respect to FIGS. 9C and 10A-10C.

As described above, 1-D/2-D bar-codes may be used with the present invention. In an ordinary (1-D) bar-code, the data is encode in a vertically redundant format, i.e., the same information is repeated vertically. Thus, the heights of the bars may be truncated without any loss of information. The vertical redundancy allows a symbol with printing defects, such as spots or voids, to still be read. The higher the bar heights, the greater probability that at least one path along the bar-code will be readable.

A 2-D bar-code symbol stores information along the height as well as the length of the symbol. Since both dimensions contain information, some of the vertical redundancy is lost. To insure accurate reading, most 2-D bar-codes use check words to insure accurate reading. An advantage of a 2-D bar-code symbol is that significantly more data may be encoded than compared a 1-D bar-code symbol. With a 2-D bar-code symbol, an entire record of a database can be stored on a single 2-D bar-code symbol rather than just an index to a record.

When a 2-D bar-code is employed, data processing, such as but not limited to parsing, editing, formatting, re-ordering, optical character recognition, encrypting/decrypting, format conversion, may be utilized to process the data read from the 2-D bar-code by the bar-code reader. The data processing may be performed by a logic device located in the bar-code reader, a logic device in communication with the bar-code reader and combinations thereof. Thus, the bar-code reader may include a communication interface for communicating with processors located on other gaming devices, such as a processor located in a player tracking unit, the master gaming controller on the gaming machine or a processor on a remote server.

A 2-D bar-code is one example of a 2-D symbol encoding format. In general there are many types of 2-D symbol formats that may be employed with the present invention. Often the term 2-D bar-codes and the term 2-D symbols are used interchangeably to describe a 2-D symbol encoding information. These 2-D symbol formats include but not are limited to, 3-DI, ArrayTag, Aztec Code, Small Aztec Code, Codablock, Code 1, Code 16K, Code 49, CP-Code, DataGlyphs, Data Matrix, Data Strip Code, Dot Code A, hueCode, Intacta-.Code, MaxiCode, Mini code, PDF 417, Micro PDF 417, QR Code, Smart Code, Snowflake Code, Supercode and Ultracode. These codes may be black and white codes, i.e., use only black and white elements. However, some codes may also utilize color elements or gray scale elements which allow the information density encoded in the 2-D symbol to be increased. The use of a color elements or gray scale elements in a symbol may require different types of scanners to read the symbol than are used for symbols encoded only with black and white elements.

Varying amounts of data may be encoded in a 2-D symbol depending on the format and the capabilities of the reader. Further, in many of the formats the data may be encrypted. For instance, Code 16K printed at 7.5 mils may be used to encode 208 alphabet characters per square inch or 417 numeric characters per square inch. Data Strip Code may be used to encode 150 to 1000 Bytes of digital data per square inch. PDF417 (portable data format) may be used to encode 1.1 kilobytes of machine readable data in the space of a standard bar-code. Also, PDF471 (Symbol Technologies) may be used to encode ASCII, numeric or binary data. The data densities may vary according encoding format of the data. With maximum error correction in PDF471, data may be correctly read from a symbol with half of the symbol damaged.

The 2-D bar-codes may be used to encode data, text, graphics, biometrics, sounds and voice records. For instance, fingerprints, scanned signatures and voice authorization records may be stored in a 2-D bar-code. The scanned signature and the voice authorization record may be recorded at the gaming machine, processed and printed in a 2-D bar-code format on a ticket that is carried by the player. The encoded information on the ticket may be later used to validate/authenticate the printed ticket. In one embodiment, prior to issuing a ticket, the player may be asked to speak a short phrase of their choosing or specified by the gaming machine into a microphone located on the gaming machine. The short phrase may or may not be encoded on the ticket in the player's voice. For instance, a digital sound signature may be generated from the message. Later, to validate the ticket, the encoded information may be read on the ticket and played back to an operator validating the ticket, such via as in an earpiece worn by the operator. The operator may ask the player to repeat the short phrase encoded on the ticket. The operator may use the manner in which the phrase is said, the information contained in the phrase or combinations thereof to validate the ticket. In another embodiment, the short phrase may be repeated into a microphone and a digital sound signature generated from the short phrase may be compared with a digital sound signature of the message originally stored on the ticket.

In other embodiments, the 2-D bar-code may be used to encode a record in a loyalty program database such as a 1) a player identification number, 2) a social security number, 3) a name, 4) an address, 5) a credit number, 6) a player rating, 7) complimentary (comp.) information, 8) a player preference tracking number and 9) a casino preference tracking number. In general, the 2-D barcodes may be used to encode one of a) loyalty program information, b) biometric information, c) player preferences for games, game features, gaming machine settings, prizes, promotions and food/beverage services, d) promotional information, e) gaming machine configuration settings, f) prize information, g) cashless transaction information and h) and combinations thereof. Further, equipment calibrations used for maintenance as well as gaming machine settings preferred by the player may be encoded in a 2-D bar-code format.

The 2-D bar-codes provide a number of advantages. One advantage is that gaming services may be provided to the player when contact with a remote server is unavailable because a record rather than an index may be encoded in the 2-D bar-code. Another advantage is that the PIN code may be eliminated when biometric information is encoded in the 2-D bar-code. For instance, in one embodiment, a player's fingerprint may be encoded in a 2-D symbol. Thus, rather than entering a PIN number, the player may simply place their finger on a finger printer reader. Therefore, the player can initiate a secure session without having to remember a PIN number.

In general, by providing an entire record on the loyalty program instrument (e.g., encoded in a 2-D bar-code format or encoded in an RFID tag), a gaming service, such as a player tracking session, a preferred gaming machine configuration or other customized gaming machine service, that requires a record to be retrieved from a remote server to generate the service on the gaming machine, may be provided by the gaming machine without first contacting the remote server. For example, in a traditional player tracking programs, a remote server is contacted after the player inserts their player tracking card because the player tracking card only stores an index to a record stored on the remote server. Via a communication on the gaming machine, the index number is sent to the remote server to retrieve the player tracking record corresponding to the index number. The player tracking record provides information necessary to implement the player tracking session. With the present invention, the player tracking session may be implemented using the player tracking record stored on the loyalty program instrument without contacting the remote server. After the player tracking session has been completed, the gaming machine may contact the remote server to provide a history of the player tracking session that has been implemented on the gaming machine.

Bar-code readers include a bar-code scanner and a decoder. The bar-code scanner is the optoelectronic part of the reader which transforms for the optical image of the bar-code into electrical signals. The electrical signal may be converted by a decoder within the reader into ASCII (American Standard Code for Information Interchange). The readers of the present invention are not limited to reading data only encoded in a 1-D bar-code format (there are also a wide variety of 1-D formats). For instance, information on a loyalty program instrument may be encoded in a 1-D bar-code format, a 2-D bar-code format (there are wide variety of 2-D bar-code symbol formats), other symbol formats, alpha-numeric formats and combinations thereof. Therefore, the reader of the present invention, including a scanner and a decoder, may be capable of scanning and decoding information encoded in a wide variety of formats. For instance, on a substrate 900, a casino's name in an alpha-numeric format, a symbol for a casino, a 1-D bar-code and a 2-D bar-code may all be printed on the same substrate and all of this information in the different formats may be processed by the same reader.

The bar-code reader may be used to read 1-D bar-codes and 2-D bar-codes using a laser scanner. The laser scanner used in the bar-code reader is one example of a non-physical data interface. The laser in the scanner may be generated using a laser diode. The wavelength of the light used in the scanner may vary from the visible to the infrared spectrum. In some embodiments, the bar-code may be printed in an invisible format. For example, some invisible inks and dyes are fluorescent in the near infrared spectrum and thus may be read with infrared scanner. These symbols are not visible under UV light.

The scanning rate for the laser scanner may be between 40 and 800 times a second. Since self-scanning laser readers, scan at a high rate, they are able to read poorly printed bar code that may require several scan attempts without the user noticing. Many bar-code readers and symbols formats provide for error correction that allow for damaged or misprinted symbols to be read. Typically, laser scanner use coherent light, which limits the amount of beam spreading. This allows the diameter of the beam to remain small enough to resolve wide and narrow bars of the bar-code even when the reading distances vary over the bar-code symbol. This property allows bar-codes printed on curved surfaces to be read. Depending on the symbol width, printing technology and ambient conditions, data may be read from bar-codes in a range of about 2 inches to 30 inches from the reader. These distances may vary depending on the employed technology. For instance, an ArrayTag 2-D bar-code format may be read from a distance as great as 50 meters.

Another example of a non-physical contact data interface that may be used to read 1-D and 2-D bar-codes in a bar-code reader is a charged coupled device (CCD) scanner. In CCD scanner, the bar-code may be illuminated by a photoflash or by another type of light source. The image of the bar-code is focused on to an array of photodetectors (i.e., CCD). The images of the dark bars of the symbol will fall on some of the photodetectors, while the light spaces fall on other detectors. An electrical signal is applied to the CCD array and the light value at each detector is read. This signal may be processed to determine the information encoded in the symbol. With a bright light, the depth of focus for a CCD array is several inches and generally the symbol must be placed closer to the scanner as compared to a laser scanner. Although, depending on the size of the symbols, the information may be read up to several feet away.

The density of the symbol that can be read is a function of the number of photodetectors in the CCD array. Instead of a CCD scanner, a CCD video camera may be also be used to read bar-code symbols. The laser and CCD scanners may be operated continuously, may be activated when a sensor detects an object is in the vicinity of the scanner, may be activated in response to a gaming event, such as a player depositing money into a gaming machine and combinations thereof.

Figure 9C:
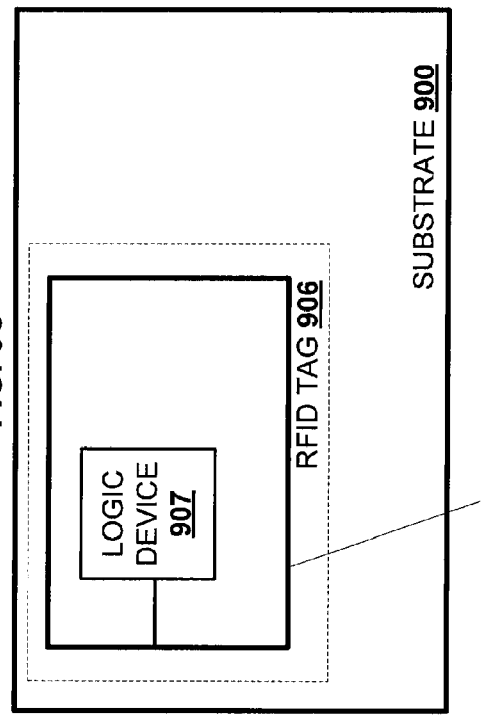

In the present invention, a loyalty program instrument with an RFID tag is another type of device that may be utilized with an input mechanism using a non-physical contact data interface. In FIG. 9C, a substrate 900 with an embedded RFID tag 906 is shown. In its simplest form, an RFID tag 906 may comprise a logic device 907 and an antenna 908 without a power supply. When the RFID tag without a power supply is interrogated by a RFID tag reader operating at the right radio frequency, the antenna picks up a small amount of electromagnetic energy that is used to power logic device 907. After receiving power, the logic device 907 broadcasts via the antenna 908 data that is stored in the logic device to the RFID tag reader. Additional details regarding RFID tag readers and RFID tags are described with respect to FIGS. 10A-10C.

The RFID tags 906 may be of varying sizes. For instance, the logic device 907 may be 1 mm square and ½ mm thick and embedded in a flexible substrate such as paper. The RFID devices may also incorporated into a substrate 900 with an adhesive backing and placed on various objects carried by a gaming machine user at the casino in the manner as was described for the 1-D/2-D bar-codes. RFID devices that may be used with the present invention are produced by companies, such as Texas Instruments (Dallas, Tex.), Hitachi (Japan), Infeon Technologies (Germany). Another type of RFID tag by Sarnoff (Princeton, N.J.) is as small as 250 micrometers wide. The RFID tag includes photocells, logic, memory for 50 bits and an antenna etched in silicon. The logic device receives power through a burst of laser light that is received by the photocells.

The memory storage capacities of the RFID tags used in the present invention may vary. In one embodiment, the RFID tag may be used to store a number that is an index to record in database like a 1-D bar-code symbol. In another embodiment, the RFID tag may be used to store a record in a database like the 2-D bar-code symbol. The type of information, such as loyalty program instrument data, that may be stored on the RFID tag 906 are the same as described above for the 1-D/2-D bar-codes.

In one embodiment of the present invention, a combination of 1-D/2-D bar-codes and RFID tags may be used. In FIG. 9D, a substrate 900 including an RFID tag 906, 1-D bar-code symbol 902 and a 2-D bar-code symbol 904 is shown. The RFID tag 906 may be embedded in a media, such as paper or plastic, and the 1-D/2-D barcodes may be printed on the media. In particular embodiments, the media may be credit card size plastic substrate, a thermal printing media with an embedded RFID tag, any type of printable media with an embedded RFID tag and a printable label with an embedded RFID tag and an adhesive backing. Since the RFID tags may be quite small a plurality of tags may be embedded in the same media. Input mechanisms of the present invention may be designed to read information stored in RFID tags, read bar-codes or read both formats. For instance, a bill validator may be capable of scanning information encoded in the 1-D/2-D bar-code formats printed on a ticket inserted in the bill validator and interrogating an RFID tag embedded in the inserted ticket.

In FIG. 9D, the different information formats (i.e., RFID and bar-code) may be stored the same information or different information. For instance, in one embodiment, the 1-D bar-code 902 may store an index to a record while the RFID tag 906 stores a security code that is used to validate the instrument. In another embodiment, the RFID tag and a 1-D bar-code may be used to store the same index number. Thus, if the RFID tag is damage, the index number may be read from the 1-D bar-code or if the 1-D bar-code is damaged the index number may be read from the RFID tag.

Figure 10C:
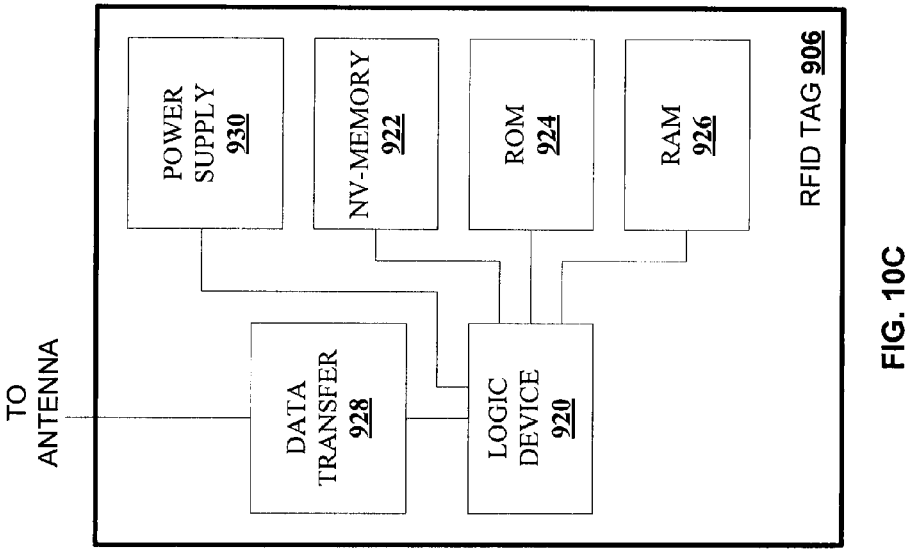
FIGS. 10A-10C are block diagrams of RFID tags and RFID readers of the present invention.
Figure 10A:
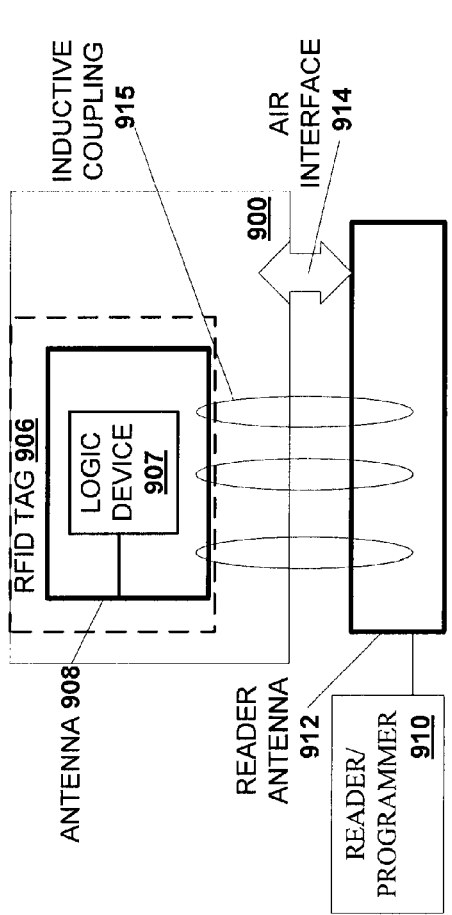
Figure 10B:
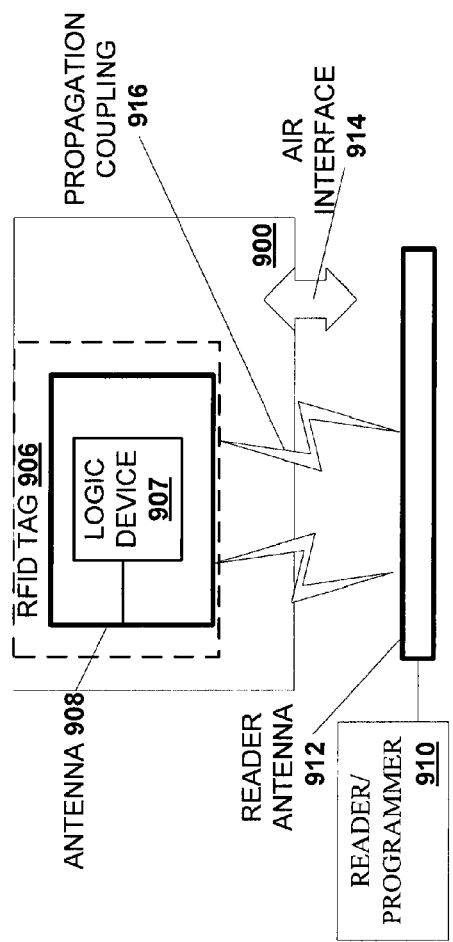

FIGS. 10A-10C are block diagrams of RFID tags and RFID tag readers of the present invention. In FIGS. 10A and 10B, the use of inductive coupling and propagation coupling to read RFID tags. In FIG. 10C, an RFID tag for one embodiment of the present invention is described.

In FIG. 10A, a reader antenna 912 connected to a reader/programmer 910 is used to communicate with an RFID tag 908, including a logic device 907 and antenna 908, which is located on a substrate 900. The RFID tag 906 is a passive RFID tag and does not include a power supply. Although, as described with respect to FIG. 10C, active RFID tags with a power supply may be used in the present invention. The logic device may be a silicon microprocessor, which may vary in size. The antenna is typically a metal coil made of a conductive metal such as copper or aluminum.

Power is supplied to the RFID tag 906 via the air interface 914 through inductive coupling 915 to the metal coil which is the tag's antenna 908. Inductive RFID tags are powered by a magnetic field generated by the reader. The antenna 908 picks up magnetic energy. The magnetic energy is then used to power the logic device 907. The logic device 907 modulates the magnetic field in order to retrieve and transmit data back to the reader 910. The data transmitted back to the reader then may be communicated to another gaming device, such as but not limited to, a logic device on a player tracking unit, a master gaming controller on a gaming machine and a remote server.

An RFID tag using capacitive coupling or propagation coupling 916 is shown in FIG. 10B. In a typical RFID tag using propagation coupling, the logic device 907 is a silicon microprocessor. The RFIG tag's antenna 908 is generated using a conductive ink. By printing the antenna structure on a media, such as paper, using the conductive ink, the antenna may be formed. Carbon-ink electrodes on the paper, which may be integrated into an adhesive label, may be used to connect the antenna to the microprocessor. The capacitively coupled RFID tag 906 is powered by electric fields generated by the reader antenna 912 attached to the reader/programmer 910.

In another embodiment of the present invention, the RFID tag 906 may include one or more photocells. The photocells may be used to power the RFID tag by shining light energy, such as a generated by a laser, onto the photocell. The photocell then transmits the energy received from the laser to the logic device.

Typically, the RFID tags may use three frequency ranges, low, medium and high to communicate information. Low frequency range is from 100-500 KHz. The medium frequency range is from 10-15 MHz and the high frequency range is from 850-850 MHz and 2.4 to 5.8 GHz. In general, the reading speed for data and the reading range increases as the frequency used with the RFID tag increases. The range of the RFID system is a function of the power available at the reader/programmer 910 and the power available by the RFID tag to respond and the environmental conditions in which the RFID tag is used, such as a casino environment.

The function of the reader portion of the reader/programmer 910 is to provide a means of communicating with the tags and facilitating data transfer. The reader may include a logic device designed to perform signal conditioning and parity error checking and correction. RFID readers, such as 910, may probe simultaneously a plurality of RFID tags. Once a signal from an RFID tag has been correctly received and decoded, algorithms may be applied to decide whether the signal is a repeat transmission. When the reader 910 determines the transmission has been repeated, the reader may instruct the RFID tag to stop transmitting. This process, often referred to as "Command Response Protocol," is used to circumvent the problem of reading multiple tags in a short period of time during batch processing. In another approach, the reader 910 may look for RFID tags with specific identities and interrogate them in turn.

Batch processing may be applied when a plurality of RFID tags are within the range of the RFID reader. For example, batch processing may be applied when a player is carrying a plurality of instruments where each instrument may include one or more RFID tags. In this example, the reader may be able to interrogate each of the RFID tags to determine the function of each instrument carried by the player. In one embodiment, when the player is carrying a plurality of RFID tags where a portion of the RFID tags encode index numbers corresponding to different player tracking programs, then the RFID reader located on the gaming machine may be able to read each of the index numbers stored on the tags and determine if any of the read index numbers are valid for a player tracking program implemented on the gaming machine. The interrogation of the different RFID tags by the reader may be initiated when a game play session is initiated on the gaming machine.

In one embodiment, the player may carry instruments with RFID tags issued for a number of purposes, such as player tracking programs, anonymous loyalty instruments, cashless instruments, promotional credits, coupons and comps. These RFID tags may have been issued at different locations and at different times. Thus, the RFID tags may store information regarding but not limited to, a purpose, where they were issued, the time they were issued and when they expire. When a game play session is initiated on the gaming machine by a player or in response to some other game event, the reader may interrogate the RFID tags that are within range of the reader such as the RFID tags carried by the player initiating the game play session. With this information, the gaming machine may be able to determine 1) what types of tags the player is carrying, 2) what is their purpose and 3) where the player has been. The gaming machine may also be able to determine where the RFID tag was issued, when the instrument with the RFID tag was issued and whether the instrument has an expiration date. This process may be carried out at other locations frequented by the player. For instance, RFID readers may be located at cashier stations, ATM machines, casino kiosk, hotel registration desks as well as gaming machines.

Using information read from RFID tags carried by the player, a gaming device, such as a gaming machine, or a casino employee that has access to the read information, may send targeted information to the player. For instance, if the player is carrying a coupon for promotional credits, the gaming machine may remind the player of the coupon and encourage them to use it. In another embodiment, if the gaming machine determines the player is carrying cashless instruments with a cash value above a certain threshold, then the gaming machine may offer the player promotional offers to entice them to spend it. The promotional offer may be displayed on a display screen on the gaming machine or may be made via a printed ticket issued by the gaming machine. In another embodiment, based upon information read from the RFID tags, such as the value of cashless instruments carried by the player, the gaming machine may notify an attendant to provide the player special service.

In another embodiment, if the gaming machine determines that any of the instruments carried by the player are about to expire, the gaming machine may generate and display a notification message. For instance, cashless instruments are only redeemable for a limited time period. Thus, if the gaming machine determines that a cashless instrument is about to expire, the gaming machine may generate a notification message with this information and display the message. In another example, promotions, such as promotional credits, may only be valid for a limited time period. Therefore, if the gaming machine determines the promotion is about to end, then the gaming machine may generate a notification message with this information and display the message.

The targeted services may be provided while identity of the player is unknown. targeted anonymous gaming services are possible because although the RFID tags may not contain any information about the player's identity, information read from a plurality of RFID tags carried by the player, such as the purpose of the instrument, when they were issued and where they were issued, may provide enough information to target a service to the player. As described above, information read from the instruments the player is carrying may be used to construct a history of the player's recent activities and based upon the information software algorithms may be developed that target services to the player.

A person carrying the RFID tags may not know what information is stored on the tags or in what instruments the tags are located. Further, the information on the RFID tags may be gathered without any active participation by a person carrying the RFID tag, i.e., the information gathering process is passive in regards to participation by the player. Passive information gathering is not possible with a magnetic striped card. With a magnetic striped card, active information gathering is required because the player has to correctly insert the card into a card reader to have the information from the card read. Further, only the information on the inserted card is read. Information from other magnetic striped cards carried by the player can't be read unless the player serially inserts the card in the card reader. With an RFID tag (see FIGS. 12 and 13 for more detail), the player may only have to be in a location within the range of the RFID reader to have the information on all the RFID tags they are carrying to be read.

Returning to FIGS. 10A and 10B, the reader/programmer 910 may be used to store information to an RFID tag 906. In one embodiment, the programming process may involve a write-once read many (WORM) RFID tag. For this type of tag, the information programming may be carried out when the instrument with the RFID tag is issued. For example, a printable media with an embedded RFID tag may be programmed by the reader/programmer 910 during the process of generating a printed ticket with the RFID tag. In another embodiment, the embedded RFID tag may be pre-programmed and the information stored on RFID tag may only be read when the printed ticket is issued. The data read from the RFID tag may be stored in a database located on one of the gaming machine, a remote server and combinations thereof. As described with respect to FIG. 10C, more complicated RFID tags may be read/write capable, i.e., the memory on the tags may be written to and over written a plurality of times.

In one embodiment of the present invention, a portion or all of the electronic circuitry for an RFID tag used in an instrument may be generated by printing the circuitry directly to a printable media. The printing process may be carried out by a printer located in a gaming device, such as a gaming machine as part of the process of issuing the instrument from the gaming machine. For example, circuitry may be printed on a cashless instrument when the cashless instrument is issued from the gaming machine. The circuitry may be used to store information about the cashless instrument, such as a value of the ticket.

In one embodiment, the printed circuitry may be memory circuitry used to store information used on the RFID tag 906. The printed circuitry may be generated when the instrument is issued i.e., "on the fly." As an example, the memory circuitry may be generated using conductive ink transferred to a suitable media, such as paper, using an inkjet printer. Paper is one example of a flexible media that may be used with the present invention. In another example, a thermal printer may be used to activate electronic pathways on a thermally activated media to create the electronic circuitry. The memory circuitry printed on the media used for the instrument may be capable of storing a number of bits of information, such as an index number for a loyalty program instrument. The memory circuitry may be connected to an RFID microprocessor embedded in the printable media, such as the logic device 907. Therefore, the stored information in the memory circuitry may be later read by an RFID reader 910.

The printers used in the present invention may also be capable of printing information, such as loyalty program instrument data, in other formats, such as 1-D/2-D bar-codes and alpha-numeric symbols, as described with respect to FIGS. 9A-9D. The printer may be one of a laser printer, inkjet printer and thermal contact printer. Further, the printer may be capable of printing information, such as a bar-code symbols, in an invisible format.

In FIG. 10C, a RFID tag 906 for one embodiment of the present invention is described. The RFID tags of the present invention may be passive or active tags. Active tags are powered by an internal battery and are typically read/write devices. Passive tags operate without an internal battery source, deriving the power to operate from the field generated by the reader.

The RFID tag memory may comprise one or more of ROM 924, Non-volatile memory 922 (e.g., EEPROM or flash memory) and RAM 926. The ROM memory may be used to accommodate security data and the RFID tag operating system instructions. The operating system instructions may be used by the logic device 920 to perform internal functions, such as response delay timing, data flow control, encryption/decryption and power supply switching. The RAM memory 926 may be used for temporary data storage during interrogation and response between the RFID tag 906 and the reader 910.

The NV-RAM is used to store RFID tag data. NV-RAM is used to ensure the RFID tag data is not lost when the device is in its quiescent or power-saving sleep state. The NV-RAM used in the present invention may vary in storage capacity. The NV-RAM may be capable of storing a number of bits of information used to store a number that is an index to a record in a database or may be large enough to store a portable data file which may be a record in a database. As described with respect to FIGS. 9A-9D, gaming services may be provided using the record stored in a portable data file without contacting a remote server.

The data transfer circuitry 926 may be used as a data buffer to temporarily hold incoming data following demodulation and outgoing data for modulation and may be used to interface with the reader antenna. The data transfer circuitry 926 may also be used to direct and accommodate the interrogation field energy for powering purposes and triggering of the transponder response. Circuitry (not shown) may also be provided to allow for programming of the RFID tag 906. The power supply 930 is optional. Active tags require a power supply while passive tags derive power remote sources such as the from field energy provided by the reader antenna or a laser light source used to transfer energy to the tag via a photocell.

FIGS. 11A-11B are block diagrams of input mechanisms with a non-physical contact data interface of the present invention. The input mechanisms are provided for illustrative purposes and the present invention is not limited to these two designs. The input mechanisms may be mounted directly to a gaming machine or may be located within a player tracking device mounted to the gaming machine.

In FIG. 11A, an input mechanism 950 with an interior non-physical contact data interface 952 is shown. The non-physical contact data interface 952 may be one of a bar-code scanner, a RFID tag reader and combinations thereof. The input mechanism 950 comprises a rectangular housing 955. The rectangular housing has an exterior surface 959 that is designed to form an exterior surface of the gaming machine. Thus, most of the housing 955 is located within the interior of the gaming machine. The exterior surface 959 may be located on a horizontal surface, a vertical surface or on a surface with an inclination between horizontal and vertical located on the gaming machine.

The housing 955 is designed for accepting a rectangular substrate 900, such as a ticket or a plastic card. The substrate 900 may include 1-D bar-codes 902, 2-D bar-codes 904, RFID tags (not shown) and combinations thereof. The exterior surface 959 includes a slot 956. The slot is designed to receive the substrate 900. Guides 958 may be located in the interior of the housing. The guides 958 may be used to constrain the orientation of the substrate 900 after it is inserted in the slot 956. The top of the non-physical contact data interface 952 may be located at a distance below the guides 958. After the substrate 900 is inserted in the slot, information on the substrate may be read by the non-physical contact data interface 952.

In FIG. 11B, an input mechanism 951 with an exterior mounted non-physical contact data interface 952. The top of the non-physical contact data interface 952 is surrounded by an exterior surface 960. The non-physical contact data interface 952 may be mounted below a translucent material. The non-physical contact data interface 952 and the exterior surface by connected to a housing (not shown) extending below the exterior surface 960. The exterior surface 959 may be located on a horizontal surface, a vertical surface or on a surface with an inclination between horizontal and vertical located on the gaming machine.

The non-physical contact data interface may read information from the substrate 900 when it is moved through or within an active volume 970 above the reader 952. The shape and size of the substrate 900 is not limited to a rectangular shape shown in the figure. Information may be read from the substrate 900 at one of a plurality of distances between the substrate 900 and the reader 952 and with one of a plurality of orientations between the substrate 900 and the reader. For example, when bar-code data is read from the substrate 900 using a bar-code reader, the side of the substrate 900 facing the top of the reader 952 may be parallel to the top of the reader or inclined at one of a plurality relative to the top of the reader. When RFID data is read from the substrate 900, in some embodiments, the RFID data may be read independently of the orientation of the substrate relative to the reader 952. In other embodiments, when the RFID tag receives power from the reader 952 via light energy received from photocells on the tag, the substrate may have to be oriented in one of a plurality of orientations that allows the photocells to receive light energy from the reader 952.

During the read process, the substrate 900 may be stationary or at a time varying position relative to the reader 952. Further, the orientation of the substrate relative to the reader 952 during the read process may be fixed or may be time varying during the read process. For example, for a substrate 900 with a 2-D bar-code, the substrate 900 may be moving and changing orientation in the volume above the reader 952 during reading as the reader 952 scans the 2-D bar-code on the substrate a plurality of times.

The input mechanism 951 may optionally include guides 962 for aligning the substrate 900 in a preferred orientation. By placing the substrate 900 within the guides, the substrate 900 may be aligned relative to the reader 952. If the substrate 900 is placed above the guides, but somewhat aligned with the guides or the substrate 900 is smaller than the guides, the substrate may still be sufficiently aligned. In one embodiment, the guides 962 may include slots for inserting the substrate 900. An advantage of using a "free" read where the substrate 900 is simply placed within the active volume 970 for the read and then removed that the substrate 900 can't be left in the device like a magnetic striped card can be left in a card slot. Therefore, this design may reduce the probability of the substrate 900 being lost.

The input mechanisms 950 and 951 may include a loyalty program session status interface comprising one of a status light 954, a sound projection device 955 and combinations thereof. The light may be located at any location on the exterior surfaces 959 and 960. For input mechanism 950, the light may be a strip with one or more lighting elements and may surround the slot. For input mechanism, the light may be a strip with one or more lighting elements. Further, the guides 962 may be translucent and back-lit. The sound device 955 may be located on the exterior surfaces 959 and 960. The sound device 955 and status light 954 may be located or at other locations on the gaming machine and are not limited to exterior surfaces 959 and 960. In general, the sound device 955 and status light 954 may be used to provide information regarding the functioning of the input mechanisms in 950 and 951 in any application for which they are used.

The loyalty session status interface may be used to indicate the status of a loyalty program session and communicate information regarding the loyalty program session. In the present invention, the loyalty program session is not limited to being initiated by physical contact between the loyalty program instrument and the instrument reader and is not limited to being terminated by the removal of a card from a card slot. The loyalty program session may be initiated and terminated in response to a number of conditions. For example, the loyalty program session may be initiated by a first gaming event and may be terminated by a second gaming event. The first gaming event may be one of i) an input of loyalty program instrument data from the loyalty point instrument via the non-physical contact data interface, ii) a deposit of an indicia of credit into the gaming machine, iii) an insertion of a card into a card slot on the gaming machine, iv) an activation an input button on the gaming machine, v) an input of a loyalty program instrument into the input mechanism on the gaming machine, vi) an input of a code into the gaming machine, vii) an input of biometric information into the gaming machine and viii) combinations thereof. The second gaming event may be one of a) an occurrence of zero credits on the gaming machine, b) an amount of idle time on the gaming machine exceeding a specified limit, c) a tilt condition, d) an error condition, e) a request for a loyalty program instrument, f) a request to terminate the loyalty program session, g) an inability to detect the loyalty program instrument, h) a cash-out request, i) a timeout condition, j) an inability to detect a user of the gaming machine and k) combinations thereof.

The loyalty program session status interface may communicate that status information in a loyalty program session in a number of ways. The sound projection device 955 may emit a sound in response to a data read by the non-physical contact data interface 952 or the lighting device 955 may generate light in response to a data read by the non-physical contact data interface 952. The lighting device 954 may change color in response to a data read by the non-physical contact data interface. For example, the lighting device 954 may generate one of a first color, first light pattern and combinations thereof when a status of the loyalty program session is active and may generate one of a second color, a second light pattern and combinations thereof when the status of the loyalty program session is inactive. Further, the lighting device may generate one of a third color, a third light pattern and combinations thereof when the status of the loyalty program session is about to change. For example, a loyalty program session may timeout after a period of time and the third pattern of light may be generated in a time period just before the loyalty program session ends.

When loyalty program session status interface includes both a sound device and one or more lighting devices. The loyalty program session status interface may generate one of a sound, a light pattern, a light color and combinations thereof when data is read correctly by the non-physical contact data interface and may generate one of a sound, a light pattern, a light color and combinations thereof when data is read incorrectly by the non-physical contact data interface. The loyalty program session status interface may generate one of a sound, a light pattern, a light color and combinations thereof when a status of the loyalty program session is active, may generate one of a sound, a light pattern, a light color and combinations thereof when a status of the loyalty program session is inactive and may generate one of a sound, a light pattern, a light color and combinations thereof when a status of the loyalty program session is about to change.

Figure 12:
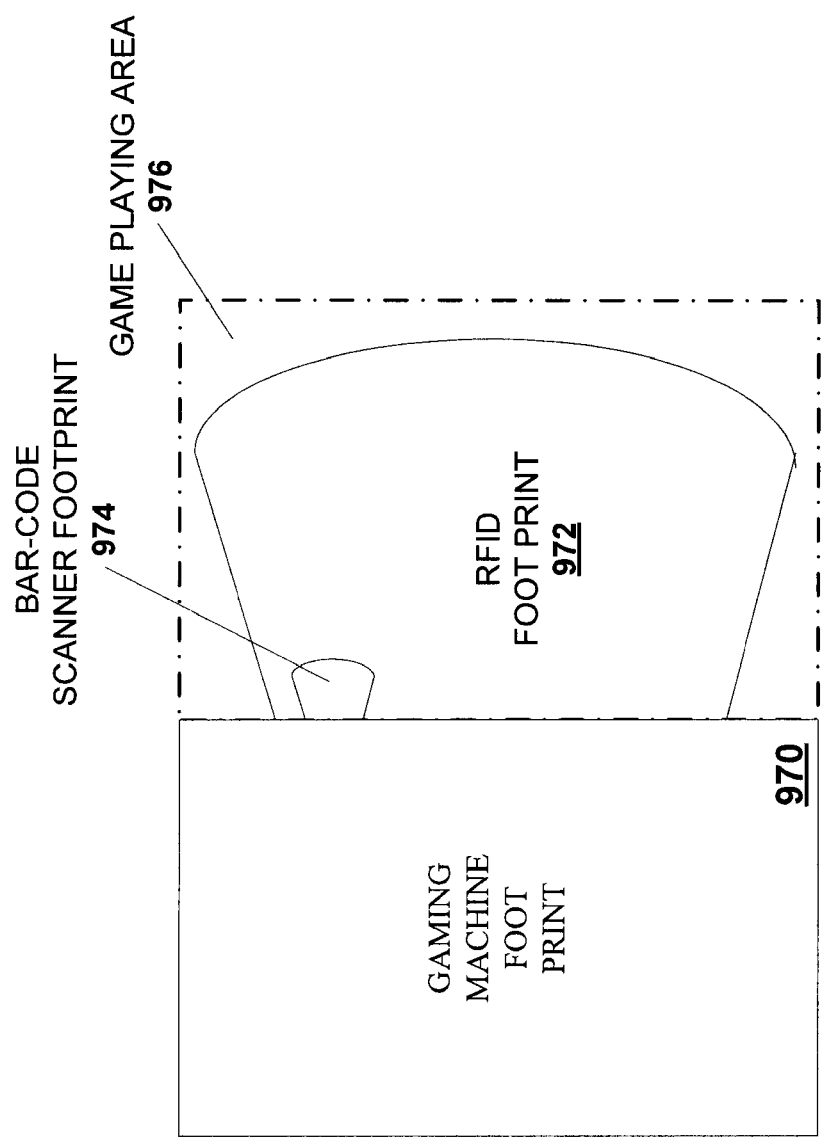
FIG. 12 is a block diagram of footprints of non-physical contact data interfaces of the present invention.

FIG. 12 is a block diagram of foot prints of non-physical contact data interfaces of the present invention. The gaming machine typically occupies a foot-print 970 while the gaming machine is on the casino floor. The foot print is the area on the casino floor occupied by the gaming machine which may vary according to the make and model of the gaming machine. To play the gaming machine, a player typically stands or sits within a game player area 976 in front of the gaming machine. To read bar-code data, a substrate with the bar-code is placed within an active volume of space in which the bar-code reader is operable to read data. A foot print 974 for the active volume of the bar-code reader is shown. The active volume is typically located at a location on the gaming machine that is easily accessible to the player that is located within the game playing area 976.

An RFID tag reader may generate an active volume with a much larger foot print than a bar-code reader. In one embodiment, the foot print of the active volume for an RFID tag reader may encompass all or a large portion of the game playing area 976. The RFID tag reader may be designed to read all of the RFID tags located within its active volume. A foot print 972 for one active volume of an RFID tag reader is shown in the figure. For the foot print 972, when a player carrying RFID tags is located within the game playing area 976, then the RFID tag reader may be able to read the RFID tags carried by the player.

The active volume of the RFID tag reader may be sized to prevent overlapping reads. For instance, when the RFID tag reader is capable of reading an RFID tag storing loyalty program instrument data that is used to initiate a loyalty program session and when the active volume is large an extends beyond the game playing area 976, the RFID tag reader may read loyalty program instruments carried by a plurality of different game players. For instance, the RFID tag reader may read RFID tags carried by two different game players playing games on adjacent gaming machines in a casino. As another example, a person carrying an RFID tag used as a loyalty program instrument not participating in a game play on a gaming machine may be located proximate to a person with an RFID tag used as a loyalty program instrument that is participating in a game play session.

To minimize overlapping reads, the active volume of the RFID tag reader may be shaped. The active volume may be shaped by among other factors, the size of the antenna used with the reader, the power supplied to the antenna and the frequency used to read the RFID tags. Further, shielding may be built into the cabinet of the gaming machine to limit the active volume of the RFID tag reader. For instance, shielding may be provided to prevent the active volume from extending behind the gaming machine or to the sides of the gaming machine.

Dynamically changing the active volume may be used to located RFID tags closest to an RFID reader. For instance, if the active volume of the reader is such that a plurality of different RFID tags carried by different players are read by the reader, then the signal strength supplied to the reader antenna may be reduced such that only the RFID tags closest to the RFID reader receive enough power to reply to the RFID reader. Thus, only the RFID tag for a player located proximate to the front of the gaming machine may be read as the power supplied to the reader antenna is reduced. This approach may be applied when it is desirable to eliminate overlapping reads.

In some instances, it may be desirable to determine to location of an RFID tag. For instance, it may be desirable to determine the location of the RFID tag proximate to a particular gaming machine or the location of an RFID tag within a casino. Methods and apparatus for locating wireless gaming devices, such as RFID tags in a wireless gaming environment are described with respect to FIG. 13.

Figure 13:
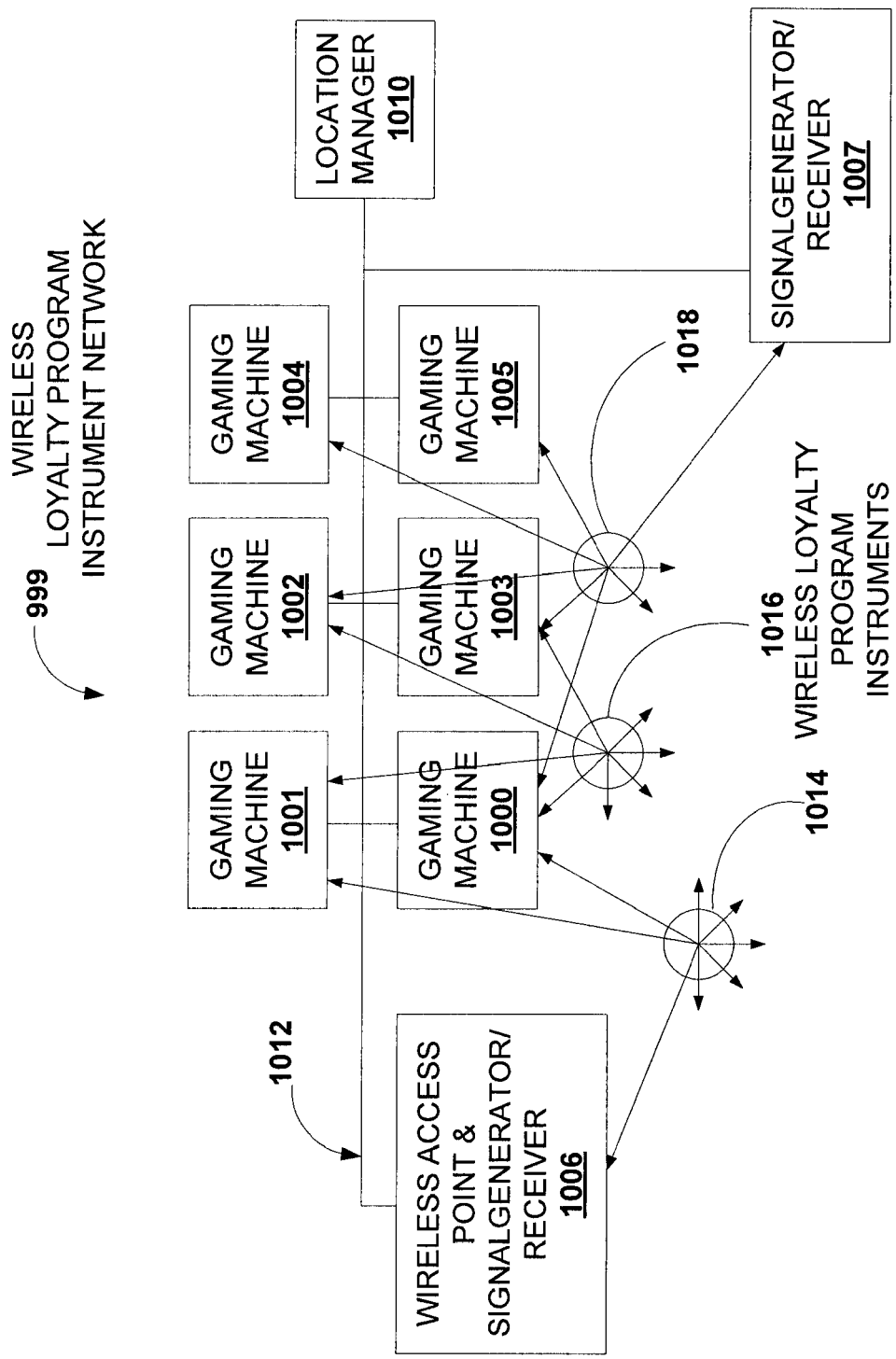
FIG. 13 is a block diagram of a gaming system providing wireless data access and wireless gaming device location services.

FIG. 13 is a block diagram of a gaming system providing wireless data access and wireless gaming device location services. In one embodiment, the gaming system is a wireless loyalty program instrument network 999. However, the present invention is not limited to locating wireless gaming devices used as loyalty program instruments. Any wireless gaming device capable of communication with the gaming system, such as cell phones and personal communication devices with wireless interfaces, used for any purpose may be located with the present invention.

The gaming system may comprise a plurality of wireless signal generators/receivers, such as RFID tag readers that are used to interrogate wireless gaming devices such as RFID tags and more complex RFID enabled devices, such as cell phones and other portable communication devices. The gaming system may also include a plurality of wireless access points to a local area network for active communication sessions with the more complex RFID devices that may transmit and receive data at higher data bandwidths. The wireless access points may provide sufficient bandwidth for services involving voice, video, internet connections, text messaging, e-mail and game services that may be provided on the more complex RFID devices. The wireless signal receivers and wireless access points may be located in gaming devices such as gaming machines 1000, 1001, 1002, 1003, 1004 and 1005. The wireless signal generators/receivers and wireless access points may be located in locations separate from the gaming machines, such as wireless signal generator/receiver 1007 and wireless access point 1006. In one embodiment, the wireless signal receivers used to locate wireless gaming devices may be totally separate from the gaming machines in that the gaming machines do not include wireless signal receivers.

The wireless signal generator/receivers and wireless access points are connected via a network 1012 to a location manager 1010. The location manager may be used to process signals received from a plurality of signal receivers in communication with the location manger 1010 and use information received from the plurality of readers to determine the location of a wireless source. The wireless sources may be RFID tags, cell phones or any type of device with a wireless communication interface.

The wireless sources may be used as loyalty program instruments. The wireless sources generate signals that may be received by a number of different signal receivers. In the case of a passive RFID device, until a signal is received from a reader device, the signals from the passive devices are not generated because the signal from the reader device is used to supply power to the wireless source to generate its reply signal. For active RFID devices with an internal power source, the initial signal may be provided by the wireless source.

As an example of how location services may be provided in gaming environment three passive RFID tags used as loyalty program instruments, 1014, 1016 and 1018, are shown in FIG. 13. The example is provided for illustrative purposes only. In one scenario, a game play session is initiated on gaming machine 1000. A player carrying the RFID tag 1016 may initiate the game play session. A player carrying the RFID tag 1018 may be involved in a game play session on an adjacent gaming machine and a third person walking near the gaming machine may be carrying the RFID tag 1014.

When the game play session is initiated, an RFID reader on gaming machine 1000 broadcasts a signal. The range of the signal is large enough to be received by RFID tags 1014, 1016 and 1018. In response to its initial signal, the RFID reader receives response signals from each of the RFID tags, 1014, 1016 and 1018, which are used as loyalty program instruments. In one embodiment, the gaming machine may be able to eliminate one or more of the loyalty program instruments based upon information read from the loyalty program instrument. For instance, one or more the loyalty program instruments may be issued for loyalty programs that are not valid on the gaming machine 1000. Thus, the gaming machine may be able to eliminate the RFID tags that are not valid on the gaming machine. In another embodiment, the gaming machine may be able to determine the closest loyalty program instruments to the gaming machine based upon the signal strength received from the tag or based upon a time to receive the signal reply signal from each of the RFID tags. Thus, when it is assumed that the RFID tags closest to the gaming machine are carried by the player initiating the game play session, the RFID tags that are farther away may be eliminated. Further, the gaming machine may reduce the power that is supplied to its reader antenna, such that, only the RFID tags closest to the gaming machine will receive enough power to generate a reply to the gaming machine. Thus, eliminating the RFID tags that are farthest away.

In one embodiment, for the case where two or more valid loyalty program instruments have been detected, the gaming machine may simply display a list of names corresponding to the index numbers read from each of the detected instruments, prompt the player to verify their name and input a pin number corresponding to the index number for their name. When a PIN number is correctly received by the gaming machine corresponding to the selected loyalty program instrument, then the loyalty program session may be initiated on the gaming machine.

In other embodiments, it may be desirable to more precisely locate, each of the RFID tags. This type of service may be applied to different types of wireless device, such as cell phones. In one example, the gaming machine 1000 may send a message to the location manager requesting a location of an RFID tag. In response, the location manager 1010 may send a message to a plurality of nearby wireless signal receivers requesting each of them to turn on their receivers and may send a message to request the RFID reader in gaming machine 1000 to send out a signal or a pattern of signals that may be received by the RFID tags where the signal strength generated by the reader may be varied. As example, in response to the signal from the reader in gaming machine 1000, the RFID tag 1014 may generate a signal that is received by the wireless access point 1006, gaming machine 1001 and gaming machine 1000. Further, the RFID tag 1016 may generate a signal that is received by the gaming machine 1000, gaming machine 1001 and gaming machine 1003. In addition RFID tag 1018 may send a signal that is received by gaming machines 1000, 1002, 1003, 1004, 1005 and the signal generator/receiver 1007.

The gaming devices receiving the signals may send response information to the location manager 1010 regarding when they received the signals and the signal strength. In addition, the location manager 1010 may request one or more other readers located on different gaming devices to send out a signal and a again request the nearby gaming devices to listen for the reply signal and relay this information to the location manager 1010.

Using the received information, the location may apply an algorithm, such as triangulation, to determine the location of each of the RFID tags. For instance, the location may be the location of the RFID tag relative to a casino floor plan. To provide this location, the location manager 1010 may store a map of the casino floor plan and the position of each signal receiver on the casino floor. After determining the location of each of the RFID tags, the location manager 1010 may send a message to the gaming machine 1000 with information indicating which RFID tag is closest to the gaming machine. In response to this information, the gaming machine 1000 may initiate a loyalty program session with the closest RFID tag.

The location manager 1010 may be capable of providing location services that are of varying accuracies. For instance, in some embodiments, it may be desirable to locate one or more RFID tags within a particular area, such as in the vicinity of a bank of gaming machines. This may be useful for monitoring traffic in the casino. In other embodiments, it may be desirable to more precisely pin-point the location of a particular RFID tag, such as its distance from a particular gaming machine. In some embodiments, the resolution of the location service may be accurate to less than 3-4 feet. The required resolution may depend on the dimensions of the gaming machines and their spacing on the casino floor. In another embodiment, the resolution may be accurate enough to determine whether a location of the wireless gaming device is directly in front of a gaming machine. To locate a wireless gaming device in front of a gaming machine may require a resolution accuracy of about 1½ feet or less.

The location manager 1010 may also keep a record of a status of each of the wireless activities involving wireless gaming devices and the locations of these devices. This information may be used to simplify the location process. For instance, the location manager 1010 may store a record that the RFID tag 1018 has been used to initiate a loyalty program session on gaming machine 1003. If the loyalty program session using RFID tag 1018 is still in session when an attempt is made on gaming machine 1000 to start a loyalty program session using RFID tag 1016, then the location manager 1010 may be able to eliminate RFID tag 1018 as the RFID tag that is to be used to initiate a loyalty program session on gaming machine 1000. In other embodiments, the location manager 1010 may assign communication frequencies for different RFID tags to use or may instruct, at times, different RFID tags to turn themselves off or not reply for a period of time. This strategy may eliminate conflicts between overlapping signals from nearby RFID tags.

In the present invention, the functions of the smart card, described above, may be performed by other wireless gaming devices. For instance, a player may carry a personal digital assistant (PDA) that executes gaming applications, and may communicate with the non-gaming activity player tracking unit 27 or gaming activity player tracking unit at the gaming machine via a wireless communication interface. One example of a PDA that may be adapted for use with the present invention is the Palm VII from Palm, Inc., Santa Clara, Calif.

Figure 14:
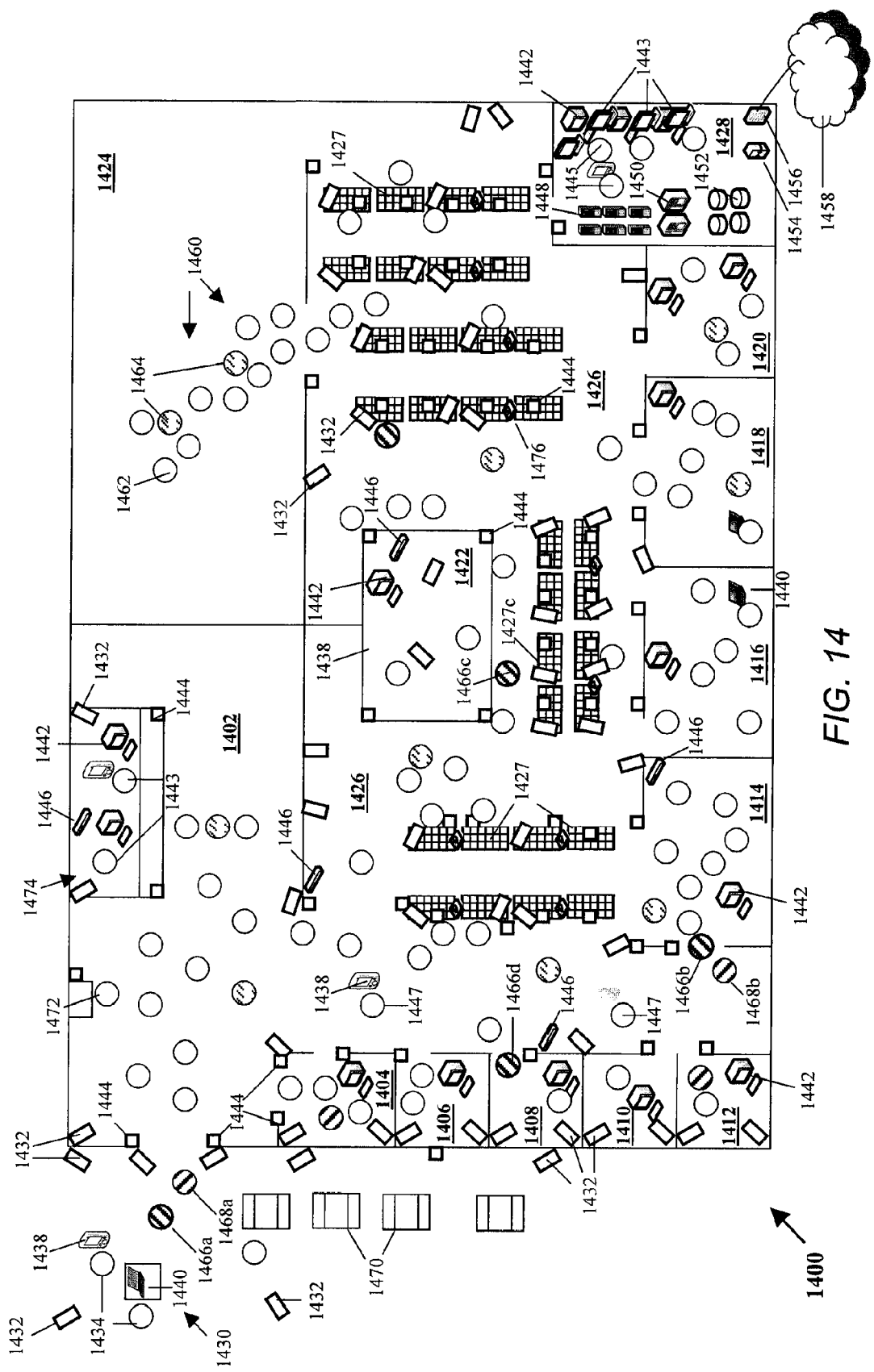
FIG. 14 depicts a simplified example of a gaming establishment and related devices that may be used for some implementations of the invention.

Referring now to FIG. 14, some additional embodiments of the invention will be described. It will be appreciated the layout, the numbers and types of gaming machines and other devices, shops, etc., is purely for the sake of example and that other layouts, etc., are within the scope and spirit of the invention. In this example, gaming establishment 1400 includes valet area 1430, lobby 1402 and nearby shops 1404, 1406, 1408, 1410 and 1412. These shops may include a range of retail establishments, including but not limited to souvenir shops, jewelry stores, clothing stores and the like.

Food and beverage establishments 1414, 1416, 1418 and 1420 may include restaurants, sushi bars, buffets, or any such dining and/or drinking establishment. Bar 1422 is an island in the midst of the main casino/gaming area 1426 that includes various gaming machines 1427. Preferably, at least some of gaming machines 1427 are configured for communication with other devices, including but not limited to one or more of servers 1448, in order to provide various features discussed elsewhere herein. Auditorium 1424 includes a stage and seating (not shown) for live performances. At the moment indicated in FIG. 14, a number of patrons 1460 are exiting auditorium 1424.

Operators 1445 and various devices for providing services and managing gaming establishment 1400 may be seen in control room 1428. This area includes host devices 1442 to facilitate the communication of operators 1445 with various other devices, such as other host devices 1442 (which may serve as cash registers, hotel registration terminals, etc.), PDAs 1438, laptops 1440, gaming machines 1427, etc. Host devices 1442 may comprise desktop computers, laptops, workstations, or other such devices. Operators 1445 may also communicate with other people, including but not limited to casino personnel 1447, via PDAs 1438, telephones, etc.

Host devices 1442 (and other devices, as needed) are also configured for communication with servers 1448, computing devices 1450, storage devices 1452 and external network 1458, via gateway 1454 and firewall 1456. Network 1458 is the Internet in this example, but may be one or more public or private networks. According to some implementations of the invention, additional storage devices and related devices may be accessed via network 1458, e.g., a storage area network ("SAN") or other types of network storage.

Servers 1448 and/or computing devices 1450 may be configured to perform various functions, including but not limited to player loyalty (including but not limited to player tracking), licensing, gaming, accounting, security services, etc. These functions may include functions known in the art and functions specific to the present invention. Accordingly, at least some of servers 1448 may be configured for communication with gaming machines 1427 in to provide server-based gaming features, e.g., as described elsewhere herein.

Control room 1428 includes a plurality of monitors 1443 for, inter alia, receiving image data from cameras 1432. Cameras 1432 may include, for example, closed circuit television ("CCTV") cameras, closed circuit digital photography ("CCDP") cameras, range cameras and/or webcams. Accordingly, the image data displayed on monitors 1443 may include still digital images, video feeds, freeze-frames, etc. Such image data may be used for various purposes, including not only security purposes known in the art but also some implementations of the present invention.

Some such implementations involve facial recognition systems. A facial recognition system is a computer-driven application for identifying a person from one or more digital images. This is generally accomplished by comparing selected facial features in the live image with stored facial recognition data. Facial recognition data (some of which may be referred to as a "faceprint" or the like) may be compared to other types of data for more reliable identification. Such data may include biometric data, such as fingerprint or eye iris recognition data obtained from biometric devices 1476 or elsewhere. Some embodiments of the invention provide for biometric devices 1476 to gather biometric data unobtrusively, e.g., by including a fingerprint and/or thumbprint reader in one or more control buttons of a gaming machine. According to some implementations of the invention, a tentative patron identification may be evaluated in view of other biometric data, player preference data (e.g., as previously compiled in a player loyalty and/or player tracking database), hotel data, retail data, restaurant/beverage data and/or other data that may be available from other parts of gaming establishment 1400 or elsewhere.

Facial recognition algorithms include eigenface, fisherface, the Hidden Markov model, and the neuronal motivated Dynamic Link Matching. An emerging trend uses the visual details of the skin, as captured in standard digital or scanned images. However, two-dimensional face recognition algorithms have shown to be sensitive to changes in lighting, different facial expressions, make-up and head orientation.

Three-dimensional face recognition (3D face recognition) methods involve the three-dimensional geometry of the human face. Some details of recent 3D face recognition methods are described by A. M. Bronstein, M. M. Bronstein and R. Kimmel in "Three-Dimensional Face Recognition" (Intl. Journal of Computer Vision, Vol. 64/1, pp. 5-30, August 2005), which is hereby incorporated by reference. It has been shown that 3D face recognition methods can achieve significantly higher accuracy than their 2D counterparts, rivaling fingerprint recognition in accuracy. Some 3D face recognition techniques involve measuring geometry of relatively rigid features of the face. Other methods use a 3D model to improve accuracy of traditional 2D facial recognition techniques by transforming the head into a known view. Some 3D face recognition methods implement depth perception by projecting a grid onto the face and integrating video capture of the face into a high-resolution 3D model. 3D face recognition methods generally require the acquisition of 3D images, which may require a range camera. Accordingly, the data storage and computational requirements for 3D face recognition methods are likely to be greater than those for 2D methods.

Computing devices 1450 may be desktop computers, workstations, blade servers, mainframe computers, supercomputers or other such devices. The type and number of computing devices 1450 may be selected according to the speed and number of calculations and other processes that will be required of them. For example, one or more of computing devices 1450 (or other devices) may be used for calculations involved in biometric data analysis, such as calculations for facial recognition systems.

In the example illustrated in FIG. 14, a plurality of RFID readers 1444 are disposed in various locations of gaming establishment 1400. RFID readers 1444 and related devices may be used, for example, to determine the location of a patron's RFID device. Such a device may be a dongle, a bracelet, a "smart card" (which may serve as a player loyalty and/or player tracking card) or another such device. RFID readers 1444 and related devices may also be used to determine the location of a portable gaming device that includes an RFID tag, etc. Further examples of how RFID readers 1444 and related devices may be used according to the present invention are described elsewhere herein.

Some of network devices 1446 may be switches, middleware servers and/or other intermediate network devices in communication with RFID readers 1444 and at least one of servers 1448. Depending in part on the size of the gaming establishment(s) involved, the number of RFID readers, etc., it may be advantageous to deploy various RFID-related devices at various hierarchical levels of an RFID network, which may include devices outside of gaming establishment 1400. Some such devices and networks are described in "The EPCglobal Architecture Framework: EPCglobal Final Version of 1 Jul. 2005," which is hereby incorporated by reference. Some network devices 1446 may comprise wireless access points for providing a communication link with wireless devices, including but not limited to PDAs 1438.

Figure 15A:
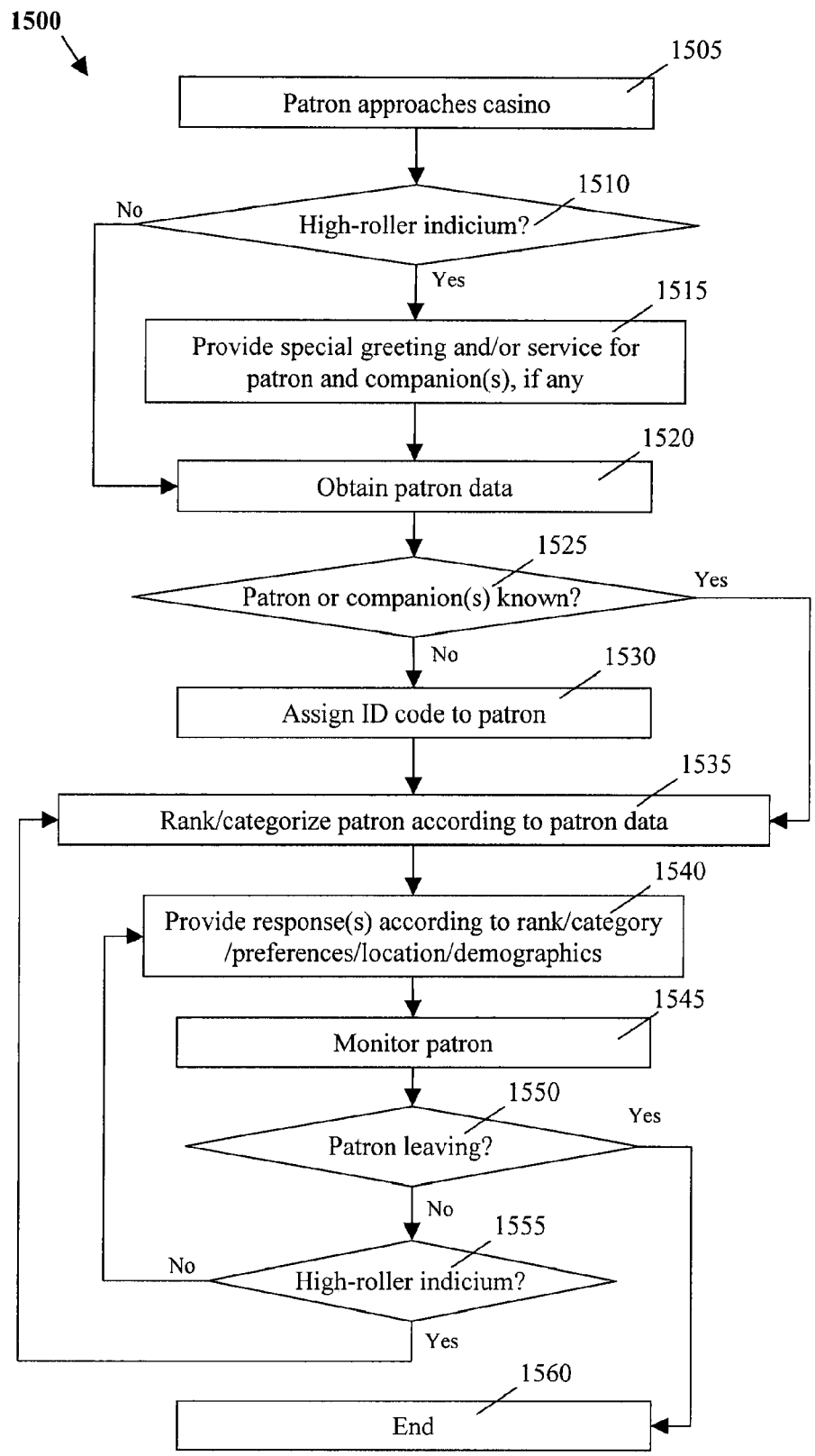
FIG. 15A is a flow chart that outlines a method of the invention.

Some implementations of the invention will now be discussed with reference to FIG. 15A et seq. It will be appreciated that the steps of these methods (as with other methods shown and described herein) are not necessarily performed in the order indicated. It should also be understood that the methods of the invention may include more or fewer steps than are indicated.

In step 1505, a patron approaches a gaming establishment. For example, a patron may arrive in one of cars 1470 depicted in FIG. 14. In general, a patron's identity will not be known at this time. However, there may nonetheless be indications that the patron may be relatively more likely than other patrons to spend a significant amount of money while visiting the gaming establishment. Such a patron may be referred to herein as a "potential high roller" or the like. The evaluation of such indications, if any, takes place in step 1510. For example, the patron may arrive in a particularly expensive automobile. The patron (or the patron's companion(s)) may be wearing an expensive watch, expensive clothing and/or expensive jewelry. Relevant observations may be made by a human being and/or by one by or more devices according to images received by cameras 1432. Accordingly, step 1510 may be performed, at least in part, by one or more valet attendants 1434, operators 1445 and/or by devices used by such persons.

In some such implementations, a rule set is applied by a host device (or the like) according to observed indicia to determine the outcome of step 1510. Such a rule set may be constructed by using information found in both gaming establishment-related databases (e.g., a player loyalty and/or player tracking database, a hotel management database, a retail database, a restaurant and/or beverage database, an entertainment database, etc.) and/or external databases in order to flag characteristics associated with patrons who have spent relatively larger amounts of money in gaming establishments. In some such implementations, an estimate is made regarding the likely value of the patron to the casino and patrons are categorized and/or ranked accordingly. Different levels of service/attention/comps may be provided for patrons having different levels of estimated value.

If it is determined in step 1510 that the patron is a potential high roller, the patron will receive special treatment according to some implementations of the invention. For example, a special greeting and/or special service may be extended to the patron and to the patron's companion(s), if any. (Step 1515.)

Additional measures may be taken, including but not limited to the devotion of relatively more resources in attempts to identify the patron. If the patron can be identified (at least preliminarily), more information may be determined about the patron according to public or private databases. Some such methods are described in detail below.

In the example illustrated in FIG. 14, patron 1466a has been identified as a potential high roller. Therefore, patron 1466a and companion 1468a will receive a special greeting, e.g., from valet personnel 1434 and/or bell staff 1472. Valet personnel 1434, operators 1445 (and/or devices involved in performing step 1510) may communicate with bell staff 1472 and/or hotel desk staff 1473 to facilitate this process. Moreover, if patron 1466a and companion 1468a will be staying in the hotel of gaming establishment 1400 (only the lobby 1402 of which is shown in FIG. 14), bell staff 1472 and/or hotel desk staff 1473 may take care of check-in for patron 1466a and companion 1468a, escort them directly to their room, etc.

In step 1520, at least some data are gathered with regard to a patron, even if there is little or no reason to assume that the patron is a high roller. For example, image data may be acquired from one or more of cameras 1432. Some level of facial recognition analysis may be performed. If one or more of RFID readers 1444 detects an RFID tag, the "tag read" may be analyzed to see if there is a correspondence with a known individual. For example, a patron may possess some type of device that bears an RFID tag identifying the patron. The device may be, for example, a player loyalty and/or player tracking device such as a "smart card." If the patron can be identified as a member of the gaming establishment 1400's player loyalty and/or player tracking program, the patron may be identified. In some implementations, step 1520 may be performed prior to or during step 1515 if, for example, an RFID-enabled player tracking card (or another RFID tag that identifies the patron) is detected as the patron is arriving. In such instances, a patron may be greeted by name.

If a patron is positively identified in step 1525, the process continues to step 1535. If not, an identification code of some type is associated with the patron. (Step 1530.) In this way, even if a patron is not a member of the gaming establishment's player loyalty/player tracking program and/or prefers not to be identified by name, data regarding the patron may be gathered and stored. Such a process may be referred to herein as "anonymous player tracking" or the like.

Many patrons prefer to be anonymous. The present invention allows players to remain un-identified by name, yet still allows a gaming establishment to identify patrons of interest, gather data regarding them and differentiate the treatment of patrons accordingly.

For an unidentified patron having no detected RFID tag, an ID code may simply be associated with image data, facial recognition data, voice data and/or other biometric data. If a patron has an RFID tag that cannot be identified, the tag read data may be used as the ID code or associated with another ID code that is assigned by gaming establishment 1400. Any such RFID tag may be used to identify and locate a patron within a network of RFID readers 1444. However, some implementations of the invention allow a patron to "opt out" of this type of program.

In step 1535, patrons are ranked and/or categorized. Various types of ranking and/or classification schemes may be employed, some of which are described in detail herein. A simple classification scheme may place all patrons into one of two categories: (1) patrons worth the dedication of resources; and (2) patrons not worth the dedication of resources.

However, alternative implementations of the invention may include multiple gradations of patrons who are deemed to be worth the dedication of resources. For example, there could be N categories of patrons deemed to be worth the dedication of resources, with different amounts of resources that are potentially available to and/or directed towards a patron. FIG. 14 illustrates one such implementation, wherein N=2. Patrons 1466 and their companions 1468 are placed in the highest category. Patrons 1464 (two of whom may be seen in auditorium 1424) are in the second-highest category. In this implementation, only patrons in these two categories will receive special services, directed marketing, etc., according to the present invention.

Although the terms "rank" and "category" may sometimes be used synonymously, in some implementations of the invention the terms may have different meanings. In such implementations, a "category" corresponds to a level of resources that a gaming establishment may potentially direct towards a patron according to method of the invention. As used herein, the term "resources" is used to include time, effort, services, comps, money, etc. In some implementations, the level of resources corresponding with a category may be zero, but this does not mean that a patron will receive, e.g., no service or poor service. Instead, it means that the no additional resources, over and above the normal level of service, amenities, etc., will be provided according to the present invention.

Moreover, there may be several ranks that correspond with a category. In one such example, the top five patrons (ranks 1 through 5) may be placed in the highest category, the patrons ranked $6^{th}$ through $20^{th}$ may be placed in the next (lower) category, etc.

Figure 15B:
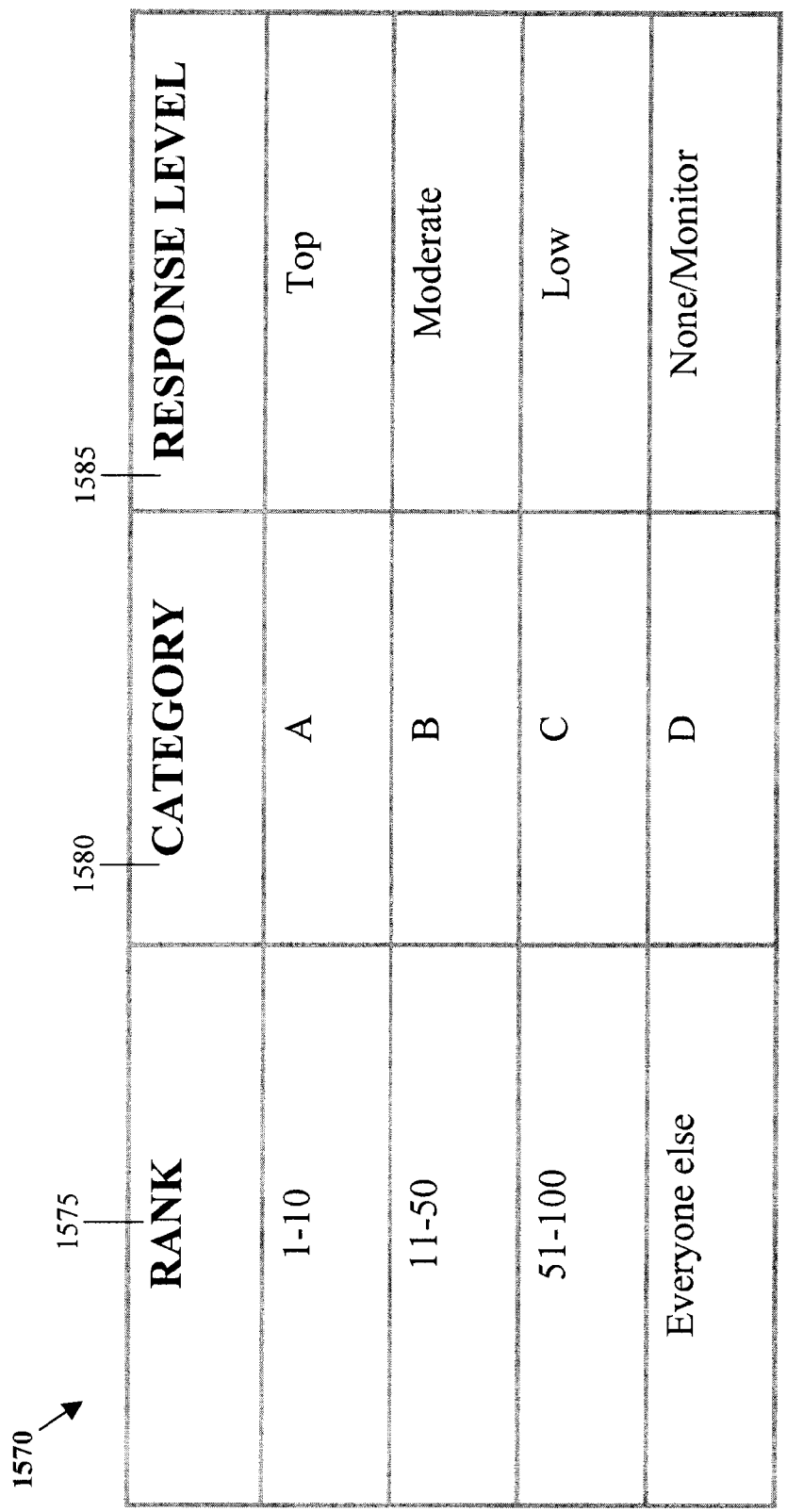
FIG. 15B is a table that indicates how patrons may be ranked and categorized according to some implementations of the invention.

A similar example is illustrated in FIG. 15B. Table 1570 sets forth ranks 1575, categories 1580 and response levels 1585 according to one implementation of the invention. In this example, the top ten patrons (ranks 1 through 10) are placed in the highest category, "A," which corresponds to the highest response level. The patrons ranked $11^{th}$ through $50^{th}$ are placed in the next category "B," which corresponds to a moderate response level. Patrons ranked $51^{st}$ through $100^{th}$ are placed in category "C," which corresponds to a lower response level. All other patrons are placed in category "D" unless and until their status changes.

However, in some implementations, there may be a different level of available resources corresponding to each rank. In such implementations, a rank is equivalent to a category.

In still other implementations, there is no fixed number of patrons for at least some of the categories. For example, a patron of the player loyalty and/or player tracking program of gaming establishment 1400 may always be entitled to receive (or at least potentially receive) a predetermined level of resources, regardless of the number of other patrons present. In such implementations, a patron who is ranked at the highest level of such a player loyalty and/or player tracking program might always be in category "A" of FIG. 15B. Similarly, an anonymous patron who is ranked in a predetermined level according to predetermined criteria/metrics may always be placed in a corresponding category.

Alternatively, or additionally, the number of anonymous patrons present to whom resources will be directed will depend on the number of patrons present who are in a gaming establishment's player loyalty and/or player tracking program. For example, if there are 8 patrons present who are ranked at the highest level of a casino's player tracking program and 30 additional players present who are ranked at the second-highest level of the casino's player tracking program, only 2 anonymous patrons would be eligible to be in category "A" of FIG. 15B and only 10 more anonymous patrons would be eligible to be in category "B." Anonymous patrons who would otherwise have been placed in category "A" may, for example, be placed in category "B," to the extent that space is available.

As noted above, some implementations of the invention provide for an earlier ranking process, which may be a preliminary ranking process based on first impressions. Accordingly, a threshold determination as to which patrons are worth the dedication of resources, such as the targeting of marketing efforts, may already have been made.

However, in some implementations of the invention, patron ranking is a dynamic process. Responses will be provided to patrons (or not) according to their category, which may change over time, as well as other factors. (Step 1540.) Examples of additional responses will be described below. To the extent that responses will be provided, they are preferably not only according to the patron's category, but also according to known preferences of the patron and/or information regarding the patron that may suggest such preferences, including but not limited to demographic data. For patrons who are identified, some such preference data may be determined from player loyalty and/or player tracking databases, other gaming establishment-related databases, or publicly available databases.

Depending on the amount of data to be evaluated and potentially stored regarding patrons, it may be advantageous to store data in a dimensional database structure. Multi-dimensional database achieve performance levels that are well in excess of that of relational systems performing similar data storage requirements. These high performance levels encourage and enable On Line Analytical Processing ("OLAP") and other such applications that can provide the ability to analyze large amounts of data with very fast response times.

Other preference data may be based on observations of the patron and/or the patron's activities. If a patron is seen to be wearing a hat or garment with a NASCAR-related logo, for example, offers relating to a NASCAR-related event may be directed to the patron. The degree to which such observations and/or responses are made will preferably be based upon a patron's category, in order to maintain a reasonable relationship between the resources directed towards the patron and the patron's likely value to the gaming establishment.

The location and/or activities of at least some patrons will be monitored. (Step 1545.) Some implementations involve tracking a patron's activities to determine various preferences, which may include gaming preferences or other preferences. For example, the time of day a patron likes to gamble, drink, shop, etc., what wagering games the patron prefers, etc., may be tracked. These data will provide information about what types of offers the patron may be interested in receiving at a particular time of day, day of the week, etc. Moreover, a patron's habits may also be used to verify a tentative identification based on other factors. For example, if there is a strong likelihood of a facial image match and other such data also match a patron's previously-observed habits, this provides a higher likelihood of a correct patron identification.

If the patron engages in activities that indicate that the patron has spent (or may spend) a significant amount of money (step 1555), the patron's rank and/or category may change. (Step 1535.)

Gaming and/or non-gaming activity of all patrons may be monitored to some degree, even in implementations such as that described with respect to FIG. 15B, wherein no special response will be made to patrons having the lowest ranking. However, the degree of monitoring may vary considerably, e.g., according to a patron's category. A flexible approach to patron monitoring may be important, particularly if patrons cannot easily be monitored in a fully automated fashion, e.g., via an RFID network, by GPS, by triangulation (e.g., of a PDA, a cellular telephone or a mobile gaming device), by using a network of near-field magnetic devices, etc. Monitoring by facial recognition techniques may require a combination of automated processes and human involvement, and may therefore be more resource-intensive.

More extensive and careful monitoring may be required for patrons in a high-level category: such patrons' location and/or activities may need to be closely monitored in order that a high level of service and other such resources are directed to the intended patrons. Such patrons may be monitored even by resource-intensive methods, if necessary.

In contrast, the level of "monitoring" for patrons in, e.g., category D of FIG. 15B may involve, e.g., only events that may indicate that a patron should be considered for a higher category. For example, if a category D patron were to order an expensive bottle of wine at restaurant 1414, this may be considered a "high roller indicium" indicium (step 1555) trigger a re-evaluation of the patron's rank. (Step 1535). However, in some implementations, even the locations of category D patrons (or the like) will be tracked, e.g., if doing so will not consume a disproportionate level of resources. For example, if the locations of such patrons may be tracked by an RFID network, it may be done.

If it is determined that a patron is leaving the gaming establishment, the process ends. (Step 1560.) Preferably, the patron should no longer be included in a pool of patrons eligible for directed resources: the patron's ID may be deleted from a list of patrons currently in the gaming establishment. In some implementations, if the patron had been ranked, e.g., as a category "A" patron, the patron's departure could trigger a ranking of patrons still thought to be in the gaming establishment.

Figure 16:
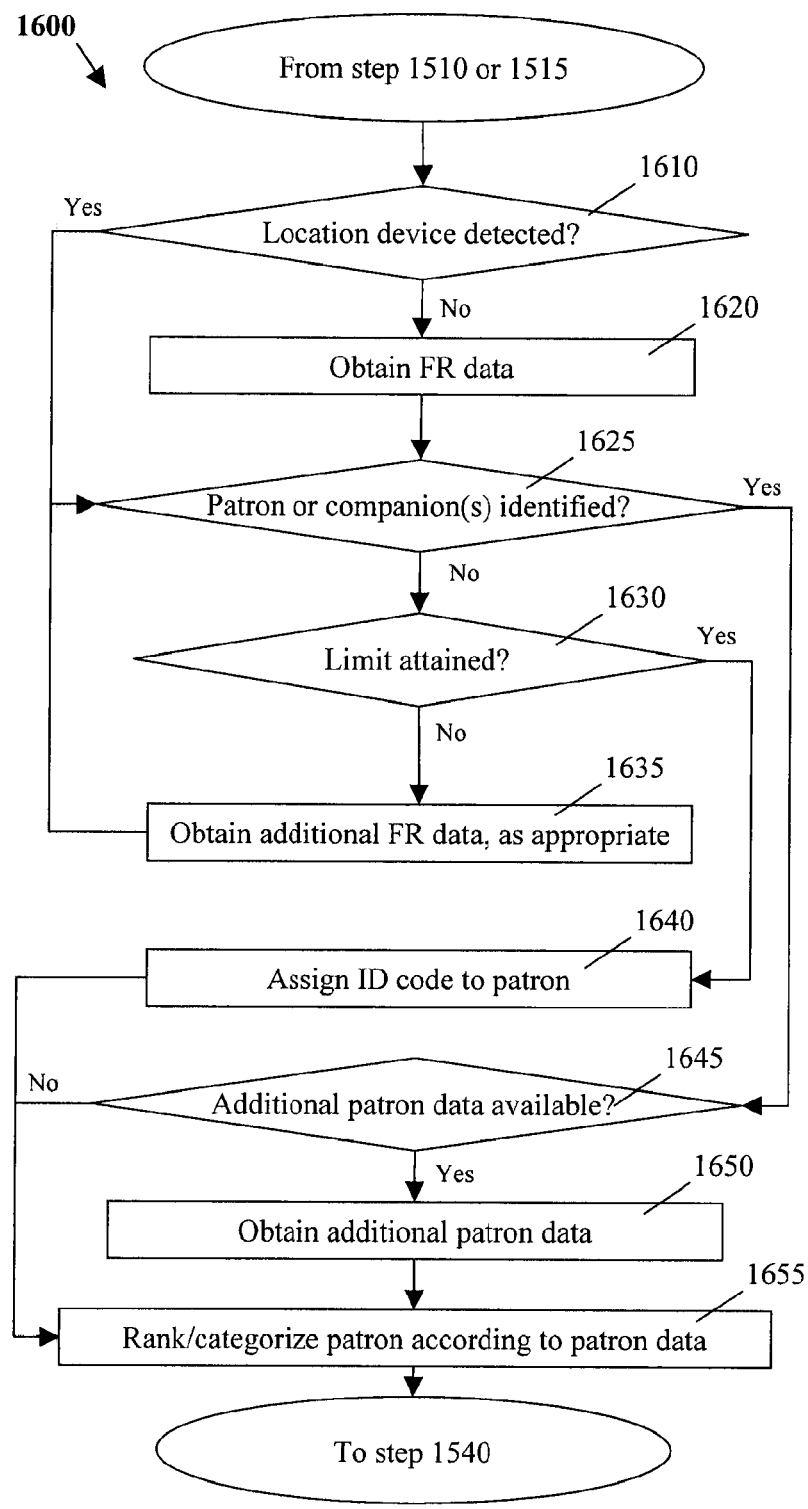
FIG. 16 is a flow chart that outlines a method of the invention.

Similarly, the degree to which facial recognition data are obtained may depend, at least in part, on whether there are convenient alternative methods of patron tracking. The steps of one relevant method 1600 are depicted in FIG. 16. In this example, the method continues from step 1510 or step 1515 of method 1500, but this need not be the case. In step 1610, it is determined whether a device is detected that could be used to track a patron in a manner that is not resource-intensive. In one example, it is determined in step 1610 whether an RFID tag of some kind is associated with the patron and read by an RFID reader. However, step 1610 may involve the detection of other devices, such as GPS devices, near-field magnetic devices, etc. In some implementations, step 1610 may involve providing a portable gaming device to a patron and/or detecting such a device.

If no such device is detected in step 1610, facial recognition data are obtained in step 1620. (In alternative implementations, facial recognition data are obtained for all patrons.) In step 1625, it is determined whether the patron can be identified. Step 1625 may be partially or fully automated, depending on the identification method. For example, a patron's RFID device may have been read in step 1610, a database may have been searched and a player may have been identified, e.g., by one of servers 1448 of FIG. 14. Alternatively, if the identification process involves facial recognition, the process may be fully automated or may require a degree of human involvement, e.g., to capture an image for analysis with a patron's head within a certain range of orientations.

According to some implementations, if a patron cannot be identified at first, additional facial recognition data may be obtained. In some such implementations, the amount of time and effort spent on identifying a player may depend on whether or not there is some indication that the player is a potential high roller. For example, a varying limit may be set on the number of iterations between steps 1625 and 1635, according to such indicia. If there is some indication that the patron may be a big spender, a relatively higher limit may be set (e.g., 4 or 5 iterations instead of 2). Accordingly, step 1630 may involve determining whether such a variable limit has been attained. Alternatively, a limit could be established according to other patron criteria or the same limit could be set for all patrons. If the patron cannot be identified before such a limit is attained, an ID code is assigned to the patron (step 1640), as previously described.

If the patron can be identified, in this example it is determined (step 1645) whether other data are available for the patron. If so, these data are obtained (step 1650). If the patron is a member of the gaming establishment's player loyalty and/or player tracking program, these data may include data from a corresponding database. Other gaming establishment databases and/or external databases may be referenced if the player can be identified. For example, a patron's ZIP code (particularly an extended ZIP code) or other address information can provide insights into the patron's likely level of income, or at least of wealth. Such information may be available from, e.g., a hotel registration process. Other types of data may also be correlated with player wealth, spending habits, gaming preferences or other preferences. Such data and may be used not only for patron ranking (step 1655), but also to determine appropriate player rewards, promotions in which a player may be interested, etc. In this example, method 1600 reverts back to step 1540 of method 1500, but this need not be the case.

Figure 17:
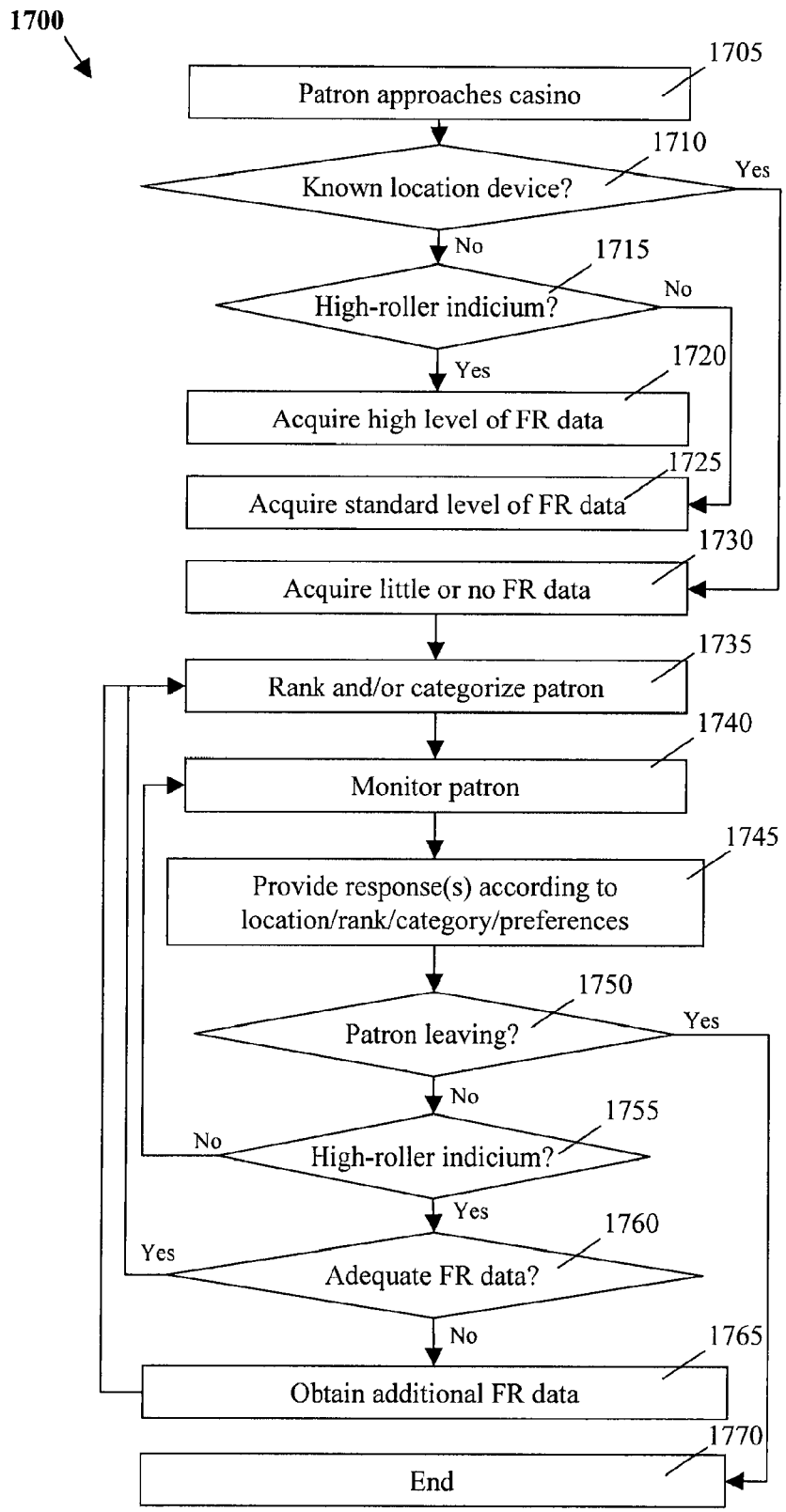
FIG. 17 is a flow chart that outlines a method of the invention.

Method 1700 (see FIG. 17) also involves the acquisition of varying levels of facial recognition data, according to a player's rank, the level of interest in a player, etc. In this example, when a patron approaches a gaming establishment (step 1705), it is determined whether the player can be identified according to a "known location device" such as an RFID device that the gaming establishment can recognize as being associated with the player, a mobile gaming device, a GPS-enabled device, etc. If so, little or no facial recognition data are obtained (step 1730), because the player can be both identified and tracked without reference to such data.

If the player does not carry a known location device, it is determined whether the player is a potential high roller as described above. (Step 1715.) For example, if the known location device is an RFID device associated with the gaming establishment's player loyalty and/or player tracking program, the player's automobile, jewelry, etc., may not require careful scrutiny because a great deal may already be known about the player.

In some implementations, however, step 1715 may be performed even if the player has a known location device. The evaluation underlying step 1715 may still be fruitful in some instances: such an evaluation may indicate recent expenditures that signal a change in the patron's fortunes and/or a change in the patron's spending habits.

If insufficient high-roller indicia are detected in step 1715, a standard level of facial recognition data will be acquired. (Step 1725.) The type and quantity of data in a "standard level of facial recognition data" is preferably determined by the gaming establishment; various reasonable metrics may be established within the scope and spirit of the invention. For example, enough 2D facial recognition data may be acquired to acquire a "faceprint" according to facial recognition software used by a gaming establishment. Establishing such a "standard level of facial recognition data" may allow a reasonable chance of recognizing and locating the patron if it becomes desirable to do so. As before, an ID is preferably assigned to unidentified patrons, in order to allow the facial recognition data to be associated with these patrons.

If sufficient high-roller indicia are detected, a relatively higher level of facial recognition data may be acquired. (Step 1720.) For example, sufficient image data may be acquired for 3D facial imaging methods and/or for methods that compensate for skin type, as described elsewhere.

As before, the patron will be rank/categorized according to the available data (step 1745) and monitored, e.g., according to the patron's category. (Step 1740.) Responses will be provided, again preferably according to the patron's category, but also preferably according to known preferences of the patron and/or information regarding the patron that may suggest such preferences.

If there are subsequent indications that a patron in a lower category should be re-categorized (as determined in step 1755), it will also be determined whether there are adequate facial recognition data for the patron. (Step 1760.) If not, such data are acquired. (Step 1765.) For example, acquiring additional facial recognition data (and/or a higher level of facial recognition data) may allow a positive identification of the player, which in turn may reveal player preferences, indications of financial/economic/spending data, etc., from one or more public or private databases. Moreover, acquiring a higher level of facial recognition data may allow a patron to be monitored more easily, thereby allowing accurately targeted responses.

Figure 18:
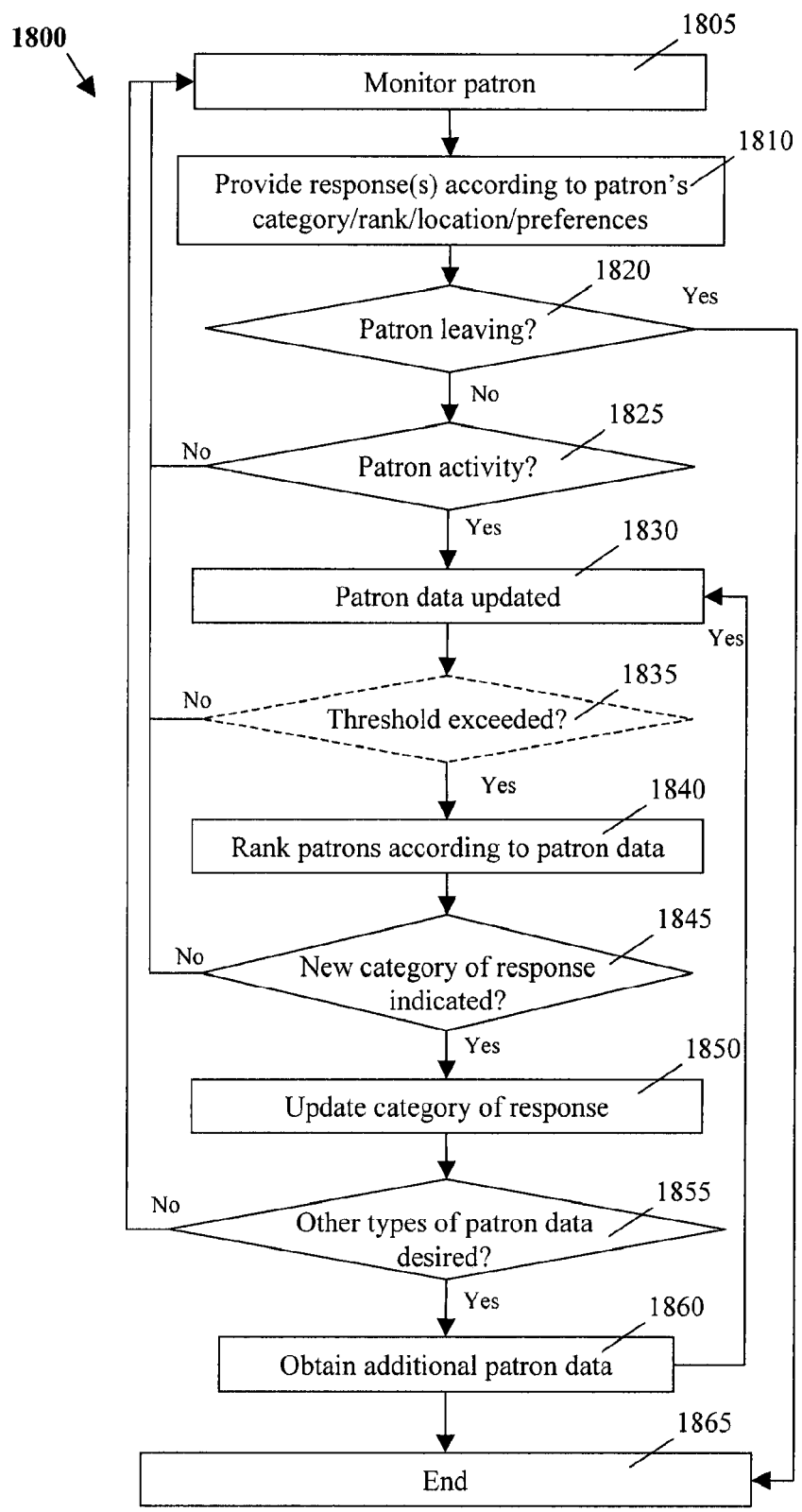
FIG. 18 is a flow chart that outlines a method of the invention.

FIG. 18 outlines some steps of method 1800, which indicates further details regarding a process of ranking and categorizing a patron according to some implementations of the invention. In step 1805, a patron is being monitored. In this example, the patron has already entered a gaming establishment and has either been identified or at least has an assigned code or the like, in order to allow patron data to be associated with the patron and/or responses to be directed to the patron (step 1810), if desired. As before, the process ends (as to that patron) when a patron leaves. (Steps 1820 and 1865.)

In step 1865, it is determined whether there has been some form of patron activity that may potentially affect a patron's rank and/or category. For example, the patron may have been observed shopping in an expensive shop, e.g., for high-end jewelry, watches, clothing, etc. An actual purchase of an expensive item, an expensive dinner, wine or other drinks, registering to stay in a luxury suite at the hotel, high-stakes wagering, or any other predetermined metric may cause a positive indication for step 1825.

The patron's data will be updated, as appropriate. (Step 1830.) In some implementations, a point-based system is applied to activities pertaining to step 1825. In some such implementations, the number of points is proportional to the amount of money spent. Gaming and non-gaming activities may be treated as being equally significant in some implementations, but not in others. For example, a given amount wagered may be assigned a higher (or lower) point value than the same amount spent on a bottle of wine. In some implementations, even browsing in or near a high-end shop can result in the award of points.

In some implementations of the invention, the accumulated points may be loyalty points of a patron loyalty system such as that described above with reference to FIG. 3 et seq., wherein points accumulated by patrons for both gaming and non-gaming activities may be redeemed upon demand by the patrons for goods and services. Such a program may be referred to herein as a "casino enterprise point system" or the like. As described above, some implementations do not require patrons to enroll in a player loyalty program; points may be accumulated and redeemed anonymously. However, as noted above, such a program may include not only gaming and non-gaming activities in a particular gaming establishment, but also purchases (or other activities) in affiliated businesses at other sites. For gaming operators whose enterprises span multiple jurisdictions, the system should differentiate clearly unique jurisdictional requirements and isolate locations that do not allow certain types of promotions or features.

Preferably, points may be awarded in a flexible manner that may be tailored by a gaming establishment. A particular gaming establishment may choose to award more (or fewer) points for each dollar spent in a hotel or in a shop than wagered in a casino. For example, at certain times a gaming establishment may create incentives for patrons to patronize targeted portions of a casino. At such times, patrons may accumulate points in a particular shop, restaurant, entertainment venue, etc., at a higher rate than during other times. A gaming establishment may encourage participation in a jackpot or the like by allowing a patron to qualify for the jackpot by participating in various activities in addition to putting money in gaming machine, such as spending money in a retail location, buying a meal and/or a drink, making a purchase from a hotel room, playing a game from a hotel room, etc. A particular gaming establishment may desire to change point accumulation criteria based on various criteria, such as time of day, time of year (e.g., holidays), during special events (e.g., NASCAR weekend) or conferences, spend rates, patron rank/category, target spending criteria, etc.

According to method 1800, each event that may change a patron's status may not necessarily trigger a re-assessment of patron ranking. In this example, it is determined whether a threshold is exceeded before such a re-ranking process is triggered. (See optional step 1835.) The threshold may be relative (e.g., to a last point total of a patron) or absolute (e.g., with reference to "break points" between categories of patrons and/or levels of a player loyalty and/or player tracking program). The threshold(s) may be dynamically adjustable, e.g., to prevent re-ranking processes from being initiated too frequently when a gaming establishment is busy.

If such a threshold is exceeded, the patrons are re-ranked. In this example, there are multiple rankings within at least some categories (e.g., as described with reference to FIG. 15B). Therefore, it is then determined whether the re-ranking process has resulted in a change in category for one or more patrons. (Step 1845.) If so, the category is updated in step 1850.

In step 1855, it is determined whether other types of patron data are now desirable, in view of a change in patron category. For example, if a patron was previously in a lower category (e.g., category C or D of FIG. 15B) and has been re-classified in a sufficiently higher category (e.g., category A or B of FIG. 15B), it may now be worth making a more concerted effort to identify a patron and/or search databases for spending, preference and other information regarding the patron. If the patron has not previously been identified, a preliminary step may be the acquisition of additional biometric data. (Step 1860.) For example, image data suitable for a 3D facial recognition process may be acquired and the 3D facial recognition process may be invoked.

If additional patron data are acquired, they are associated with the patron and stored. (Step 1830.) Such data may be used in both a monitoring process (step 1805) and to determine appropriate responses for a patron. (Step 1810.)

Figure 19:
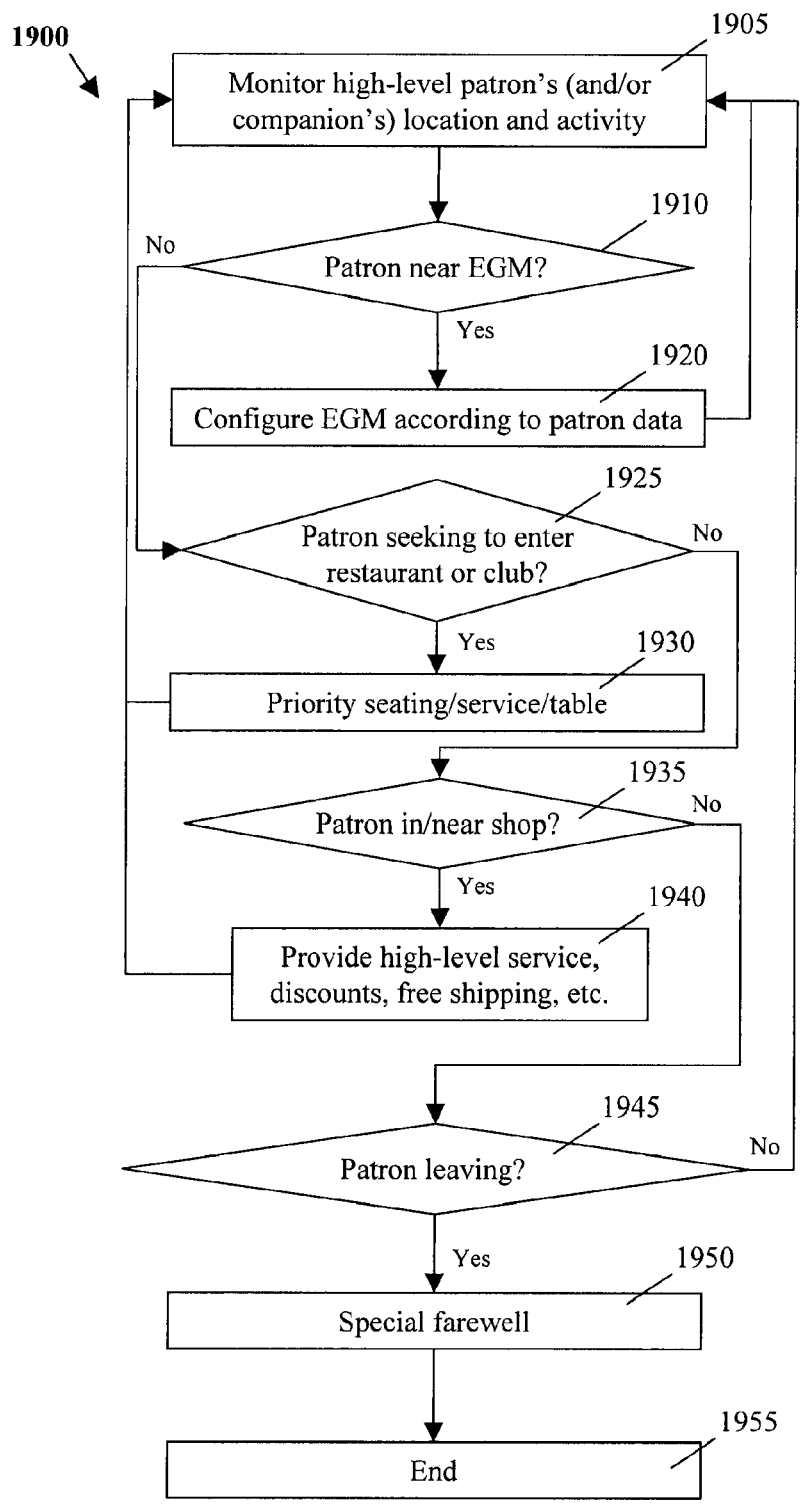
FIG. 19 is a flow chart that outlines a method of the invention.

FIG. 19 illustrates the steps of method 1900, which sets forth some examples of responses for a patron who has been placed in a high-level category. Various high-level patrons 1466 and their companions 1468, as indicated in FIG. 14, will be referenced in this discussion. As with other method of the invention, the steps of method 1900 are not necessarily performed in the order indicated.

In step 1905, the patrons (and their companions) are being monitored. If it is determined in step 1910 that a patron is near a gaming machine, the gaming machine may be configured according to a favorite game. (Step 1920.) The execution of step 1920 may involve the implementation of a server-based gaming system, as described elsewhere herein, as well as the determination of game preferences from patron data. In this example, when it is determined that high-level patron 1466c is having a drink at bar 1422, the game preferences of patron 1466c are determined and gaming machine 1427c is configured accordingly. In some implementations of the invention, multiple nearby gaming machines (e.g., the bank of gaming machines that includes gaming machine 1427c) may be configured according to the preferences of a group of patrons (e.g., patron 1466c and other patrons nearby). Special promotions (or other responses) may be directed to patron 1466c via gaming machine 1427c or otherwise, e.g., via a mobile device such as a PDA, a mobile gaming device, a cellular telephone, etc., associated with patron 1466c. Preferably, the promotion is tailored according to information regarding the preferences, or at least the demographics, of patron 1466c.

In step 1925, it is determined whether a high-level patron is seeking to enter a restaurant, club, or the like. In this example, it is observed that high-level patron 1466b and companion 1468b are at the entrance of restaurant 1414. The staff of restaurant 1414 are notified that patron 1466b and companion 1468b should be provided with top-level service. This notification may occur in any convenient fashion, e.g., via an RFID system if patron 1466b and/or companion 1468b have a known RFID device, via cellular phone, PDA, host device 1442, etc. For example, patron 1466b and companion 1468b may be seated even if they do not have a reservation and restaurant 1414 is very busy. They may be provided with free drinks while their table is being prepared.

Similarly, when a high-level patron or companion is observed in or near a shop (step 1935), high-level service, discounts, free shipping, etc., may be provided. (Step 1940.) For example, patron 1466d was pleased when candy store 1408 shipped the chocolates she had purchased to a friend at no charge. When a high-level patron or companion is observed to be leaving the gaming establishment, he or she is given a special farewell. (Step 1950.)

Some gaming networks described herein include a central system that is configured to download game software and data to networked gaming machines. The game theme of a particular networked gaming machine (or a group of networked gaming machines) may be changed according to instructions received from the central system. Such gaming networks allow for the convenient provisioning of networked gaming machines and allow additional game themes to be easily and conveniently added, if desired. Related software, including but not limited to game software, may be downloaded to networked gaming machines.

Relevant information is set forth in U.S. patent application Ser. No. 11/225,407, by Wolf et al., entitled "METHODS AND DEVICES FOR MANAGING GAMING NETWORKS" and filed Sep. 12, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES" and in U.S. patent application Ser. No. 11/173,442 by Kinsley et al., filed Jul. 1, 2005 and entitled "METHODS AND DEVICES FOR DOWNLOADING GAMES OF CHANCE," all of which are hereby incorporated by reference in their entirety and for all purposes. Some examples of gaming networks and devices are set forth below.

Example System Architecture

Figure 20:
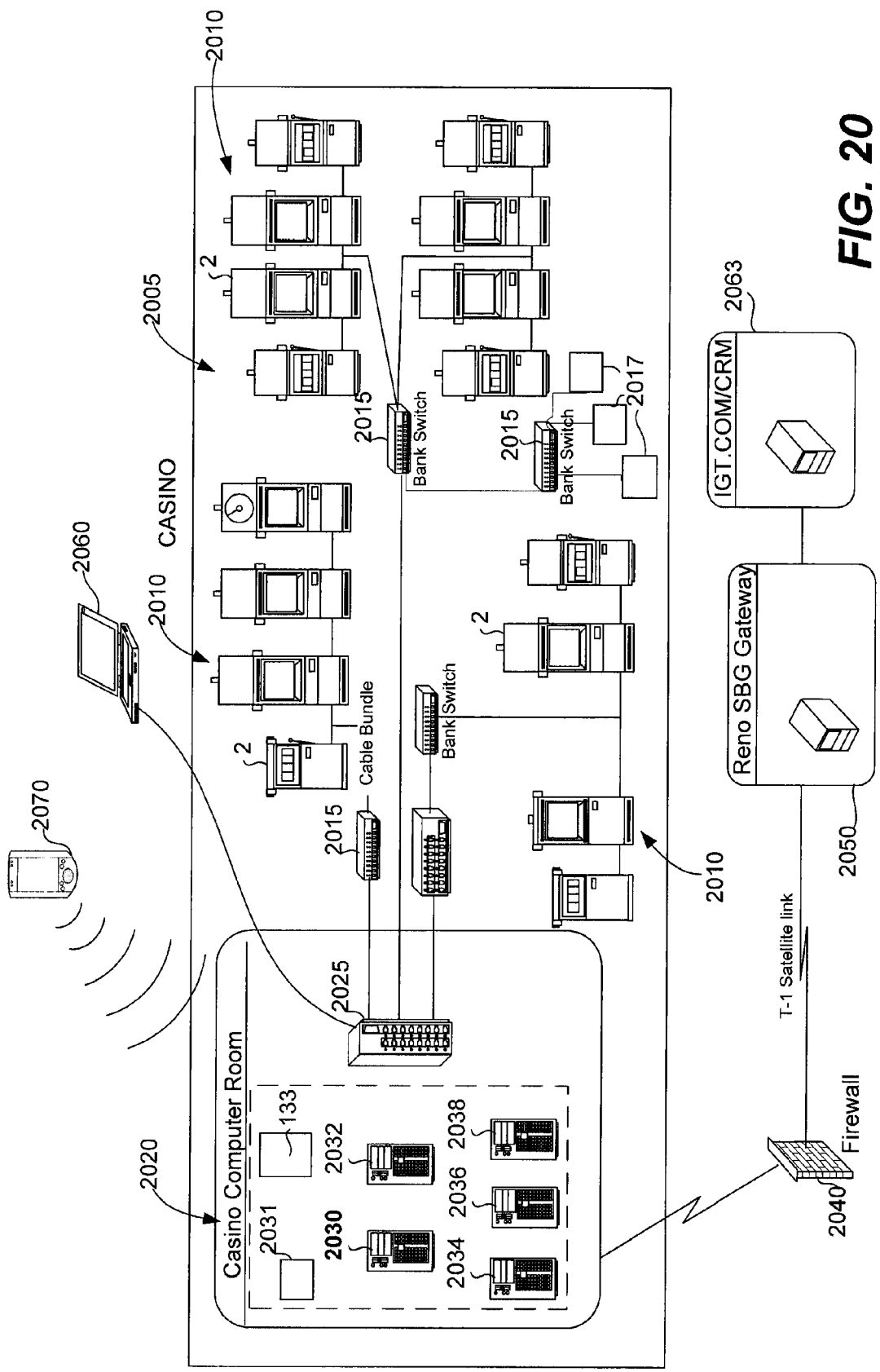
FIG. 20 illustrates a gaming network that may be used for some implementations of the invention.

One example of a network topology for implementing some aspects of the present invention is shown in FIG. 20. Those of skill in the art will realize that this exemplary architecture and the related functionality are merely examples and that the present invention encompasses many other such embodiments and methods. Here, for example, a single gaming establishment 2005 is illustrated, which is a casino in this example. However, it should be understood that some implementations of the present invention involve multiple gaming establishments.

Gaming establishment 2005 includes 16 gaming machines 2, each of which is part of a bank 2010 of gaming machines 2. In this example, gaming establishment 2005 also includes a bank of networked gaming tables 2017. It will be appreciated that many gaming establishments include hundreds or even thousands of gaming machines 2 and/or gaming tables 2017, not all of which are included in a bank. However, the present invention may be implemented in gaming establishments having any number of gaming machines, gaming tables, etc.

Various alternative network topologies can be used to implement different aspects of the invention and/or to accommodate varying numbers of networked devices. For example, gaming establishments with very large numbers of gaming machines 2 may require multiple instances of some network devices (e.g., of main network device 2025, which combines switching and routing functionality in this example) and/or the inclusion of other network devices not shown in FIG. 20. For example, some implementations of the invention include one or more middleware servers disposed between gaming machines 2 and server 2030. Such middleware servers can provide various useful functions, including but not limited to the filtering and/or aggregation of data received from bank switches 2015, from individual gaming machines and from other player terminals. Some implementations of the invention include load balancing methods and devices for managing network traffic.

Each bank 2010 has a corresponding bank switch 2015, which may be a conventional bank switch. Each bank switch is connected to server-based gaming ("SBG") server 2030 via main network device 2025, which combines switching and routing functionality in this example. Although various floor communication protocols may be used, some preferred implementations use IGT's open, Ethernet-based Super-SAS® protocol, which IGT makes available for downloading without charge. However, other protocols such as Best of Breed ("BOB") may be used to implement various aspects of SBG. IGT has also developed a gaming-industry-specific transport layer called CASH that rides on top of TCP/IP and offers additional functionality and security.

SBG server 2030, License Manager 2031, Arbiter 133, servers 2032, 2034, 2036 and 2038, and main network device 2025 are disposed within computer room 2020 of gaming establishment 2005. In practice, more or fewer servers may be used. Some of these servers may be configured to perform tasks relating to player loyalty and/or player tracking, bonusing/progressives, etc. Some servers may be configured to perform tasks specific to the present invention. License Manager 2031 may also be implemented, at least in part, via a server or a similar device. Some exemplary operations of License Manager 2031 are described in detail in U.S. patent application Ser. No. 11/225,408, entitled "METHODS AND DEVICES FOR AUTHENTICATION AND LICENSING IN A GAMING NETWORK" by Kinsley et al., which is hereby incorporated by reference.

SBG server 2030 can also be configured to implement, at least in part, various aspects of the present invention. Some preferred embodiments of SBG server 2030 and the other servers shown in FIG. 20 include (or are at least in communication with) clustered CPUs, redundant storage devices, including backup storage devices, switches, etc. Such storage devices may include a redundant array of inexpensive disks ("RAID"), back-up hard drives and/or tape drives, etc. Preferably, a Radius and a DHCP server are also configured for communication with the gaming network. Some implementations of the invention provide one or more of these servers in the form of blade servers.

In some implementations of the invention, many of these devices (including but not limited to License Manager 2031, servers 2032, 2034, 2036 and 2038, and main network device 2025) are mounted in a single rack with SBG server 2030. Accordingly, many or all such devices will sometimes be referenced in the aggregate as an "SBG server." However, in alternative implementations, one or more of these devices is in communication with SBG server 2030 and/or other devices of the network but located elsewhere. For example, some of the devices could be mounted in separate racks within computer room 2020 or located elsewhere on the network. For example, it can be advantageous to store large volumes of data elsewhere via a storage area network ("SAN").

In some embodiments, these components are SBG server 2030 preferably has an uninterruptible power supply ("UPS"). The UPS may be, for example, a rack-mounted UPS module.

Computer room 2020 may include one or more operator consoles or other host devices that are configured for communication with SBG server 2030. Such host devices may be provided with software, hardware and/or firmware for implementing various aspects of the invention; many of these aspects involve controlling SBG server 2030. However, such host devices need not be located within computer room 2020. Wired host device 2060 (which is a laptop computer in this example) and wireless host device (which is a PDA in this example) may be located elsewhere in gaming establishment 2005 or at a remote location.

Arbiter 133 may be implemented, for example, via software that is running on a server or another networked device. Arbiter 133 serves as an intermediary between different devices on the network. Some implementations of Arbiter 133 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 133 is a repository for the configuration information required for communication between devices on the gaming network (and, in some implementations, devices outside the gaming network). Although Arbiter 133 can be implemented in various ways, one exemplary implementation is discussed in the following paragraphs.

Figure 21:
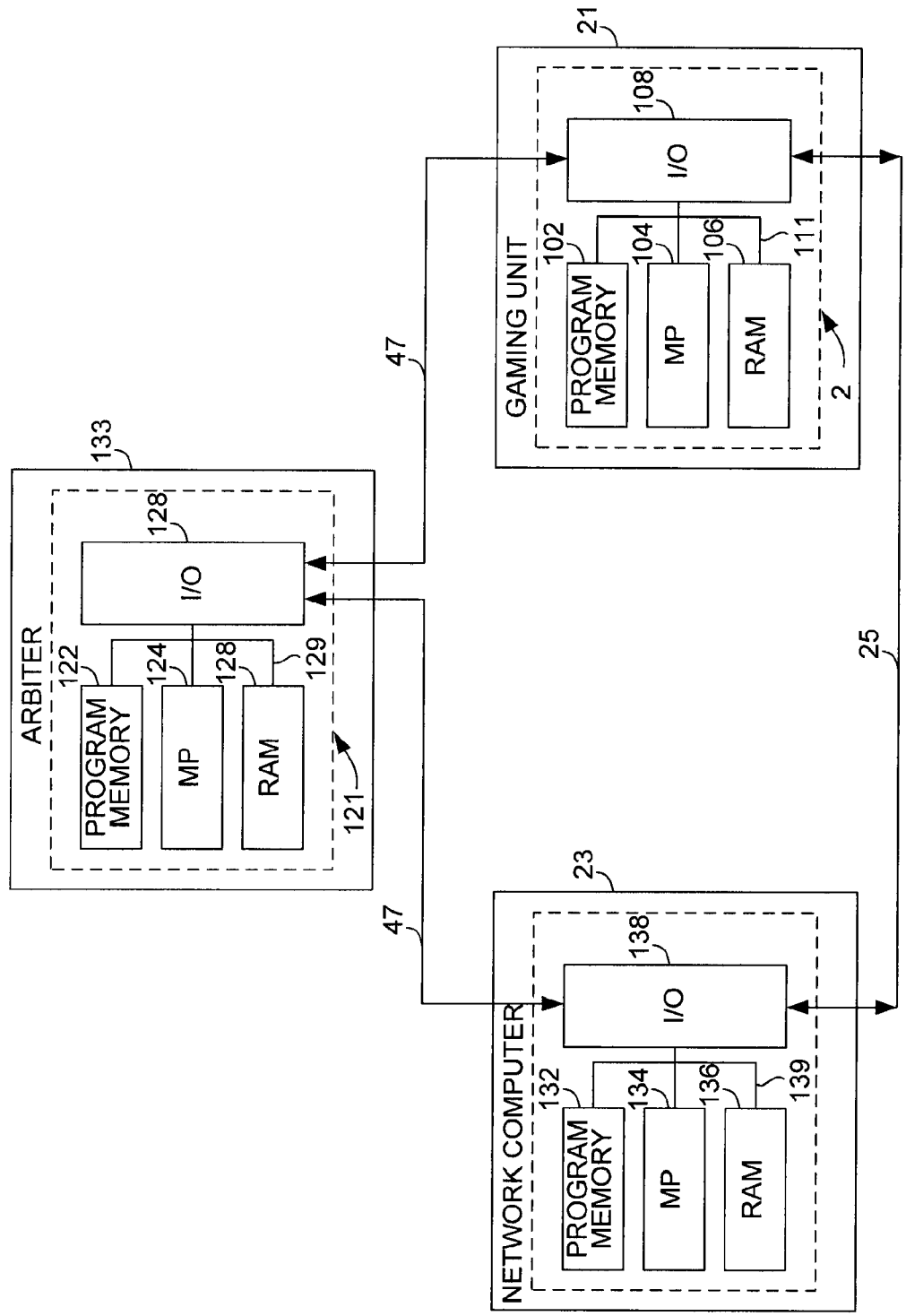
FIG. 21 is a block diagram of an Arbiter and other devices that may be used for some implementations of the invention.

FIG. 21 is a block diagram of a simplified communication topology between a gaming unit 21, the network computer 23 and the Arbiter 133. Although only one gaming unit 21, one network computer 23 and one Arbiter 133 are shown in FIG. 21, it should be understood that the following examples may be applicable to different types of network gaming devices within the gaming network 12 beyond the gaming unit 21 and the network computer 23, and may include different numbers of network computers, gaming security arbiters and gaming units. For example, a single Arbiter 133 may be used for secure communications among a plurality of network computers 23 and tens, hundreds or thousands of gaming units 21. Likewise, multiple gaming security arbiters 46 may be utilized for improved performance and other scalability factors.

Referring to FIG. 21, the Arbiter 133 may include an arbiter controller 121 that may comprise a program memory 122, a microcontroller or microprocessor (MP) 124, a random-access memory (RAM) 126 and an input/output (I/O) circuit 128, all of which may be interconnected via an address/data bus 129. The network computer 23 may also include a controller 131 that may comprise a program memory 132, a microcontroller or microprocessor (MP) 134, a random-access memory (RAM) 136 and an input/output (I/O) circuit 138, all of which may be interconnected via an address/data bus 139. It should be appreciated that although the Arbiter 133 and the network computer 23 are each shown with only one microprocessor 124, 134, the controllers 121, 131 may each include multiple microprocessors 124, 134. Similarly, the memory of the controllers 121, 131 may include multiple RAMs 126, 136 and multiple program memories 122, 132. Although the I/O circuits 128, 138 are each shown as a single block, it should be appreciated that the I/O circuits 128, 138 may include a number of different types of I/O circuits. The RAMs 124, 134 and program memories 122, 132 may be implemented as semiconductor memories, magnetically readable memories, and/or optically readable memories, for example.

Although the program memories 122, 132 are shown in FIG. 21 as read-only memories (ROM) 122, 132, the program memories of the controllers 121, 131 may be a read/write or alterable memory, such as a hard disk. In the event a hard disk is used as a program memory, the address/data buses 129, 139 shown schematically in FIG. 21 may each comprise multiple address/data buses, which may be of different types, and there may be an I/O circuit disposed between the address/data buses.

As shown in FIG. 21, the gaming unit 21 may be operatively coupled to the network computer 23 via the data link 25. The gaming unit 21 may also be operatively coupled to the Arbiter 133 via the data link 47, and the network computer 23 may likewise be operatively coupled to the Arbiter 133 via the data link 47. Communications between the gaming unit 21 and the network computer 23 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), game download information (e.g., game software and game licensing information) and personal information (e.g., social security number, personal preferences, etc.) may be encrypted with stronger encryption techniques such as DES or 3DES to provide increased security.

As disclosed in further detail in the Arbiter Application, the Arbiter 133 may verify the authenticity of each network gaming device. The Arbiter 133 may receive a request for a communication session from a network device. For ease of explanation, the requesting network device may be referred to as the client, and the requested network device may be referred to as the host. The client may be any device on the network 12 and the request may be for a communication session with any other network device. The client may specify the host, or the gaming security arbiter may select the host based on the request and based on information about the client and potential hosts. The Arbiter 133 may provide encryption keys (session keys) for the communication session to the client via the secure communication channel. Either the host and/or the session key may be provided in response to the request, or may have been previously provided. The client may contact the host to initiate the communication session. The host may then contact the Arbiter 133 to determine the authenticity of the client. The Arbiter 133 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 133 may contact the host regarding the request and provide corresponding session keys to both the client and the host. The Arbiter 133 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Wireless devices are particularly useful for managing a gaming network. Such wireless devices could include, but are not limited to, laptops, PDAs or even cellular telephones. Referring once again to FIG. 20, one or more network devices in gaming establishment 2005 can be configured as wireless access points. For example, a casino manager may use a wireless handheld device to revise and/or schedule gaming machine configurations while roaming the casino floor. Similarly, a representative of a regulatory body could use a PDA to verify gaming machine configurations, generate reports, view activity logs, etc., while on the casino floor.

If a host device is located in a remote location, security methods and devices (such as firewalls, authentication and/or encryption) should be deployed in order to prevent the unauthorized access of the gaming network. Similarly, any other connection between gaming network 2005 and the outside world should only be made with trusted devices via a secure link, e.g., via a virtual private network ("VPN") tunnel. For example, the illustrated connection between SBG 2030, gateway 2050 and central system 2063 (here, IGT.com) that may be used for game downloads, etc., is advantageously made via a VPN tunnel.

An Internet-based VPN uses the open, distributed infrastructure of the Internet to transmit data between sites. A VPN may emulate a private IP network over public or shared infrastructures. A VPN that supports only IP traffic is called an IP-VPN. VPNs provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

As mentioned elsewhere herein, U.S. patent application Ser. No. 11/225,408, entitled "METHODS AND DEVICES FOR AUTHENTICATION AND LICENSING IN A GAMING NETWORK" by Kinsley et al., describes novel methods and devices for authentication, game downloading and game license management. This application has been incorporated herein by reference.

Providing a secure connection between the local devices of the SBG system and IGT's central system allows for the deployment of many advantageous features. For example, a customer (e.g., an employee of a gaming establishment) can log onto an account of central system 2063 (in this example, IGT.com) to obtain the account information such as the customer's current and prior account status.

Moreover, such a secure connection may be used by the central system 2063 to collect information regarding a customer's system. Such information includes, but is not limited to, error logs for use in diagnostics and troubleshooting. Some implementations of the invention allow a central system to collect other types of information, e.g., information about the usage of certain types of gaming software, revenue information regarding certain types of games and/or gaming machines, etc. Such information includes, but is not limited to, information regarding the revenue attributable to particular games at specific times of day, days of the week, etc. Such information may be obtained, at least in part, by reference to an accounting system of the gaming network(s), as described in U.S. patent application Ser. No. 11/225,407, by Wolf et al., entitled "METHODS AND DEVICES FOR MANAGING GAMING NETWORKS," which has been incorporated herein by reference.

Automatic updates of a customer's SBG server may also be enabled. For example, central system 2063 may notify a local SBG server regarding new products and/or product updates. For example, central system 2063 may notify a local SBG server regarding updates of new gaming software, gaming software updates, peripheral updates, the status of current gaming software licenses, etc. In some implementations of the invention, central system 2063 may notify a local SBG server (or another device associated with a gaming establishment) that an additional theme-specific data set and/or updates for a previously-downloaded global payout set are available. Alternatively, such updates could be automatically provided to the local SBG server and downloaded to networked gaming machines.

After the local SBG server receives this information, it can identify relevant products of interest. For example, the local SBG server may identify gaming software that is currently in use (or at least licensed) by the relevant gaming entity and send a notification to one or more host devices, e.g., via email. If an update or a new software product is desired, it can be downloaded from the central system. Some relevant downloading methods are described elsewhere herein and in applications that have been incorporated herein by reference, e.g., in U.S. patent application Ser. No. 11/078,966. Similarly, a customer may choose to renew a gaming software license via a secure connection with central system 2063 in response to such a notification.

Secure communication links allow notifications to be sent securely from a local SBG server to host devices outside of a gaming establishment. For example, a local SBG server can be configured to transmit automatically generated email reports, text messages, etc., based on predetermined events that will sometimes be referred to herein as "triggers." Such triggers can include, but are not limited to, the condition of a gaming machine door being open, cash box full, machine not responding, verification failure, etc.

In addition, providing secure connections between different gaming establishments can enable alternative implementations of the invention. For example, a number of gaming establishments, each with a relatively small number of gaming machines, may be owned and/or controlled by the same entity. In such situations, having secure communications between gaming establishments makes it possible for a gaming entity to use a single SBG server as an interface between central system 2063 and the gaming establishments.

As mentioned elsewhere herein some implementations of the invention involve aggregating data involving multiple patrons. In some such implementations, such data aggregations are used to determine patron "traffic patterns" and the like, including but not limited to determining what games patrons prefer to play and when they prefer to play them. These data may be used to determine what games to enable in a given part of the casino during a given time period, thereby more nearly optimizing the deployment of games on the casino floor. By combining game preference data with patron preference and/or demographic data, offers and advertisements for the gaming, retail, beverage, restaurant, club and entertainment sectors of a gaming establishment may be more optimally directed to patrons.

Some methods of the invention combine information that can be obtained from one or more gaming establishment databases with some of the SBG features described above. By combining, for example, information regarding scheduled gaming machine configurations and information regarding the amount of money that a gaming machine brings in while a gaming machine has a particular configuration, gaming machine configurations may be optimized to maximize revenue. Some such methods involve determining a first rate of revenue obtained by a gaming machine in the gaming network during a first time when the gaming machine has a first configuration. The gaming machine is later automatically configured according to second configuration information supplied by the SBG server, e.g., as scheduled by the Scheduler. A second rate of revenue, obtained by the gaming machine during a second time when the gaming machine has the second configuration, is determined, and so on.

After scheduling various configurations at various times, optimum configurations for the gaming machine may be determined for various times of day. The SBG system can them provide scheduled optimal configurations for the gaming machine at the corresponding times of day. Some implementations provide for groups (e.g., banks) of gaming machines to be automatically configured according to a predetermined schedule of optimal configurations for various times of day, days of the week, times of the year, etc.

In some such implementations, an average revenue may be computed, based on revenue from many gaming machines having the same configuration at the same time of day. These average revenues could be used to determine an overall optimal value for relevant time periods.

Some implementations of the invention control a gaming network in response to observed revenue obtained by gaming machines during different times and/or with different configurations. One such method includes these steps: determining a first rate of revenue obtained by a first gaming machine of a plurality of gaming machines in the gaming network during a first time when the first gaming machine has a first configuration; transmitting second configuration information to the first gaming machine via the gaming network; configuring the first gaming machine with a second configuration according to the second configuration information; and determining a second rate of revenue obtained by the first gaming machine during a second time when the first gaming machine has the second configuration.

The step of determining the first rate of revenue may involve receiving first revenue data from the first gaming machine via the gaming network, the first revenue data pertaining to the first time. In some implementations of the invention, when it is determined that the first rate of revenue is higher than the second rate of revenue, the method further comprises these steps: transmitting third configuration information to the first gaming machine via the gaming network; and configuring the first gaming machine with a third configuration according to the second configuration information. The second configuration information may be, for example, denomination information, display information, pay table percentage and/or game software information.

Another such method involves these steps: receiving revenue data from a first gaming machine of a plurality of gaming machines in the gaming network; determining a first rate of revenue obtained by the first gaming machine during a first time when the first gaming machine has a first configuration; determining a second rate of revenue obtained by the first gaming machine during a second time when the first gaming machine has a second configuration; determining an $N^{th}$ rate of revenue obtained by the first gaming machine during an $N^{th}$ time when the first gaming machine has an $N^{th}$ configuration; and ascertaining a first optimum configuration for the first gaming machine during a first time of day. The first optimum configuration corresponds with a highest rate of revenue determined for the first gaming machine during the first time of day.

The method may also involve scheduling the first gaming machine to be automatically configured with the first optimum configuration during the first time of day. If the first gaming machine is part of a bank of gaming machines, the method may involve scheduling each gaming machine of the bank of gaming machines to be automatically configured with the first optimum configuration during the first time of day.

The method may include these steps: ascertaining a second optimum configuration for the first gaming machine during a second time of day, the second optimum configuration corresponding with a highest rate of revenue determined for the first gaming machine during the second time of day; and scheduling the first gaming machine to be automatically configured with the second optimum configuration during the second time of day.

The method may include the following steps: receiving revenue data from second through $M^{th}$ gaming machines in the gaming network; determining a first average rate of revenue obtained by the second through $M^{th}$ gaming machines during the first time when the second through $M^{th}$ gaming machines have the first configuration; determining a second average rate of revenue obtained by the second through $M^{th}$ gaming machines during a second time when the second through $M^{th}$ gaming machines have a second configuration; determining an $N^{th}$ average rate of revenue obtained by the second through $M^{th}$ gaming machines during an $N^{th}$ time when the second through $M^{th}$ gaming machines have an $N^{th}$ configuration; and ascertaining a first overall optimum configuration for the second through $M^{th}$ gaming machines during a predetermined time of day. The first overall optimum configuration corresponds with a highest average rate of revenue determined for the second through $M^{th}$ gaming machines during the predetermined time of day. The first optimum configuration may include a denomination, a display type, a pay table percentage and/or a game type.

Although the foregoing invention has been described in some detail for purposes of clarity of understanding, it will be apparent that certain changes and modifications may be practiced within the scope of the appended claims. For instance, while the gaming machines of this invention have been depicted as upright models having top box mounted on top of the main gaming machine cabinet, the use of gaming devices in accordance with this invention is not so limited. For example, gaming machine may be provided without a top box or the gaming machine may be of a slant-top or table top design.

We claim:

1. A system for providing gaming services, comprising:
   a plurality of cameras for obtaining image data regarding people in or near a gaming establishment, the cameras configured for communication with other devices via a network; and
   a server, comprising:
      at least one network interface configured for communication with the network; and
      at least one logic device configured to do the following:
         obtain, from the image data, facial recognition data regarding a person from at least one of the cameras via the network interface, without reference to the person's voluntary participation in a player loyalty system;
         estimate the person's expected economic value to the gaming establishment, based at least in part on the facial recognition data;
         categorize the person, based at least in part on the expected economic value; and
         determine whether to provide a benefit to the person according to the categorization.

2. The system of claim 1, wherein at least one logic device is further configured to do the following:
   obtain player indicia regarding the person from a database; and
   categorize the person with reference to the facial recognition data and the player indicia.

3. The system of claim 1, further comprising means for tracking the person's location while the person is within, or in the vicinity of, the gaming establishment, the tracking means comprising means for communicating the person's location via the network.

4. The system of claim 1, wherein the plurality of cameras comprises a plurality of fingerprint scanners.

5. The system of claim 1, wherein at least one logic device is further configured to assign a rank to the patron, the rank depending at least in part on the patron's expected economic value to the gaming establishment.

6. The system of claim 2, wherein the database comprises a player loyalty system database.

7. The system of claim 3, wherein the tracking means comprises a radio frequency identification network.

8. A method of providing gaming services, comprising:
   obtaining first player indicia regarding a person approaching or entering a gaming establishment without reference to the person's voluntary participation in a player loyalty system, said first player indicia based at least in part on facial recognition data of the person and obtained from image data captured by at least one of a plurality of cameras disposed in or near a gaming establishment;

categorizing the person with reference to the first player indicia; and determining whether to provide a benefit to the person according to the categorization.

9. The method of claim 8, wherein the obtaining step further comprises obtaining first player indicia regarding a person near a gaming establishment.

10. The method of claim 8, wherein the categorizing involves data from a player loyalty system.

11. The method of claim 8, further comprising:
obtaining second player indicia regarding the person with reference to a database; and
categorizing the person with reference to the first player indicia and the second player indicia.

12. The method of claim 8, wherein the benefit comprises a comp or enhanced personal service.

13. The method of claim 8, wherein the first player indicia include one or more of clothing indicia, jewelry indicia, personal association indicia, and tipping indicia.

14. The method of claim 8, wherein the categorizing step comprises a determination of the person's expected economic value to the gaming establishment.

15. The method of claim 8, wherein the categorizing step comprises assigning a rank to the person, the rank depending at least in part on the person's expected economic value to the gaming establishment.

16. The method of claim 8, further comprising tracking the person's location while the person is within, or in the vicinity of, the gaming establishment.

17. The method of claim 8, further comprising associating a code with the person's data.

18. The method of claim 8, wherein the categorizing and determining steps are performed dynamically.

19. The method of claim 9, wherein the first player indicia include one or more of automobile indicia, clothing indicia, jewelry indicia, personal association indicia, tipping indicia and purchasing indicia.

20. The method of claim 10, wherein the database is a voluntary player loyalty system database.

21. The method of claim 10, wherein the database is a publicly available database.

22. The method of claim 10, wherein the step of obtaining second player indicia is performed in response to first player indicia.

23. A system for providing gaming services, comprising:
means for obtaining first player indicia regarding a person approaching or entering a gaming establishment without reference to the person's voluntary participation in a player loyalty system, said first player indicia based at least in part on facial recognition data of the person and obtained from image data captured by at least one of a plurality of cameras disposed in or near a gaming establishment;
means for categorizing the person with reference to the first player indicia; and
means for determining whether to provide a benefit to the person according to the categorization.

24. The system of claim 23, wherein the player loyalty system comprises a player tracking system.

25. The system of claim 23, further comprising:
means for obtaining second player indicia regarding the person with reference to a database; and
means for categorizing the person with reference to the first player indicia and the second player indicia.

26. The system of claim 23, wherein the categorizing means comprises means for determining the person's expected economic value to the gaming establishment.

27. The system of claim 23, wherein the categorizing means comprises means for assigning a rank to the person, the rank depending at least in part on the person's expected economic value to the gaming establishment.

28. The system of claim 23, further comprising means for tracking the person's location while the person is within, or in the vicinity of, the gaming establishment.

29. The system of claim 23, further comprising means for associating a code with the person's data.

30. The system of claim 25, wherein the database is a voluntary player loyalty system database.

31. The system of claim 25, wherein the database is a publicly available database.

32. The system of claim 25, wherein the means for obtaining second player indicia is activated in response to first player indicia.

* * * * *

UNITED STATES PATENT AND TRADEMARK OFFICE
CERTIFICATE OF CORRECTION

| | | |
|---|---|---|
| PATENT NO. | : 8,425,313 B2 | Page 1 of 1 |
| APPLICATION NO. | : 11/829028 | |
| DATED | : April 23, 2013 | |
| INVENTOR(S) | : Nelson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1359 days.

Signed and Sealed this
Sixteenth Day of December, 2014

Michelle K. Lee
*Deputy Director of the United States Patent and Trademark Office*